(12) United States Patent
Sutherland et al.

(10) Patent No.: US 7,583,423 B2
(45) Date of Patent: Sep. 1, 2009

(54) SWITCHABLE POLYMER-DISPERSED LIQUID CRYSTAL OPTICAL ELEMENTS

(75) Inventors: Richard L. Sutherland, Dayton, OH (US); Bill Hagan, Encinitas, CA (US); William J. Kelly, Coronado, CA (US); Bob Epling, Waynesville, OH (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/268,584

(22) Filed: Nov. 8, 2005

(65) Prior Publication Data

US 2006/0114533 A1     Jun. 1, 2006

Related U.S. Application Data

(60) Division of application No. 11/002,116, filed on Dec. 3, 2004, now Pat. No. 7,068,405, which is a division of application No. 09/742,397, filed on Dec. 22, 2000, now Pat. No. 6,867,888, and a continuation-in-part of application No. 09/033,512, filed on Mar. 2, 1998, now Pat. No. 6,699,407, which is a continuation of application No. 08/680,292, filed on Jul. 12, 1996, now Pat. No. 5,942,157.

(60) Provisional application No. 60/240,771, filed on Oct. 17, 2000, provisional application No. 60/171,478, filed on Dec. 22, 1999.

(51) Int. Cl.
*G02B 5/32* (2006.01)

(52) U.S. Cl. ............... 359/15; 359/3; 349/86; 349/202; 385/37; 398/84; 398/87

(58) Field of Classification Search ........ None
See application file for complete search history.

(56) References Cited

U.S. PATENT DOCUMENTS 3,432,225 A    3/1969  Rock ...................... 359/588

(Continued)

FOREIGN PATENT DOCUMENTS

CA            544591           8/1957

(Continued)

OTHER PUBLICATIONS

International Search Report for Application No. PCT/US97/12577, dated Jan. 14, 1998 (mailing date).

(Continued)

*Primary Examiner*—Arnel C Lavarias
(74) *Attorney, Agent, or Firm*—King & Spalding LLP

(57) ABSTRACT

Transmission and reflection type holograms may be formed utilizing a novel polymer-dispersed liquid crystal (PDLC) material and its unique switching characteristics to form optical elements. Applications for these switchable holograms include communications switches and switchable transmission, and reflection red, green, and blue lenses. The PDLC material offers all of the features of holographic photopolymers with the added advantage that the hologram can be switched on and off with the application of an electric field. The material is a mixture of a polymerizable monomer and liquid crystal, along with other ingredients, including a photoinitiator dye. Upon irradiation, the liquid crystal separates as a distinct phase of nanometer-size droplets aligned in periodic channels forming the hologram. The material is called a holographic polymer-dispersed liquid crystal (H-PDLC).

23 Claims, 44 Drawing Sheets

U.S. PATENT DOCUMENTS

| | | | |
|---|---|---|---|
| 3,565,509 A | 2/1971 | Sulzbach | 359/588 |
| 3,580,655 A | 5/1971 | Leith et al. | 350/3.5 |
| 3,658,526 A | 4/1972 | Haugh | 96/27 |
| 3,667,946 A | 6/1972 | Sturdevant | 96/35.1 |
| 3,758,186 A | 9/1973 | Brumm | 350/3.5 |
| 3,993,485 A | 11/1976 | Chandross et al. | 96/27 H |
| 4,003,629 A | 1/1977 | Baues et al. | 350/96 C |
| 4,006,963 A | 2/1977 | Baues et al. | 350/96 |
| 4,018,228 A | 4/1977 | Goosen | 128/305 |
| 4,022,947 A | 5/1977 | Grubb et al. | 428/432 |
| 4,045,124 A | 8/1977 | Pollack et al. | 350/160 LC |
| 4,124,947 A | 11/1978 | Kuhl et al. | 40/453 |
| 4,210,132 A | 7/1980 | Perlin | 128/1 R |
| 4,368,736 A | 1/1983 | Kaster | 128/334 C |
| 4,374,371 A | 2/1983 | Narancic | 337/159 |
| 4,416,540 A | 11/1983 | Nicholson | 350/3.69 |
| 4,560,249 A | 12/1985 | Nishiwaki et al. | 350/162.17 |
| 4,666,672 A | 5/1987 | Miller et al. | 422/68 |
| 4,673,241 A | 6/1987 | Nishiwaki et al. | 350/3.64 |
| 4,688,900 A | 8/1987 | Doane et al. | 350/347 |
| 4,728,547 A | 3/1988 | Vaz et al. | 428/1 |
| 4,809,713 A | 3/1989 | Grayzel | 128/785 |
| 4,810,063 A | 3/1989 | Fergason | 350/347 V |
| 4,818,070 A | 4/1989 | Gunjima et al. | 350/334 |
| 4,832,424 A | 5/1989 | McGrew | 350/3.65 |
| 4,856,876 A | 8/1989 | Fergason | 350/350 F |
| 4,857,425 A | 8/1989 | Phillips | 430/1 |
| 4,891,152 A | 1/1990 | Miller et al. | 252/299.01 |
| 4,923,269 A | 5/1990 | Healey | 350/96.15 |
| 4,929,240 A | 5/1990 | Kirsch et al. | 606/151 |
| 4,930,674 A | 6/1990 | Barak | 227/179 |
| 4,938,568 A | 7/1990 | Margerum et al. | 350/334 |
| 4,942,102 A | 7/1990 | Keys et al. | 430/1 |
| 4,983,176 A | 1/1991 | Cushman et al. | 606/151 |
| 4,994,204 A | 2/1991 | Doane et al. | 252/299.01 |
| 5,003,386 A | 3/1991 | Doyle et al. | 358/90 |
| 5,011,624 A | 4/1991 | Yamagishi et al. | 252/299.5 |
| 5,014,709 A | 5/1991 | Bjelkhagen et al. | 128/654 |
| 5,015,249 A | 5/1991 | Nakao et al. | 606/142 |
| 5,047,039 A | 9/1991 | Avant et al. | 606/148 |
| 5,047,040 A | 9/1991 | Simpson et al. | 606/159 |
| 5,084,203 A | 1/1992 | Sansone et al. | 252/299.5 |
| 5,096,282 A | 3/1992 | Margerum | 359/3 |
| 5,105,298 A | 4/1992 | Schellenberg | 359/3 |
| 5,136,666 A | 8/1992 | Anderson et al. | 385/24 |
| 5,144,690 A | 9/1992 | Domash | 385/12 |
| 5,166,813 A | 11/1992 | Metz | 359/15 |
| 5,170,925 A | 12/1992 | Madden et al. | 227/175 |
| 5,174,276 A | 12/1992 | Crockard | 128/4 |
| 5,182,180 A | 1/1993 | Gambogi, Jr. et al. | 430/1 |
| 5,182,665 A | 1/1993 | O'Callaghan et al. | 359/95 |
| 5,188,638 A | 2/1993 | Tzakis | 606/153 |
| 5,198,912 A | 3/1993 | Ingwall et al. | 359/3 |
| 5,210,630 A | 5/1993 | Heynderickx et al. | 359/106 |
| 5,220,928 A | 6/1993 | Oddsen et al. | 128/898 |
| 5,227,859 A | 7/1993 | Leib et al. | 556/347 |
| 5,227,906 A | 7/1993 | Tokumitsu | 359/117 |
| 5,234,447 A | 8/1993 | Kaster et al. | 606/153 |
| 5,235,445 A | 8/1993 | Hirai et al. | 359/52 |
| 5,240,636 A | 8/1993 | Doane et al. | 252/299.01 |
| 5,258,008 A | 11/1993 | Wilk | 606/219 |
| 5,264,950 A | 11/1993 | West et al. | 359/51 |
| 5,270,843 A | 12/1993 | Wang | 359/52 |
| 5,272,550 A | 12/1993 | Dickson et al. | 359/3 |
| 5,291,317 A | 3/1994 | Newswanger | 359/15 |
| 5,299,289 A | 3/1994 | Omae et al. | 359/95 |
| 5,303,322 A | 4/1994 | Winston et al. | 385/146 |
| 5,313,317 A | 5/1994 | Saburi et al. | 359/13 |
| 5,323,251 A | 6/1994 | Coates et al. | 359/51 |
| 5,328,800 A | 7/1994 | Yokoya et al. | 430/203 |
| 5,330,264 A | 7/1994 | Ando et al. | 359/12 |
| 5,330,486 A | 7/1994 | Wilk | 606/139 |
| 5,332,618 A | 7/1994 | Austin | 428/216 |
| 5,340,701 A | 8/1994 | Desobry | 430/325 |
| 5,354,498 A | 10/1994 | Akashi et al. | 252/299.01 |
| 5,356,557 A | 10/1994 | Jubb et al. | 252/299.01 |
| 5,363,228 A | 11/1994 | DeJule et al. | 359/117 |
| 5,366,462 A | 11/1994 | Kaster et al. | 505/153 |
| 5,376,095 A | 12/1994 | Ortiz | 505/143 |
| 5,384,067 A | 1/1995 | Doane et al. | 252/299.01 |
| 5,453,338 A | 9/1995 | Suga et al. | 430/1 |
| 5,471,326 A | 11/1995 | Hall et al. | 359/15 |
| 5,488,681 A | 1/1996 | Deacon et al. | 385/37 |
| 5,499,118 A | 3/1996 | Wreede et al. | 359/12 |
| 5,529,861 A | 6/1996 | Redfield | 43/1 |
| 5,544,268 A | 8/1996 | Bischel et al. | 385/4 |
| 5,547,786 A | 8/1996 | Brandstetter et al. | 430/1 |
| 5,593,615 A | 1/1997 | Nerad et al. | 242/299.01 |
| 5,641,426 A | 6/1997 | Nerad et al. | 252/299.01 |
| 5,648,857 A | 7/1997 | Ando et al. | 359/12 |
| 5,661,533 A | 8/1997 | Wu et al. | 349/169 |
| 5,661,577 A | 8/1997 | Jenkins et al. | 359/11 |
| 5,680,233 A | 10/1997 | Faris et al. | 349/61 |
| 5,682,214 A | 10/1997 | Amako et al. | 349/74 |
| 5,695,682 A | 12/1997 | Doane et al. | 252/299.01 |
| 5,698,134 A | 12/1997 | Jubb et al. | 252/299.01 |
| 5,698,343 A | 12/1997 | Sutherland et al. | 430/1 |
| 5,701,375 A | 12/1997 | Duck et al. | 385/74 |
| 5,706,375 A | 1/1998 | Mihailov et al. | 385/25 |
| 5,725,970 A | 3/1998 | Martin et al. | 430/2 |
| 5,731,853 A | 3/1998 | Taketomi et al. | 349/15 |
| 5,734,485 A | 3/1998 | Buchkremer et al. | 359/25 |
| 5,748,272 A | 5/1998 | Tanaka et al. | 349/86 |
| 5,751,452 A | 5/1998 | Tanaka et al. | 359/52 |
| 5,771,320 A | 6/1998 | Stone | 385/16 |
| 5,832,148 A | 11/1998 | Yariv | 385/16 |
| 5,852,504 A | 12/1998 | Kato et al. | 359/9 |
| 5,862,214 A | 1/1999 | Aggus et al. | 379/435 |
| 5,875,012 A | 2/1999 | Crawford et al. | 349/74 |
| 5,915,051 A | 6/1999 | Damask et al. | 385/16 |
| 5,930,011 A | 7/1999 | Gambogi, Jr. et al. | 359/15 |
| 5,937,115 A | 8/1999 | Domash | 385/16 |
| 5,942,157 A | 8/1999 | Sutherland et al. | 252/582 |
| 6,115,152 A | 9/2000 | Popovich et al. | 353/30 |
| 6,166,800 A * | 12/2000 | Silverstein et al. | 349/201 |
| 6,172,778 B1 | 1/2001 | Reinhorn et al. | 359/15 |
| 6,192,177 B1 | 2/2001 | Amundson et al. | 385/37 |
| 6,211,976 B1 | 4/2001 | Popovich et al. | 359/15 |
| 6,285,500 B1 | 9/2001 | Ranalli et al. | 359/497 |
| 6,421,109 B1 | 7/2002 | Popovich | 349/202 |
| 6,545,739 B1 | 4/2003 | Matsumoto et al. | 349/198 |
| 6,567,573 B1 | 5/2003 | Domash et al. | 385/16 |
| 6,618,104 B1 | 9/2003 | Date et al. | 349/86 |
| 2001/0004279 A1 | 6/2001 | Sako et al. | 349/158 |
| 2001/0010575 A1 | 8/2001 | Yoshida et al. | 349/141 |
| 2001/0033419 A1 | 10/2001 | Odhner et al. | 359/573 |
| 2002/0054251 A1 | 5/2002 | Maruyama et al. | 349/88 |
| 2003/0091271 A1 | 5/2003 | Dragone | 385/20 |

FOREIGN PATENT DOCUMENTS

| | | |
|---|---|---|
| DE | 44 08 746 A1 | 9/1995 |
| EP | 0 087 281 A1 | 8/1983 |
| EP | 0 422 689 A2 | 4/1991 |
| EP | 0 672 386 A1 | 9/1995 |
| EP | 0 867 749 A2 | 3/1998 |
| EP | 0 856 765 A1 | 8/1998 |
| EP | 0 856 766 A2 | 8/1998 |
| EP | 0 856 768 A2 | 8/1998 |
| GB | 2 222 696 | 3/1990 |
| GB | 2 281 566 | 3/1995 |
| GB | 2 292 745 | 3/1996 |
| JP | 60189729 A | 9/1985 |
| JP | 1-68784 A | 3/1989 |

| | | |
|---|---|---|
| JP | 3-188479 A | 8/1991 |
| JP | 6-190185 | 4/1994 |
| JP | 10319237 | 12/1998 |
| SU | 1635966 | 3/1991 |
| WO | WO 81/00668 | 3/1981 |
| WO | WO 89/06264 | 7/1989 |
| WO | WO 94/04958 | 3/1994 |
| WO | WO 95/17127 | 6/1995 |
| WO | WO 95/29966 | 11/1995 |
| WO | WO 95/29967 | 11/1995 |
| WO | WO 97/27519 | 1/1997 |
| WO | WO 98/04650 | 2/1998 |
| WO | WO 99/09440 | 8/1998 |

OTHER PUBLICATIONS

Written Opinion for Application No. PCT/US97/12577, dated Apr. 28, 1998 (mailing date).
Preliminary Examination Report for Application No. PCT/US97/12577, dated Sep. 3, 1998 (mailing date).
European Search Report for Application No. EP 97 93 7988, dated Oct. 13, 1999.
International Search Report, dated Jul. 17, 2001.
International Search Report of Application No. PCT/US01/40691, dated Sep. 5, 2001 (mailing date).
Written Opinion for Application No. PCT/US01/40691, dated May 15, 2002 (mailing date).
Preliminary Examination Report for Application No. PCT/US01/40691, dated Sep. 10, 2002 (mailing date).
M. Escuti, C. C. Bowley, G. P. Crawford, S. Zumer, Jadranska, Solvenia, "5.3: A Model of the Fast-Switching Polymer-Stabilized IPS Configuration," *SID International Symposium, Digest of Technical Papers*, p. 32; May, 1999.
Sutherland, Richard L., "Polarization and Switching Properties of Holographic Polymer-Dispersed Liquid-Crystal Gratings. I. Theoretical Model," *J. Opt. Soc. Am. B*, vol. 19, No. 12, pp. 2995-3003, Dec. 2002.
Sutherland, Richard L., et al., "Polarization and Switching Properties of Holographic Polymer-Dispersed Liquid-Crystal Gratings. II. Experimental Investigations," *J. Opt. Soc. Am. B*, vol. 19, No. 12, pp. 3004-3012, Dec. 2002.
Sutherland, Richard L., et al., "Evolution of Asistropic Reflection Gratings Formed in Holographic Polymer-Dispersed Liquid Crystals," *Applied Physics Letters*, vol. 79, No. 10, pp. 1420-1422, Sep. 3, 2001.
Bowley, Chris C., et al., "Variable-Wavelength Switchable Bragg Gratings Formed in Polymer-Dispersed Liquid Crystals," *Applied Physics Letters*, vol. 79, No. 1, pp. 9-11, Jul. 2, 2001.
"Handbook of Advanced Electronic and Photonic Materials and Devices," *Liquid Crystals, Display, and Laser Materials*, vol. 7, Academic Press, Cover, Copyright Page, Table of Contents (xiii-xvi), pp. 67-103, Copyright 2001.
Cramer, Neil B., et al., "Kinetics of Thiol-Ene and Thiol-Acrylate Photopolymerizations with Real-Time Fourier Transform Infrared," *Journal of Polymer Science: Part A: Polmer Chemistry*, vol. 39, pp. 3311-3319, 2001.
Warren, Garfield T., et al., "P-81: In-Situ Spectroscopy of Holographically Formed Polymer-Dispersed Liquid Crystal Materials for High Performance Reflective Display Applications," *SID Digest of Technical Papers*, San Jose, pp. 866-869, 2001.
Sutherland, Richard L., et al., "Switchable Holograms for Displays and Telecommunications," *Proceedings of SPIE*, vol. 4463, pp. 1-10, 2001.
Bowley, C. C., et al., "Improved Reflective Display Based on Polymer-Dispersed Liquid Crystals," *J. Opt. Technol.*, vol. 67, No. 8, pp. 717-722, Aug. 2000.
Domash, L., et al., "Holographic PDLC for Photonic Applications," *Proceedings of SPIE*, vol. 4107, pp. 46-58, 2000.
Bunning, T. J., et al., "Holographically Polymer-Dispersed Liquid Crystals (H-PDLCs)," *Annu. Rev. Mater. Sci.*, vol. 30, pp.83-115, 2000.

Cole, Michael C., et al., "Photoinitiatorless Photopolymerizations Involving Monomers That Form Charge Transfer Complexes," *Radtech Technical Proceedings*, Tokyo, Japan, pp. 211-220, Dec. 2000.
R. T. Pogue et al., "Monomer Functionally Effects in the Anisotropic Phase Separation of Liquid Crystals," *Polymer 41*, pp. 733-741, 2000.
Natarajan, L. V., et al., "Electrically Switchable Reflection Gratings in Polymer Dispersed Liquid Crystals," *Mat. Res. Soc. Symp. Proc.* vol. 559, pp. 109-116, 1999.
Klosterman, A. M., et al., "Voltage Creep in Holographic PDLC Gratings," *Mat. Res. Soc. Symp. Proc.*, vol. 559, pp. 129-134, 1999.
C. C. Bowley, A. K. Fontecchio, G. P. Crawford, H. Yuan, "Electro-Optic Investigations of H-PDLCS: The Effect of Monomer Functionality on Display Perfromance," *SID International Symposium, Digest of Technical Papers*, May 1999, p. 958.
Chris C. Bowley, Haiji Yuan, Gregory P. Crawford, "Morphology of Holographically-Formed Polymer Dispersed Liquid Crystals (H-PDLC)," *Mol. Cryst. Liq. Cryst.*, vol. 331, pp. 209-216, 1999.
J. A. Firehammer, N. M. Lawandy, G. P. Crawford, "Lasing Pixels: a New Application for Polymer Dispersed Liquid Crystals (PDLCs)," *Mol. Cryst. Liq. Cryst.*, vol. 331, p. 165, 1999.
C. C. Bowley, et al., "Advances in Holographic Polymer Dispersed Liquid Crystal Technology," in *Liquid Crystal Materials and Devices, Mat. Res. Soc. Symposium Proceedings*, vol. 559, pp. 97-107, 1999.
M. Date, et al., "Full-Color Reflective Display Device Using Holographically Fabricated Polymer-Dispersed Liquid Crystal (HPDLC)," *Journal of the Society for Information Display (SID)*, vol. 7, pp. 17-22, Apr. 5-7, 1999.
Seferis, James C., "Refractive Indices of Polymers," *Polymer Handbook*, 4th Edition, John Wiley & Sons, Inc., pp. 571-582, Copyright 1999.
Richard L. Sutherland, et al., "Switchable Holograms for Displays and Other Applications," *SPIE Proceedings*, vol. 3421, pp. 8-18, Jun. 1998.
Takizawa, Kuniharu, et al., "Polarization-Independent Optical Fiber Modulator By Use of Polymer-Dispersed Liquid Crystals," *Applied Optics*, vol. 37, No. 15, pp. 3181-3189, May 20, 1998.
L. V. Natarajan, R. L. Sutherland, T. J. Bunning, V. P. Tondiglia, "Holographic PDLCs for Optical Beam Modulation, Deflection, and Dynamic Filter Applications," *Proceedings of SPIE*, vol. 3292, pp. 44-51, 1998.
K. Thilo Weitzel, et al., "Hologram Recording in DuPont Photopolymer Films by Use of Pulse Exposure," *Optics Letter*, vol. 22, No. 24, Dec. 15, 1997.
L. V. Natarajan, et al., "Electrically Switchable Holograms Containing Novel PDLC Structures," *SPIE Proceedings*, vol. 3143, pp. 182-190, Jul. 28-29, 1997.
N. M. Lawandy, J. A. Firehammer, S. D. Vartak, G. P. Crawford, "Lasing Pixel PDLC Light Valves for Projection Applications," *SID International Symposium, Digest of Technical Papers*, p. 1001, May 1997.
Montemazzani, G., et al., "Light Diffraction at Mixed Phase and Absorption Gratings in Anisotropic Media for Arbitrary Geometries," *Physical Review E*, vol. 55, No. 1, pp. 1035-1047, Jan. 1997.
L. V. Natarajan, R. L. Sutherland, V. P. Tondiglia, T. J. Bunning, R. M. Neal, "Electrically Switchable Holograms Containing Novel PDLC Structures," *Proceedings of SPIE*, vol. 3143, pp. 182-190, 1997.
G. P. Crawford, T. G. Fiske L. D. Silverstein, "Reflective Color LCDs Based on H-PDLC and PSCT Technologies," *Journal of the Society for Information Display*, p. 45, 1997.
Tondiglia, V. P., et al., "Effects of Varying Surfactants on the Electro-Optical Switching Characteristics of Volume Holograms Recorded in PDLC's," *Mat, Res. Soc. Symp. Proc.*, vol. 479, 235-340, 1997.
V. N. Mikhailov, et al., "Pulse Hologram Recording in Dupont's Photopolymer Films," *SPIE*, vol. 3011, pp. 200-202, 1997.
D. Schwarze-Haller and F. Noack, M. Vilfan, G. P. Crawford, "Nuclear Magnetic Resonance Field-Cycling Proton Relaxation Study of Polymer Dispersed Liquid Crystals," *J. Chem. Phys.*, vol. 105(11), p. 4823, Sep. 15, 1996.
G. P. Crawford, et al., "Reflective Color LCDs Based on H-PDLC and PSCT Technologies," *SID International Symposium, Digest of Applications Papers*, pp. 99, May 14-16, 1996.

Lawrence H. Domash, et al., "Switchable-Focus Lenses in Holographic Polymer Dispersed Liquid Crystal," *SPIE*, vol. 2689, pp. 188-194, May 1996.

R. L. Sutherland, L. V. Natarajan, V. P. Tondiglia, T. J. Bunning, "The Physics of Photopolymer-Liquid Crystal Composite Holographic Gratings," *SPIE*, vol. 2689, pp. 158-169, May 1996.

T. J. Bunning, S. H. Chen, William Hawthorne, Tisato Kajiyama, Naoyuki Koide, "Liquid Crystals for Advanced Technologies," *Material Research Society*, pp. 331-343, Apr. 8-11, 1996.

R. L. Sutherland et al., "Switchable Bragg Gratings Formed in situ Within a Polymer-Dispersed Liquid Crystal Composite Medium," *Materials Research Society Symp. Proc.*, vol. 425, pp. 331-341, Apr. 8-11, 1996.

Timothy J. Bunning, et al., "The Effects of Eliminating the Chain Extender and Varying the Grating Periodicity on Morphology of Holographically Wriiten Bragg Gratings," *SPIE Proceedings*, vol. 2651, pp. 44-54, Jan. 31-Feb. 1, 1996.

G. S. Iannacchione, et al., "Deuterium NMR and Morphology Study of Polymer-Dispersed Liquid-Crystal Bragg Gratings," *Europhysics Letters*, vol. 36, No. 6, pp. 425-430, 1996.

T. J. Bunning, et al., "Morphology of Reflection Holograms Formed in Situ Using Polymer-Dispersed Liquid Crystals," No. 14, pp. 3147-3150, 1996.

L. V. Natarajan, R. L. Sutherland, V. P. Tondiglia, T. J. Bunning, "Electro-Optical Switching Characteristics of Volume Holograms in Polymer Dispersed Liquid Crystals," *Journal of Nonlinear Optical Physics and Materials*, pp. 89-98, Jul. 17, 1995.

Richard L. Sutherland, et al., "Analysis of Periodic Polymer-Dispersed Liquid Crystal Structures for Dynamic Hologram Applications," *SPIE Proceedings*, vol. 2532, pp. 309-318, Jul. 10-12, 1995.

V. P. Tondiglia, L. V. Natarajan, R. L. Sutherland, T. J. Bunning, W. W. Adams, "Volume Holographic Image Storage and Electro-Optical Readout in a Polymer-Dispersed Liquid-Crystal Film," *Optics letters*, vol. 20, No. 11, pp. 1325-1327, Jun. 1, 1995.

Richard L. Sutherland, et al., "Switchable Holograms in New Photopolymer-Liquid Crystal Composite Material," *SPIE Proceedings*, vol. 2404, pp. 132-143, Feb. 9-10, 1995.

Drzaic, P. S., "Phase Separation Methods for PDLC Films," in *Liquid Crystal Dispersions, World Scientific*, Singapore, pp. 30-59, 1995.

T. J. Bunning, L. V. Natarajan, V. Tondiglia, R. L. Sutherland, D. L. Vezie, W. W. Adams, "The Morphology and Performance of Holographic Transmission Gratings Recorded in Polymer Dispersed Liquid Crystals," *Polymer*, vol. 36, No. 14, p. 2699, 1995.

N. Kawatsuki and H. Ono, "Electro-Optical Properties of Polymer/(Liquid Crystal) Composite Film Fabricated by Two-Step Phase Separation Method," *Chemistry Letters*, No. 5, pp. 333-334, 1995.

R. L. Sutherland, V. P. Tondiglia, L. V. Natarajan, T. J. Bunning, W. W. Adams, "Electrically Switchable Volume Gratings in Polymer-Dispersed Liquid Crystals," *Appl. Phys. Lett.*, 64 (9), p. 1074-1076, Feb. 28, 1994.

Richard L. Sutherland, et al., "Development of Photopolymer-Liquid Crystal Composite Materials for Dynamic Hologram Applications," *SPIE Proceedings*, vol. 2152, pp. 303-313, Jan. 26-28, 1994.

J. Zhang, et al., "Switchable Holograms Recorded in Liquid Crystalline Monomers," *SPIE*, vol. 2042, pp. 238-247, Jan. 1994.

Keiji Tanaka, Kinya Kato, Shinji Tsuru, Shigenobu Sakai, "Holographically Formed Liquid-Crystal/Polymer Device for Reflective Color Display," *Journal of the Society for Information Display*, Volume, pp. 37-40, 1994.

Jacobine, A. F., "Thiol-Ene Photopolymers (Chapter 7)," in *Radiation Curing in Polymer Science and Technology—vol. III, Polymerization Mechanisms, Elsevier Applied Science*, Cover Page, Copyright Page, Table of Contents (v-vi), pp. 219-268, Copyright 1993.

D. J. Lougnot, et al., "Photopolymers for Holographic Recording: IV. New Self-Processing Formulations Based on β-Hydroxy Ethyloxazolidone Acrylate," *Pure Appl. Opt.*, vol. 2, pp. 383-392, 1993.

R. L. Sutherland, L. V. Natarajan, V. P. Tondiglia, T. J. Bunning, "Bragg Gratings in an Acrylate Polymer Consisting of Periodic Polymer-Dispersed Liquid Crystal Planes," *Chem. Mater.*, vol. 5, pp. 1533-1538, 1993.

L. Domash, C. Gozewski, A. Nelson, J. Schwartz, "Programmable Beamlet Generator, Dynamic Lens, and Optical Memory Using Electrically Switched Holographic Devices," *SPIE*, vol. 2026c, "Very Large Optical Memories III," Ed. S. Kowel, 1993.

H. I. Bjelkhagen, et al., "High-Resolution Contact Denisyuk Holography," *Applied Optics*, vol. 31, No. 8, pp. 1041-1047, Mar. 10, 1992.

Hideya Murai, et al., "Electro-Optic Properties for Liquid Crystal Phase Gratings," *SPIE Proceedings*, vol. 1665, pp. 230-239, Feb.11-13, 1992.

Lawrence H. Domash, "Applications of Dynamic Holograms for Quasi-Volume Storage," *SPIE Proceedings, Very Large Optical Memories-Materials and System Architectures*, vol. 1773, 5 pp. 1992.

J. Zhang, et al., "Switchable Liquid Crystalline Photopolymer Media for Holography," *J. Am. Chem. Soc.*, vol. 114(4), pp. 1506-1507, 1992.

Richard T. Ingwall and Timothy Adams, Hologram: Liquid Crystal Composites, *SPIE Proceedings*, vol. 1555, pp. 279-290, Jul. 24-25, 1991.

A. M. Lackner, et al., "Droplet Size Control in Polymer Dispersed Liquid Crystal Films," *SPIE Proceedings*, vol. 1080, pp. 53-61, Jan. 17-18, 1989.

R. L. Sutherland, "Optical Limiters, Switches, and Filters Based on Polymer Dispersed Liquid Crystals," *SPIE Proceedings*, vol. 1080, p. 83, Jan. 17-18, 1989.

Luck, Russell M., et al., "Shrinkage in Conventional Monomers During Polymerization (Chapter 1)," in *Expanding Monomers: Synthesis, Characterization, and Applications*, CRC Press, Inc., Cover Page, Copyright Page, Table of Contents (1p.), 1-61; 1992.

Yamagishi, Frederick G., et al., "Morphological Control in Polymer-Dispersed Liquid Crystal Film Matrices," *SPIE*, vol. 1080, pp. 24-31, 1989.

Wu, Bao-Gang, et al., "Response Times and Voltages for PDLC Light Shutters," *Liquid Crystals*, vol. 5, No. 5, pp. 1453-1465, 1989.

Smith, G. W., et al., "The Interfacial Free Energy of Nematogen Droplets in an Isotropic Matrix: Determination of its Temperature Dependence from Coalescence Kinetics," *Mol. Cryst. Liq. Cryst.*, vol. 174, pp. 49-64, 1989.

G. von Bally, et al., "Gradient-Index Optical Systems in Holographic Endoscopy," *Applied Optics*, vol. 23, No. 11, pp. 1725-1729, Jun. 1, 1984.

Allan R. Tokuda, et al., "Holocamera for 3-D Micrography of the Alert Human Eye" *Applied Optics*, vol. 19, No. 13, pp. 2219-2225, Jul. 1, 1980.

Stephen A. Benton, et al., "One-Step White-Light Transmission Holography," *SPIE*, vol. 215, pp. 156-161, 1980.

Stephen A. Benton, et al., "One-Step White-Light Transmission Holography," *SPIE*, vol. 212, pp. 2-7, 1979.

Hori, Asai, and Fukai, "Field-Controllable Liquid-Crystal Phase Grating," *IEEE*, vol. ED-16, p. 1734 (4pp.), 1979.

Edited by H. Bennett, "Cooncise Chemical and Technical Dictionary, FAIC" *Chemical Publishing Co.*, Inc., 1974.

R. A. Kashnow and J. E. Biglow, "Diffraction From a Liquid Crystal Phase Grating," *Applied Optics*, vol. 12, No. 10, pp. 2302-2304, Oct. 1973.

Kogelnik, Herwig, "Coupled Wave Theory for Thick Hologram Gratings," *The Bell System Technical Journal*, vol. 48, No. 9, pp. 2909-2947, Nov. 1969.

Stoke, Funkhouser, Leonard, Indebetoew, and Zech, "Hand-Held Holography," 1 p., Sep. 19, 1966.

G. W. Stroke and A. E. Labeyrie, "White-Light Reconstruction of Holographic Images Using the Lippmann-Bragg Diffraction Effect," *Physics Letters*, vol. 20, No. 4, pp. 368-370, Mar. 1, 1966.

Non-Final Office Action for U.S. Appl. No. 11/399,516, dated Aug. 7, 2008, 11 p.

Non-Final Office Action for U.S. Appl. No. 11/399,517, dated Aug. 8, 2008, 12 pp.

Harbour, et al., "Angular Selectivity Asymmetry of Holograms Recorded in Near Infrared Sensitive Liquid Crystals Photopolymer materials," Opt. Commun., vol. 238(4-6), pp. 261-267 (Aug. 2004).

Burget, et al., Photopolymerization of Thiol-Ally Ether and Thiol Acrylate Coatings With Visible Light Photosensitive Systems, Polymer, vol. 45, pp. 6561-6567 (2004).

Garcia, et al., "Pyyromethene 567 Dye as Visible Light Photoinitiator for Free Radical Polymerization," Macromol. Chem. Phys., vol. 204(18), pp. 2233-2239 (2003).

Ghosh, et al., "Photopolymerization of Methyl Methacrylate Using a Combination of Rhodamine 6G and Benzoyl Peroxide as a Photoinitiator and Nonaqueous Media," J. Poly. Sci.: Pt. A, Poly. Chem., vol. 24, pp. 1053-1063 (1986).

Urano, et al., "Sensitization Mechanisms . . . ," J. Photopolymer Sci. & Tech., vol. 14(2), pp. 251-258 (2001).

* cited by examiner

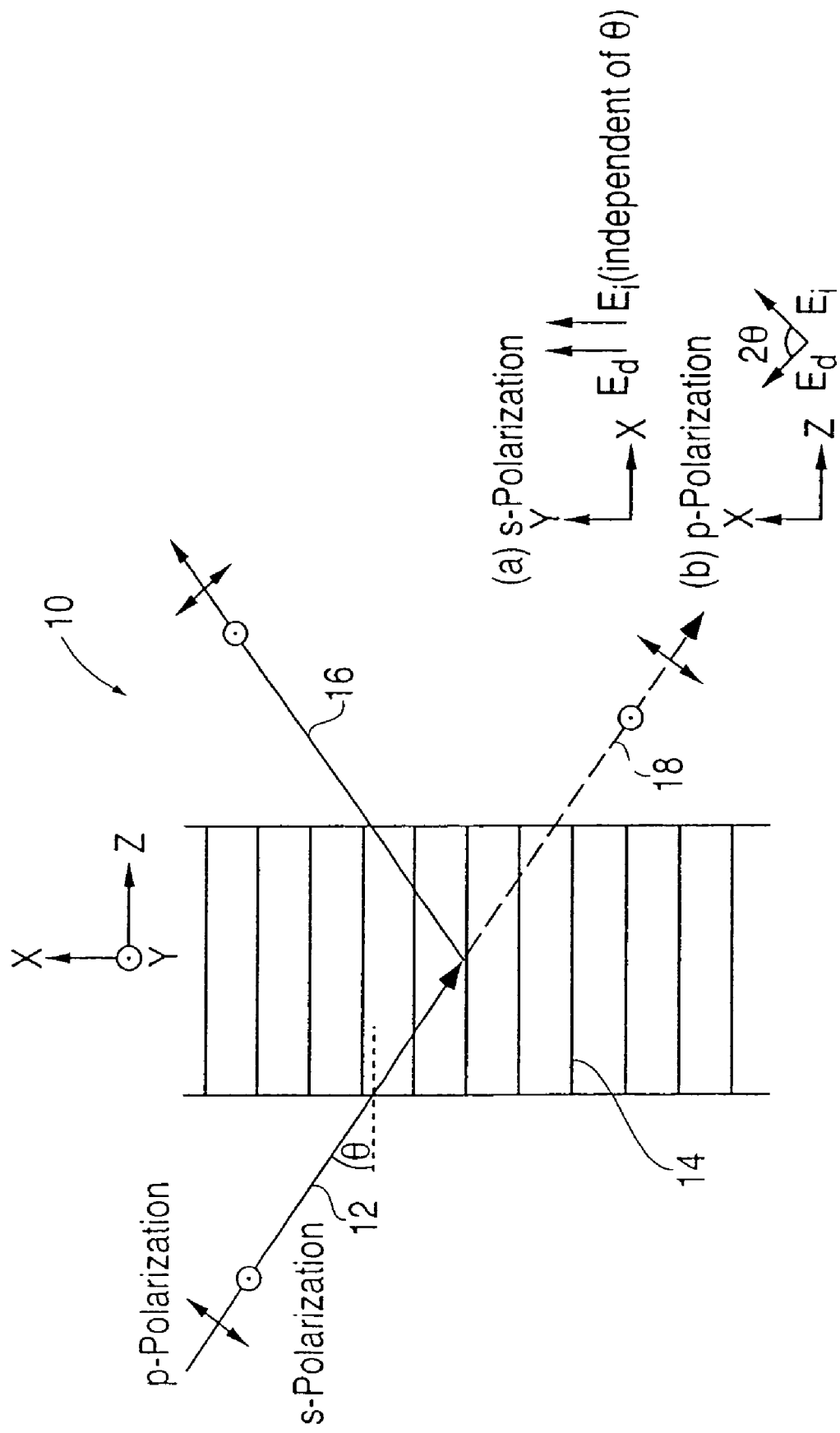

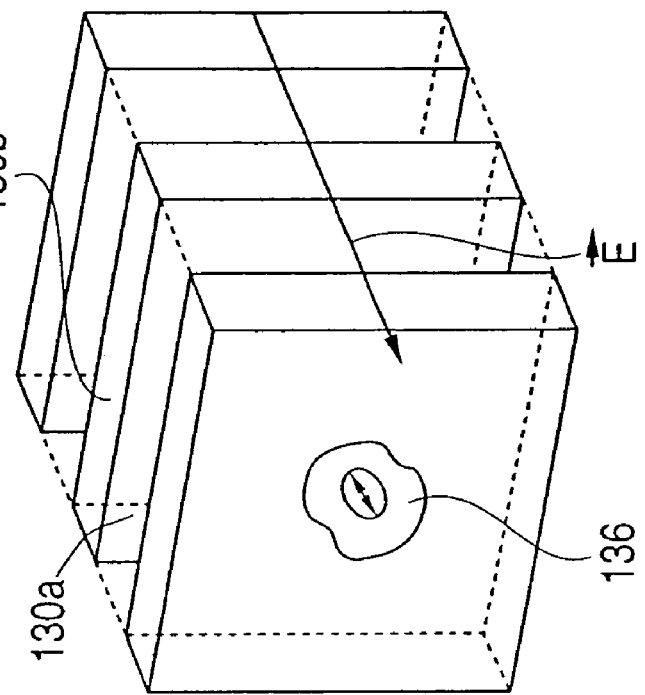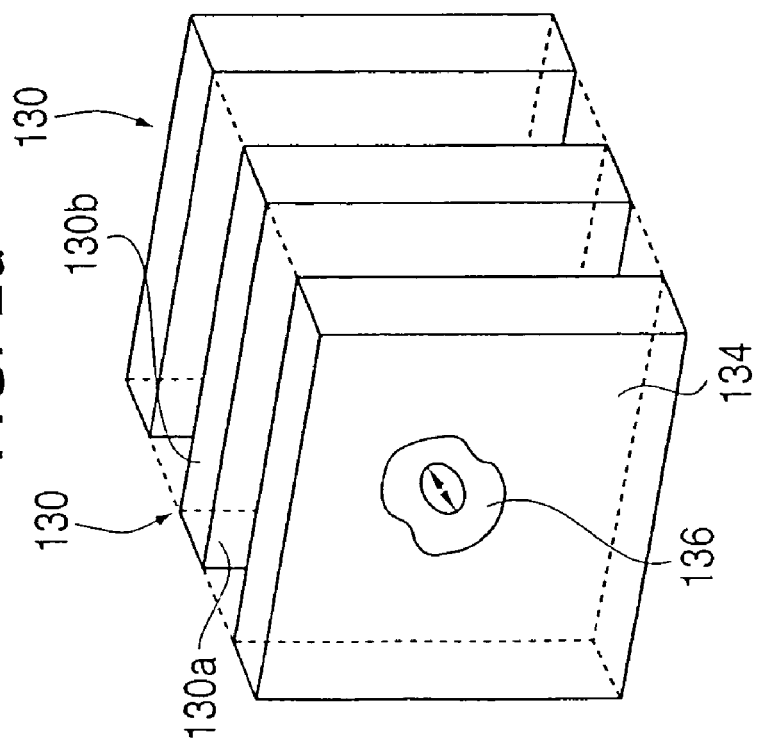

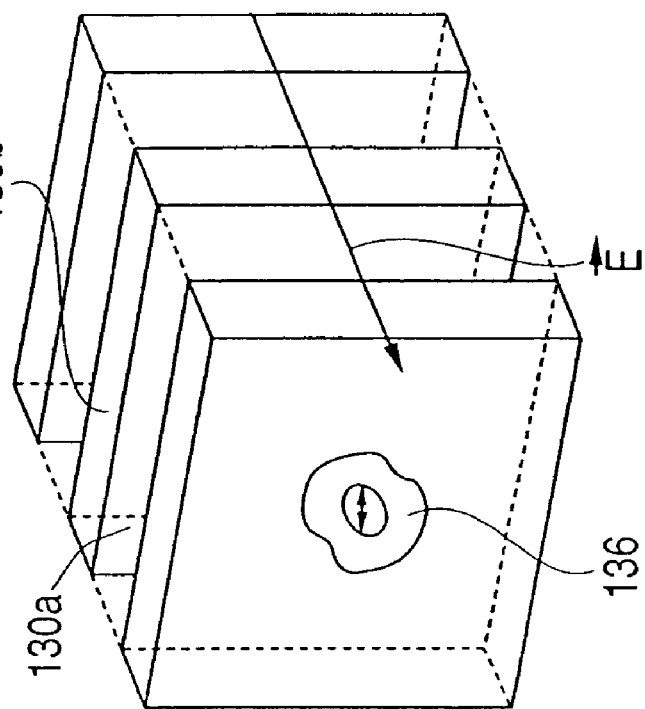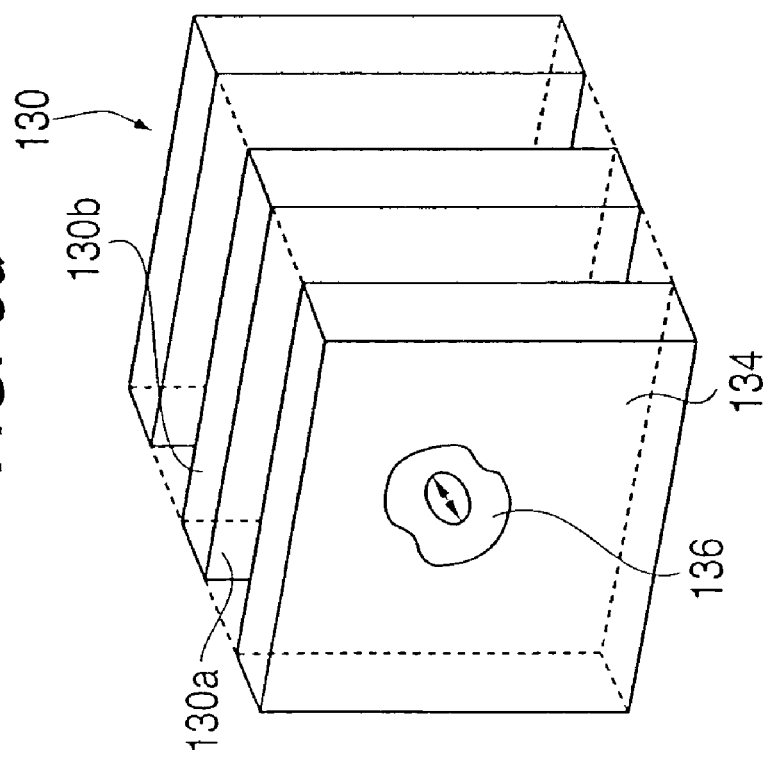

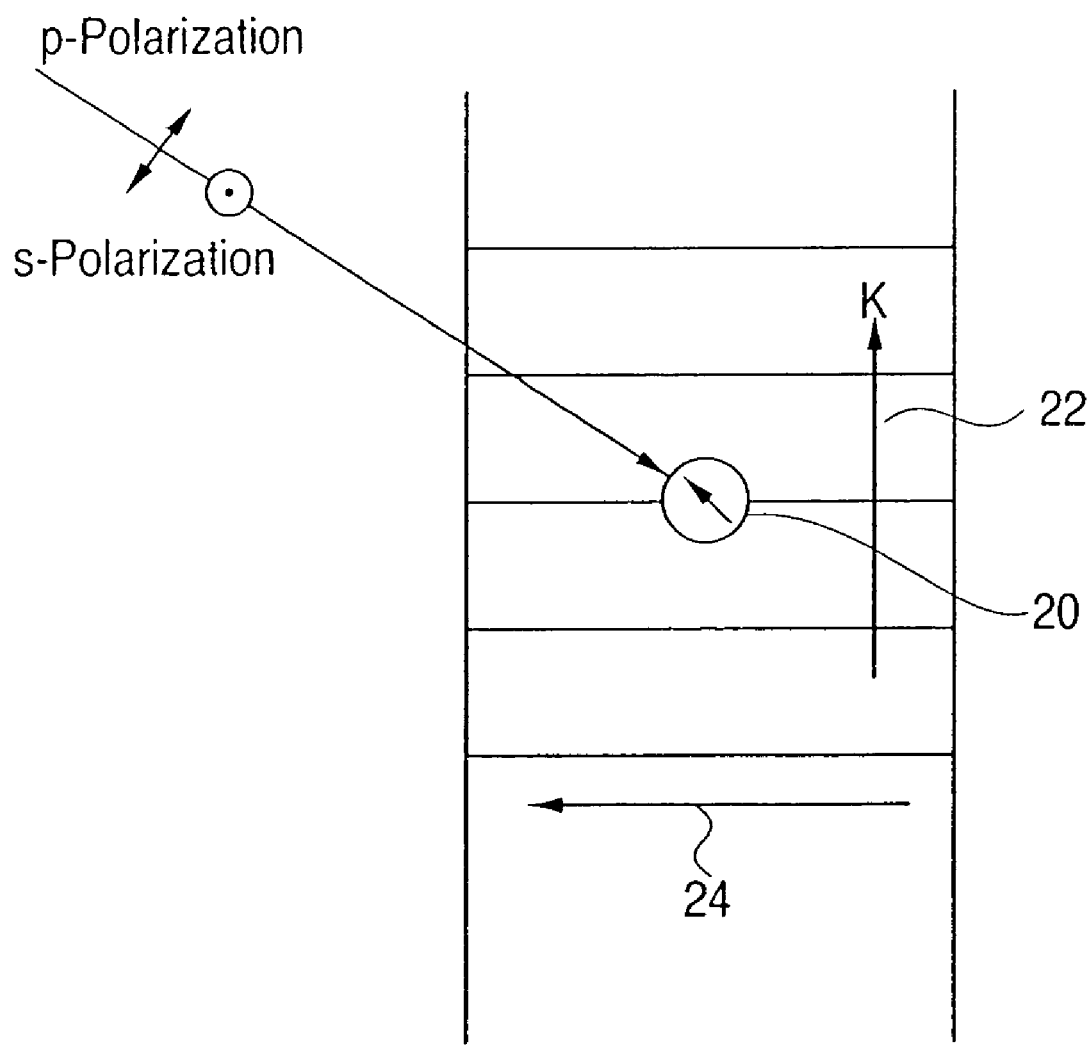

SLANTED
TRANSMISSION

SLANTED
REFLECTION

FREQUENCY DEPENDENCE OF GRATING SWITCHING VOLTAGES

LIGHT TRANSMITTED

LIGHT BLOCKED

TRANSMITTED

RETRO-REFLECTED

UNSWITCHED STATE

SWITCHED STATE

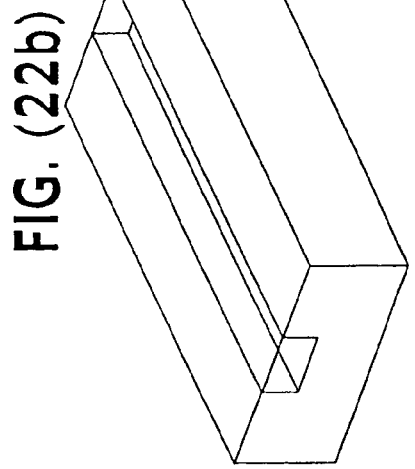
FIG. (22b)
CHANNEL FILLED WITH PRE-POLYMER/ LIQUID CRYSTAL SYRUP
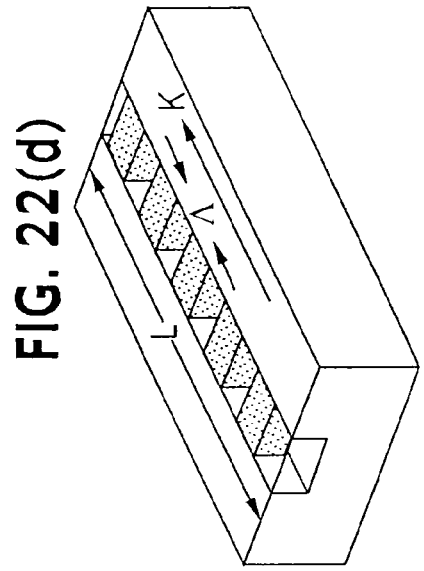
FIG. 22(d)
PDLC GRATING FORMED UPON CURING
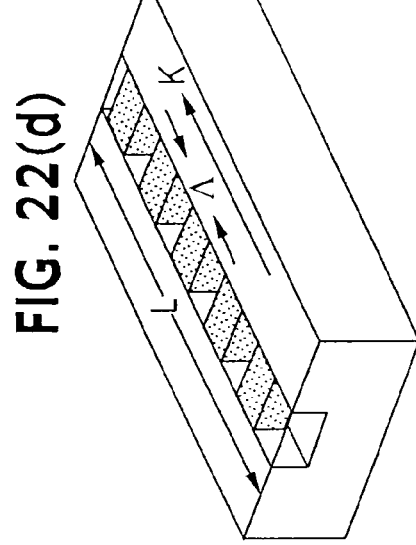
FIG. 22(a)
EMPTY CHANNEL IN GLASS OR POLYMER
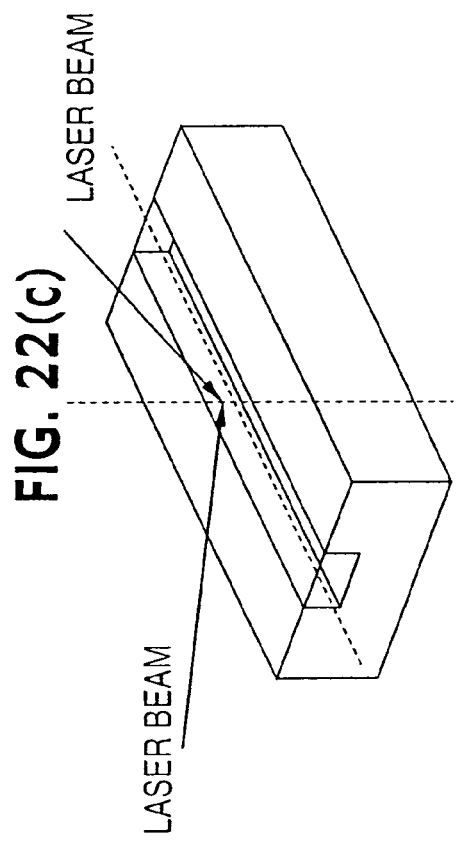
FIG. 22(c)
CHANNEL/SYRUP IRRADIATED HOLOGRAPHICALLY

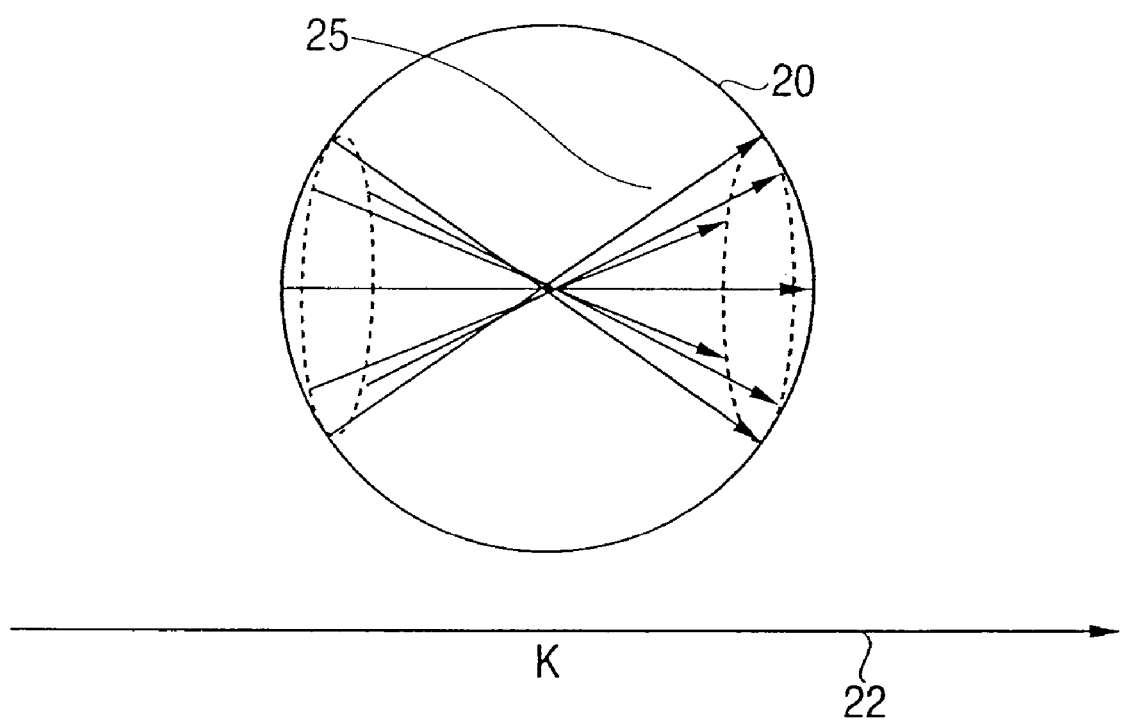

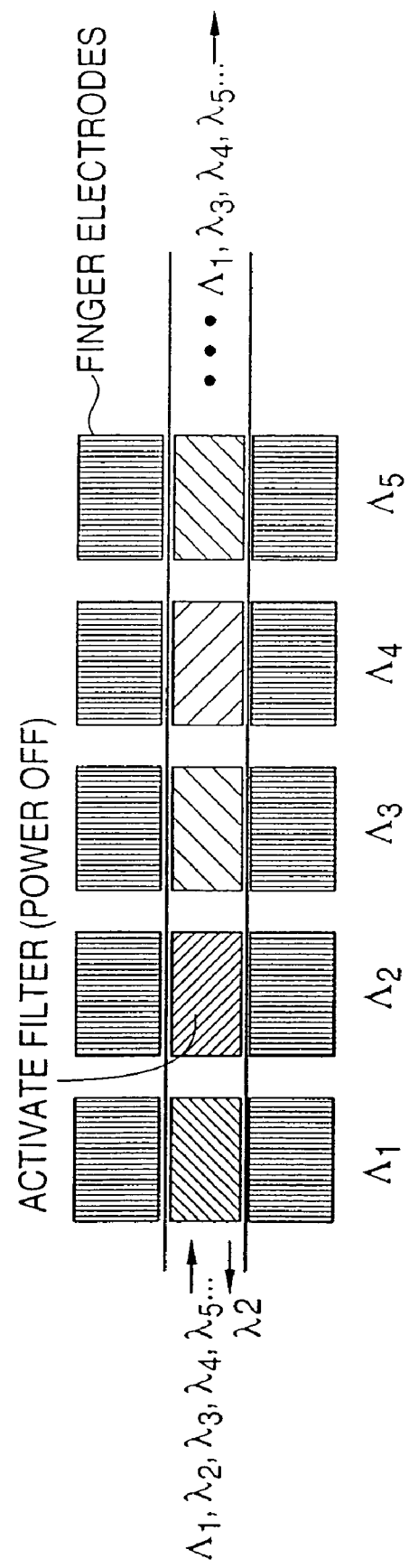

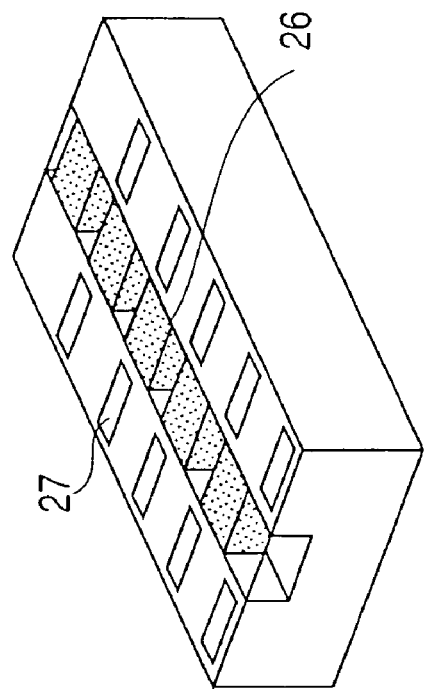
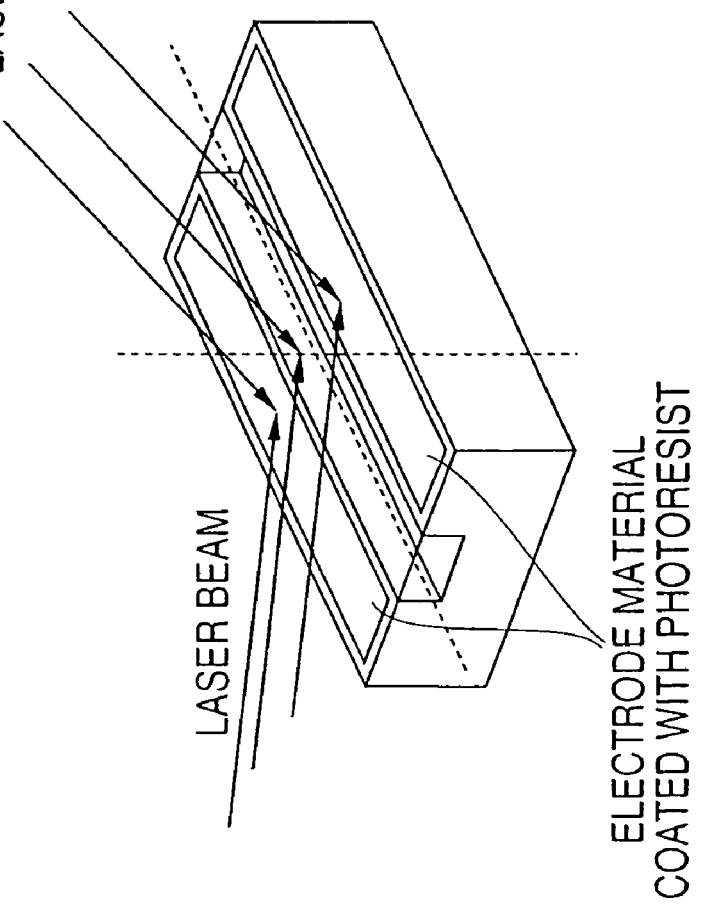

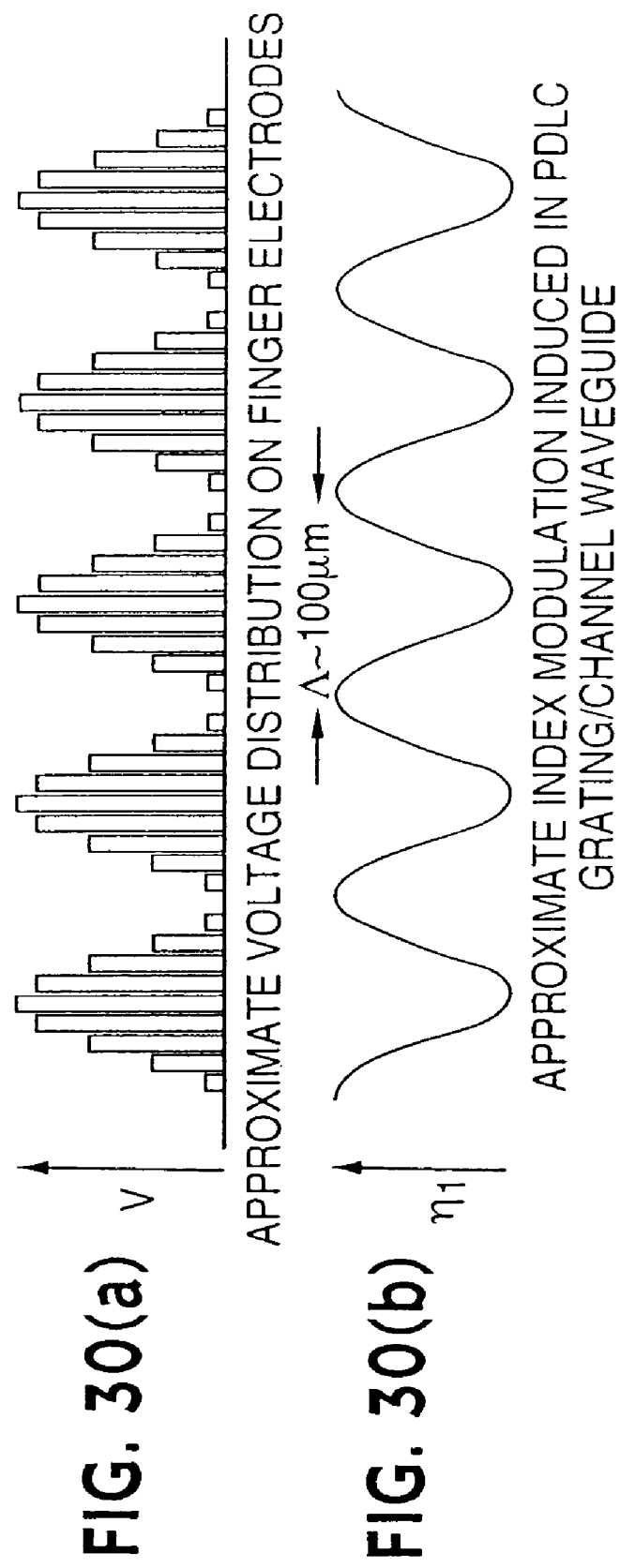

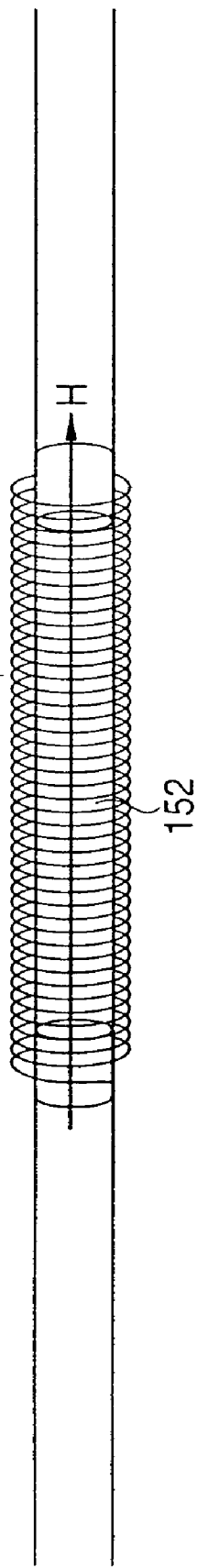

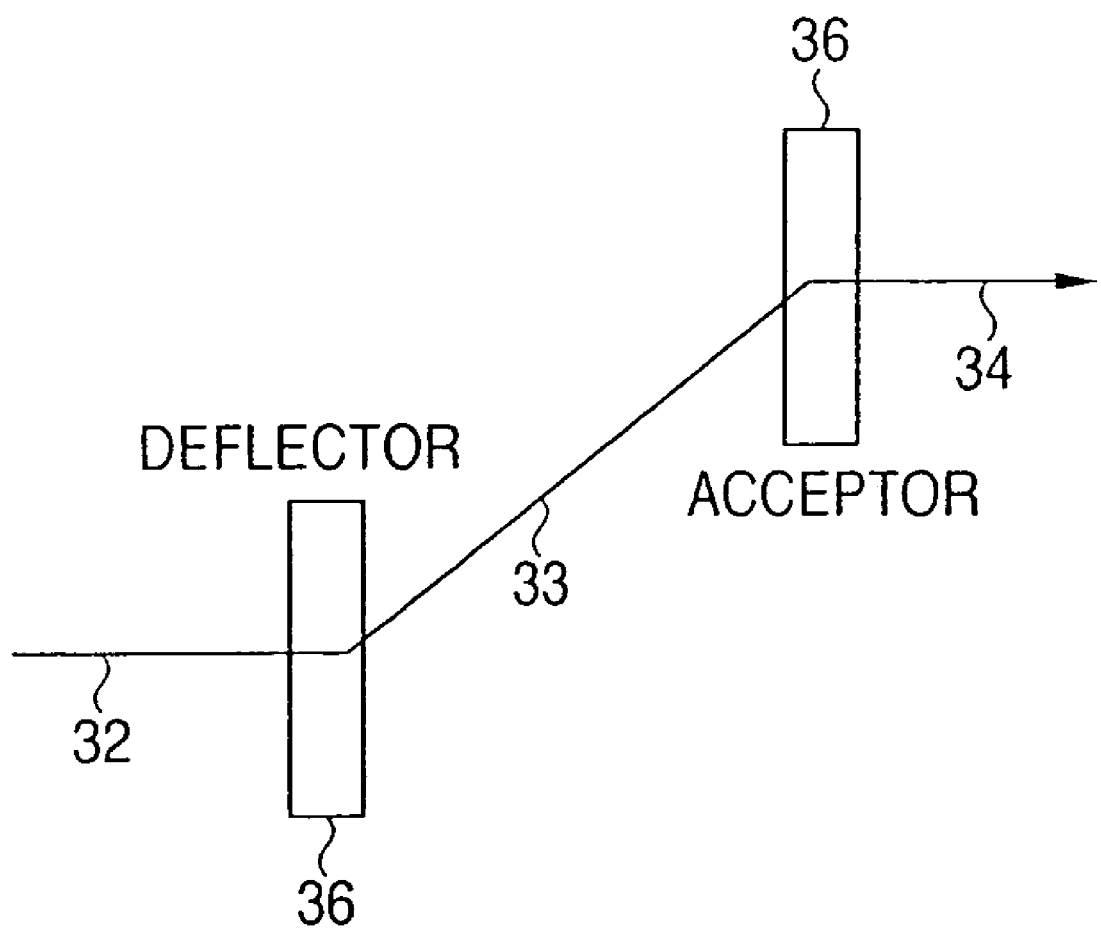

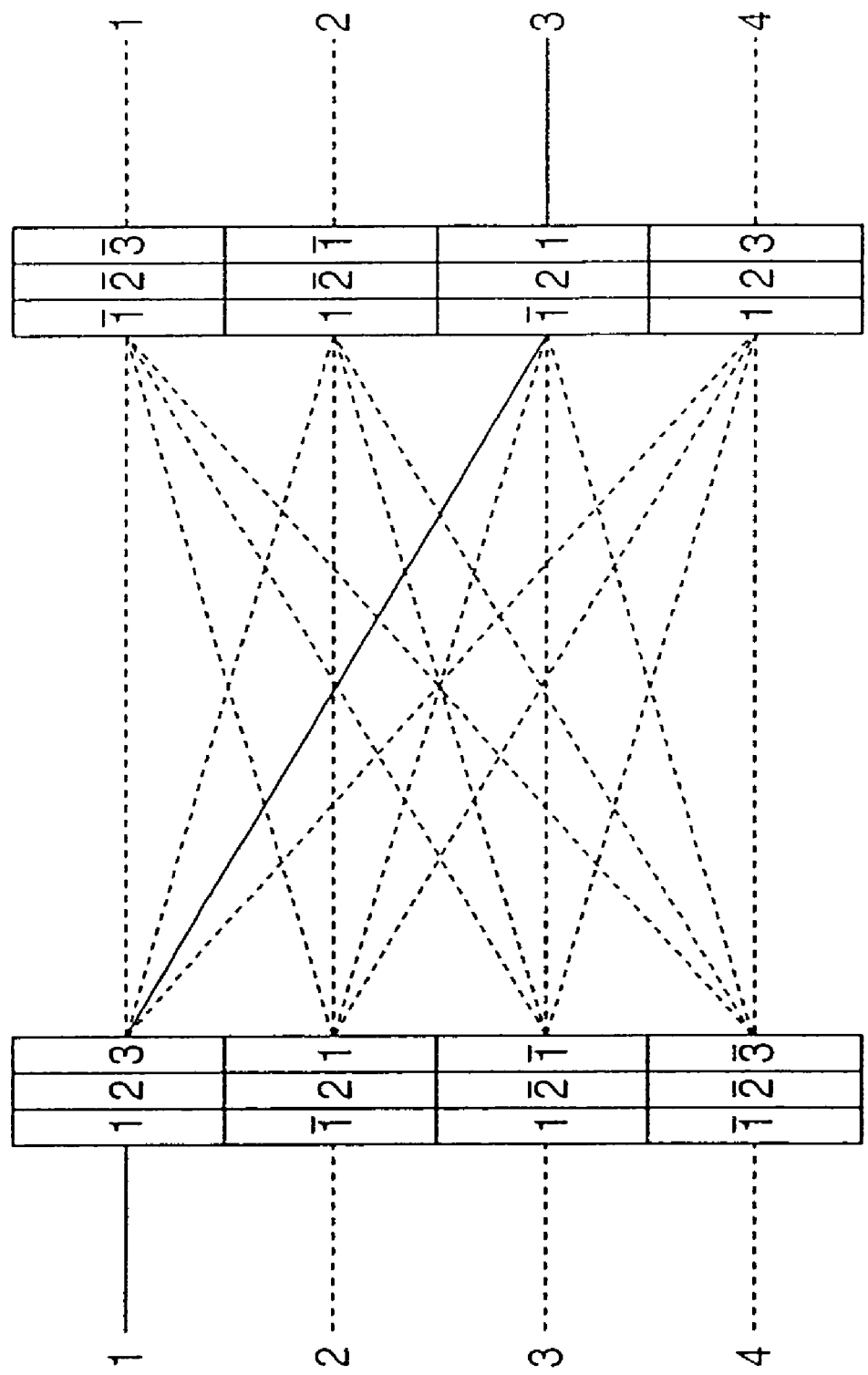

FIG. 45

INPUT

| 100% | 0% |
|---|---|
| 0% | 0% |

OUTPUT

| <1% | <1% |
|---|---|
| <1% | 96% |

1-D,1-R

OUTPUT

| <1% | 0% |
|---|---|
| 98% | 0% |

1-D, 0-R

OUTPUT

| <1% | 98% |
|---|---|
| 0% | 0% |

0-D,1-R

SWITCHABLE POLYMER-DISPERSED LIQUID CRYSTAL OPTICAL ELEMENTS

CROSS-REFERENCE TO RELATED APPLICATIONS

This application is a divisional of and claims priority to U.S. patent application Ser. No. 11/002,116, filed Dec. 3, 2004, now U.S. Pat. No. 7,068,405 which is a divisional of U.S. patent application Ser. No. 09/742,397 entitled "SWITCHABLE POLYMER-DISPERSED LIQUID CRYSTAL OPTICAL ELEMENTS" filed Dec. 22, 2000, now U.S. Pat. No. 6,867 888,which further claims priority to and incorporates by reference in its entirety provisional application Ser. No. 60/171,478, filed Dec. 22, 1999 entitled "SWITCHABLE POLYMER-DISPERSED LIQUID CRYSTAL OPTICAL ELEMENTS" and provisional application Ser. No. 60/240,771, filed Oct. 17. 2000, also entitled "SWITCHABLE POLYMER-DISPERSED lIQUID CRYSTAL OPTICAL ELEMENTS" and which is a continuation-in-part of and claims priority to U.S. patent application Ser. No. 09/033,512 entitled "SWITCHABLE VOLUME HOLOGRAM MATERIALS AND DEVICES" filed Mar. 2,1998, now U.S. Pat. No. 6,699,407; wherein U.S. patent application Ser. No. 09/033,512 is a continuation of U.S. patent application Ser. No. 08/680,292 entitled "SWITCHABLE VOLUME HOLOGRAM MATERIALS AND DEVICES" filed Jul. 12, 1996 and issued as U.S. Pat. No. 5,942,157.

BACKGROUND OF THE INVENTION

Field of the Invention

The invention relates generally to switchable grating elements for use in telecommunications optical systems. Specifically, embodiments of the present invention relate to the use of polymer-dispersed liquid crystal switchable holographic elements for wavelength selection and deflection.

BRIEF SUMMARY OF THE INVENTION

Summary of the Problem

The current worldwide expenditure for communications infrastructure is $43 billion/year. Approximately $29 billion of this is for telephone networks in the US, with the local exchanges accounting for $20 billion, and the long distance carriers accounting for $9 billion. There has been a dramatic expansion in demand for communications capacity due to an explosion in traffic driven by the Internet, business data transmission, and the transfer of images. By the year 2005, a 100-fold increase in traffic is likely. The infrastructure of long distance carriers and local exchanges must be expanded to meet these demands.

Three approaches underway to meet this growing demand include, increasing the number of optical fibers connecting nodes within the network; increasing the bandwidth through wavelength division multiplexing (WDM) using multiple lasers; and/or increasing the data rate capability of a single laser.

The revolution in telecommunications is placing severe demands on network switching capabilities. This includes areas such as add/drop switches, attenuators, and cross-connect switches for reconfiguring data channels. Current state-of-the-art technology uses opto-mechanical switches that have limitations in speed, power consumption, and lifetime (i.e., mechanical wear). Electro-optic directional couplers can be made with electro-optic materials (e.g., $LiNbO_3$). These have no moving parts and switch quite rapidly. However, they are expensive and have high loss and polarization dependent loss. Thermo-optic switches based on interferometers have relatively poor cross talk. Finally, semiconductor optical amplifiers can be used as on/off switches. They are quite fast, but they are expensive and difficult to make polarization independent. Future systems will demand the increased capability promised by all-optical switches.

Similarly, electrically switchable transmission gratings have many applications for which beams of light must be deflected or holographic images switched. Among these applications are: fiber optic switches; reprogrammable N×N optical interconnects for optical computing; beam steering for laser surgery; beam steering for laser radar; holographic image storage and retrieval; digital zoom optics (switchable holographic lenses); graphic arts and entertainment; and the like.

Summary of the Solution

A hologram is an interference pattern that is recorded on a high-resolution recording plate. Two beams formed by a coherent beam from a laser, interfere within the recording plate, causing an interference pattern. This pattern represents object formation. The object formation is a function of the light diffracted from the object to be recorded when the object is placed in the path of one of the two formation beams. If after processing, the recording plate is viewed correctly by monochromatic light, a three-dimensional image of the object is seen. When forming a holographic grating, there is no object, per se, which is put into the path of one of the beams. Instead, given the wave properties of light, when two beams interact, they will form a grating within the recording plate. This grating, as is explained below can be formed so as to have any of a variety of characteristics.

Preferred embodiments of the present invention can utilize a novel polymer-dispersed liquid crystal (PDLC) material and its unique switching characteristics to form optical elements. The PDLC material of the present invention offers all of the features of holographic photopolymers with the added advantage that the hologram can be switched on and off with the application of an electric field. The material is a mixture of a polymerizable monomer and liquid crystal, along with other ingredients, including a photoinitiator dye. Upon irradiation, the liquid crystal separates as a distinct phase of nanometer-size droplets aligned in periodic channels forming the hologram. The material is called a holographic polymer-dispersed liquid crystal (H-PDLC).

Both transmission and reflection type holograms may be formed with this material. The same concepts embodied in this disclosure are viable for other applications, including those for communications switches, switchable transmission, and reflection red, green, and blue lenses.

Preferred embodiments of the present invention can also provide devices and methods for (a) selecting at least one specific wavelength optical signal from a group of other nearly-equal wavelength optical signals and (b) selectively attenuating one or more wavelength optical signals. Certain embodiments incorporate a fiber optic waveguide geometry which utilizes at least one wavelength selective switch (i.e., short-period Bragg grating), which can be used as a wavelength selective switchable Bragg filter for add/drop multiplexers and for switching specific DWDM wavelengths from a multiple wavelength, multi-mode laser. In a further embodiment, a long-period Bragg grating is fabricated for use as a variable optical attenuator.

Preferred embodiments of the present invention can also provide integrated devices which include optical switches integrated with fibers in order to maintain the cylindrical geometry of fiber optics to control optical loss, where for example, an optical signal cannot be physically separated from the fiber transmission system.

A first embodiment of the present invention describes a wavelength selective optical element that includes, a first polymer-dispersed liquid crystal switchable holographic component for diffracting a wavelength of an incident beam and a second polymer-dispersed liquid crystal switchable holographic component for diffracting a wavelength of an incident beam. The first and second polymer-dispersed liquid crystal switchable holographic components are located in stacked relationship with one another and placed in the path of the incident beam.

A second embodiment of the present invention describes an optical system for wavelength selection that includes; a coherent beam for inputting multiple wavelengths, a first polymer-dispersed liquid crystal switchable holographic component for diffracting a single wavelength of an incident beam; and a second polymer-dispersed liquid crystal switchable holographic component for diffracting a single wavelength of an incident beam. The first and second polymer-dispersed liquid crystal switchable holographic components are located in stacked relationship with one another and are placed in the path of the incident beam. An output component receives from the first and second polymer-dispersed liquid crystal holographic components at least one of the following group consisting of at least one of the diffracted single wavelengths, all undiffracted multiple wavelengths, and both the diffracted single wavelengths and the undiffracted multiple wavelengths.

A third embodiment of the present invention describes an optical connector that includes, first matrix comprising N×N polymer-dispersed liquid crystal switchable holographic components for deflecting and transmitting incident radiation and a second matrix comprising N×N optical components for accepting the deflected and transmitted incident radiation.

A fourth embodiment of the present invention describes a polarization diversity system that includes a first polarizing beam splitter for receiving an input beam of light and splitting the input beam of light into a first beam of light polarized in first direction and a second beam of light polarized in a second direction; a first optical path including a first deflector, a half-wave plate, a second deflector, and a mirror, wherein the first optical path receives the first beam of light polarized in a first direction from the first polarizing beam splitter and outputs the first beam of light polarized in a second direction; a second optical path including a mirror, a third deflector, a half-wave plate, and a fourth deflector, wherein the second optical path receives the second beam of light polarized in a second direction from the first polarizing beam splitter and outputs the second beam of light polarized in a first direction; and a second polarizing beam splitter for receiving the outputted first beam of light polarized in a second direction from the first optical path and the outputted second beam of light polarized in a first direction from the second optical path.

A fifth embodiment of the present invention describes an optical switch that includes a pair of conductive slides at least one of which is transparent, a voltage source electrically contacted to the pair of conductive slides, at least one spacer for separating the pair of conductive slides, a layer of polymer-dispersed liquid crystal material located within the confines of the pair of conductive slides and the at least one spacer, and a switchable holographic grating formed within the layer of polymer-dispersed liquid crystal material.

A sixth embodiment of the present invention describes a method for forming a switchable holographic waveguide filter that includes etching a channel into a substrate, filling the channel with a polymerizable material, forming at least two sets of electrodes on the substrate, and exposing the polymerizable material to at least two interfering light beams in order to form a hologram therein.

A seventh embodiment of the present invention describes a holographic switch that includes a substrate, a waveguide within the substrate having a polymer-dispersed liquid crystal holographic layer therein, and at least two sets of electrodes attached to the substrate and electrically contacting the polymer-dispersed liquid crystal holographic layer.

An eighth embodiment of the present invention describes a crossbar switch that includes N×M, polymer-dispersed liquid crystal holographic elements, where N=M and N is equal to at least 2 and further wherein each of the polymer-dispersed liquid crystal holographic elements deflects light in a first state and transmits light in a second state, such that light input at any N, is capable of output at any M by alternating between the first and second states of the polymer-dispersed liquid crystal holographic elements.

A ninth embodiment of the present invention describes a nonblocking switch that includes multiple polymer-dispersed liquid crystal holographic elements arranged into an N input and an M output configuration, wherein each of the elements alternates between either a first state and a second state or a first state and a third state, and further wherein, light incident upon any N input is coupled to any M output without blocking the path of any other N input to M output coupling.

A tenth embodiment of the present invention describes a method for forming a switchable holographic filter. The method includes: inserting a first end of a first optical fiber into a first end of a capillary tube and inserting a first end of a second optical fiber into a second end of a capillary tube, leaving a space within the capillary tube between the first end of the first optical fiber and the first end of the second optical fiber; filling the space within the capillary tube with a polymerizable material; and exposing the polymerizable material to radiation, thereby forming a switchable holographic filter within the capillary tube.

An eleventh embodiment of the present invention describes an electrically switchable holographic filter. The filter comprises: a substrate containing an etched groove; a first and second set of finger electrodes positioned on the surface of the substrate on either side of the etched groove; a capillary tube containing a switchable grating positioned within the etched groove; and first and second optical fibers, wherein the first optical fiber is inserted into one end of the capillary tube and the second optical fiber is inserted into the other end of the capillary tube, such that the switchable grating is positioned between the inserted first and second optical fibers.

A twelfth embodiment of the present invention describes a magnetically switchable holographic filter. The filter comprises: a capillary tube containing a switchable grating; a coil of wire wrapped around the capillary tube; and first and second optical fibers. The first optical fiber is inserted into one end of the capillary tube and the second optical fiber is inserted into the other end of the capillary tube, such that the switchable grating is positioned between the inserted first and second optical fibers.

A thirteenth embodiment of the present invention describes a thermally switchable holographic filter. The filter comprises a capillary tube containing a switchable grating positioned between at least two heating elements and first and second optical fibers. The first optical fiber is inserted into one end of the capillary tube and the second optical fiber is inserted into the other end of the capillary tube, such that the switchable grating is positioned between the inserted first and second optical fibers.

BRIEF DESCRIPTION OF THE DRAWINGS

In the drawings:

FIG. 1 is a conventional switchable grating;

FIGS. 2a and 2b are elevational views of a reflection grating in accordance with the present invention having planes of polymer channels and PDLC channels disposed parallel to the front surface in the absence of a field (FIG. 2a) and with an electric field applied (FIG. 2b) wherein the liquid crystal utilized in the formation of the grating has a positive dielectric anisotropy;

FIGS. 3a and 3b are elevational views of a reflection grating in accordance with the invention having planes of polymer channels and PDLC channels disposed parallel to the front surface of the grating in the absence of an electric field (FIG. 3a) and with an electric field applied (FIG. 3b) wherein the liquid crystal utilized in the formation of the grating has a negative dielectric anisotropy;

FIG. 8 is a schematic view of a reorientation of a liquid crystal domain symmetry axis in the presence of a strong electric field.

FIGS. 22(a)-(d) are schematic illustrations of a switchable Bragg filter in a channel waveguide during the formation thereof according to an embodiment of the present invention;

FIG. 23 is a schematic illustration of a random distribution of symmetry axes clustered about K as seen by light propagating down a waveguide channel according to an embodiment of the present invention;

FIG. 26 is a schematic representation of a dense wavelength division multiplexing (DWDM) switch according to an embodiment of the present invention;

FIGS. 27(a)-(b) are schematic representations of a filter with electrodes during formation thereof according to an embodiment of the present invention;

FIGS. 30(a)-(b) are graphs showing distributions of voltage and index modulation for a voltage-controlled long-period PDLC grating according to an embodiment of the present invention;

FIG. 32 is a schematic representation of a system for switching a filter according to an embodiment of the present invention;

FIG. 35 is a schematic representation of a beam deflector in accordance with an embodiment of the present invention;

FIG. 39 is a schematic representation of a 4×4 switch utilizing the switches of FIGS. 38(a)-(b) according to an embodiment of the present invention;

FIG. 45 is an output efficiency graph for the 4×4 optical cross-connect switch according to FIG. 42.

DETAILED DESCRIPTION OF THE PREFERRED EMBODIMENTS

Figure 4:
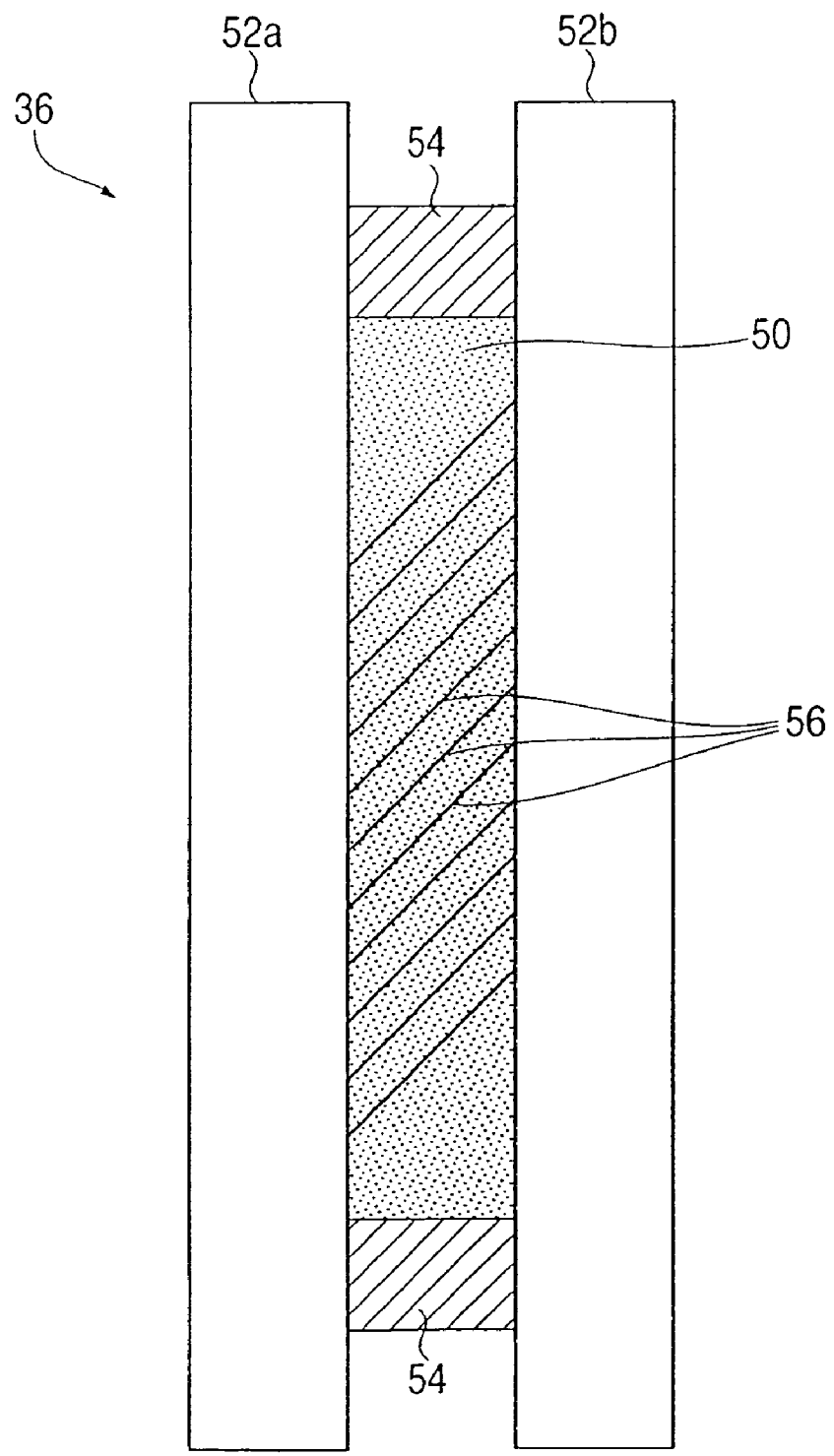
FIG. 4 is a cross-sectional view of an electrically switchable hologram made of an exposed polymer-dispersed liquid crystal material according to the teachings of the present invention.

A basic component of the optical elements described in detail within this disclosure is the polymer-dispersed liquid crystal ("PDLC") material used therein. Accordingly, a general description of the ingredients which comprise this PDLC material as well as various specific examples of combinations of these ingredients which are used to form specific types of PDLC materials, are discussed immediately, below.

In accordance with embodiments of the present invention there is provided a polymer-dispersed liquid crystal ("PDLC") material made from a monomer, a dispersed liquid crystal, a cross-linking monomer, a coinitiator and a photoinitiator dye. These PDLC materials exhibit clear and orderly separation of the liquid crystal and cured polymer, whereby the PDLC material advantageously provides high quality holographic gratings. The PDLC materials of the present invention are also advantageously formed in a single step. The present invention also utilizes a unique photopolymerizable prepolymer material that permits in situ control over characteristics of the resulting gratings, such as domain size, shape, density, ordering, and the like. Furthermore, methods and materials of the present invention can be used to prepare PDLC materials that function as switchable transmission or reflection gratings.

Polymer-dispersed liquid crystal materials, methods, and devices contemplated for use in the practice of the present invention are also described in R. L. Sutherland et al., "Bragg Gratings in an Acrylate Polymer Consisting of Periodic Polymer-Dispersed Liquid-Crystal Planes," Chemistry of Materials, No. 5, pp. 1533-1538 (1993); in R. L. Sutherland et al., "Electrically switchable volume gratings in polymer-dispersed liquid crystals," Applied Physics Letters, Vol. 64, No. 9, pp. 1074-1076 (1984); and T. J. Bunning et al., "The Morphology and Performance of Holographic Transmission Gratings Recorded in Polymer-Dispersed Liquid Crystals," Polymer, Vol. 36, No. 14, pp. 2699-2708 (1995), all of which are fully incorporated by reference into this specification.

A preferred polymer-dispersed liquid crystal ("PDLC") material employed in the practice of the present invention creates a switchable hologram in a single step. A new feature of a preferred PDLC material is that illumination by an inhomogeneous, coherent light pattern initiates a patterned, anisotropic diffusion (or counter-diffusion) of polymerizable monomer and second phase material, particularly liquid crystal ("LC") for this application. Thus, alternating well-defined channels of second phase-rich material, separated by well-defined channels of nearly pure polymer, are produced in a single-step process.

A resulting preferred PDLC material has an anisotropic spatial distribution of phase-separated LC droplets within the photochemically cured polymer matrix. Conventional PDLC materials made by a single-step process can achieve at best only regions of larger LC bubbles and smaller LC bubbles in a polymer matrix. This is due to multiple constraints such as material limitations, exposure times, and sources of exposure, all of which are well known to those skilled in the art. The large bubble sizes are highly scattering which produces a hazy appearance and multiple order diffractions, in contrast to the well-defined first order diffraction and zero order diffraction made possible by the small LC bubbles of a preferred PDLC material in well-defined channels of LC-rich material. Reasonably well-defined alternately LC-rich channels and nearly pure polymer channels in a PDLC material are possible by multi-step processes, but such processes do not achieve the precise morphology control over LC droplet size and distribution of sizes and widths of the polymer and LC-rich channels made possible by a preferred PDLC material.

The features of the PDLC material are influenced by the components used in the preparation of the homogeneous starting mixture and, to a lesser extent, by the intensity of the incident light pattern. In a preferred embodiment, the prepolymer material comprises a mixture of a photopolymerizable monomer, a second phase material, a photoinitiator dye, a coinitiator, a chain extender (or cross-linker), and, optionally, a surfactant.

In a preferred embodiment, the two major components of the prepolymer mixture are the polymerizable monomer and the second phase material, which are preferably completely miscible. Highly functionalized monomers are preferred because they form densely cross-linked networks which shrink to some extent and tend to squeeze out the second phase material. As a result, the second phase material is moved anisotropically out of the polymer region and, thereby, separated into well-defined polymer-poor, second phase-rich regions or domains. Highly functionalized monomers are also preferred because the extensive cross-linking associated with such monomers yields fast kinetics, allowing the hologram to form relatively quickly, whereby the second phase material will exist in domains of less than approximately 0.1 µm.

Highly functionalized monomers, however, are relatively viscous. As a result, these monomers do not tend to mix well with other materials, and they are difficult to spread into thin films. Accordingly, it is preferable to utilize a mixture of penta-acrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetraacrylate, pentaerythritol pentaacrylate, and the like can be used in accordance with the present invention. In a preferred embodiment, it has been found that an approximately 1:4 mixture of tri- to penta-acrylate facilitates homogeneous mixing while providing a favorable mixture for forming 10-20 µm films on the optical plates.

The second phase material of choice for use in the practice of the present invention is a liquid crystal. This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention include the mixture of cyanobiphenyls marketed as E7 by Merck, 4'-n-pentyl-4-cyanobiphenyl, 4'-n-heptyl-4 cyanobiphenyl, 4'-octaoxy-4-cyanobiphenyl, 4'-pentyl-4-cyanoterphenyl, methoxybenzylidene-4'-butylaniline, and the like. Other second phase components are also possible.

A preferred polymer-dispersed liquid crystal material employed in the practice of the present invention is formed from a prepolymer material that is a homogeneous mixture of a polymerizable monomer comprising dipentaerythritol hydroxypentaacrylate (available, for example, from Polysciences, Inc., Warrington, Pa.), approximately 10-40 wt% of the liquid crystal E7 (which is a mixture of cyanobiphenyls marketed as E7 by Merck and also available from BDH Chemicals, Ltd., London, England), the chain-extending monomer N-vinylpyrrolidone ("NVP") (available from the Aldrich Chemical Company, Milwaukee, Wis.), coinitiator N-phenylglycine ("NPG") (also available from the Aldrich Chemical Company, Milwaukee, Wis.), and the photoinitiator dye rose bengal ester (2,4,5,7-tetraiodo-3',4',5',6'-tetrachlorofluoroescein-6-acetate ester) marketed as RBAX by Spectragraph, Ltd., Maumee, Ohio). Rose bengal is also available as rose bengal sodium salt (which must be esterfied for solubility) from the Aldrich Chemical Company. This system has a very fast curing speed which results in the formation of small liquid crystal micro-droplets.

The mixture of liquid crystal and prepolymer material are homogenized to a viscous solution by suitable means (e.g., ultrasonification) and spread between indium-tin-oxide ("ITO") coated glass slides with spacers of nominally 15-100 µm thickness and, preferably, 10-20 µm thickness. The ITO is electrically conductive and serves as an optically transparent electrode. Preparation, mixing and transfer of the prepolymer material onto the glass slides are preferably done in the dark as the mixture is extremely sensitive to light.

The sensitivity of the prepolymer materials to light intensity is dependent on the photoinitiator dye and its concentration. A higher dye concentration leads to a higher sensitivity. In most cases, however, the solubility of the photoinitiator dye limits the concentration of the dye and, thus, the sensitivity of the prepolymer material. Nevertheless, it has been found that for most general applications photoinitiator dye concentrations in the range of 0.2-0.4% by weight are sufficient to achieve desirable sensitivities and allow for a complete bleaching of the dye in the recording process, resulting in colorless final samples. Photoinitiator dyes that are useful in generating PDLC materials in accordance with the present invention are rose bengal ester (2,4,5,7-tetraiodo-3',4',5',6'-tetrachlorofluroescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600-900 nm, as well as merocyanine dyes derived from spiropyran should also find utility in connection with the present invention.

The coinitiator employed in the practice of the present invention controls the rate of curing in the free radical polymerization reaction of the prepolymer material. Optimum phase separation and, thus, optimum diffraction efficiency in the resulting PDLC material, are a function of curing rate. It has been found that favorable results can be achieved utilizing coinitiator in the range of 2-3% by weight. Suitable coinitiators include: N-phenylglycine; triethylene amine; triethanolamine; N,N-dimethyl-2,6-diisopropyl aniline; and the like.

Other suitable dyes and dye coinitiator combinations that should be suitable for use in the present invention, particularly for visible light, include: eosin and triethanolamine; camphorquinone and N-phenyglycine; fluorescein and triethanolamine; methylene blue and triethanolamine or N-phenylglycine; erythrosin B and triethanolamine; indolinocarbocyanine and triphenyl borate; iodobenzospiropyran and triethylamine; and the like.

The chain extender (or cross-linker) employed in the practice of the present invention helps to increase the solubility of the components in the prepolymer material as well as increase the speed of polymerization. The chain extender is preferably a smaller vinyl monomer as compared with the pentaacrylate, whereby it can react with the acrylate positions in the pentaacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that chain extender in general applications in the range of 10-18% by weight maximizes the performance in terms of diffraction efficiency. In a preferred embodiment, it is expected that suitable chain extenders can be selected from the following: N-vinyl pyrrolidone; N-vinyl pyridine; acrylonitrile; N vinyl carbazole; and the like.

It has been found that the addition of a surfactant material, namely, octanoic acid, in the prepolymer material lowers the switching voltage and also improves the diffraction efficiency. In particular, the switching voltage for PDLC materials containing a surfactant are significantly lower than those of a PDLC material made without the surfactant. Scanning electron microscopy ("SEM") studies have shown that droplet sizes in PDLC materials including surfactants are reduced to the range of 30-50 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include: octanoic acid; heptanoic acid; hexanoic acid; dodecanoic acid; decanoic acid; and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") $C_8H_{17}CO_2$ CH=$CH_2$, commercially available from the Aldrich Chemical Co. in Milwaukee, Wis. Favorable results have also been obtained where the chain extender N-vinyl pyrrolidone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and the resulting gratings could be electrically switched by an applied field of 6 V/μm.

PDLC materials in accordance with the present invention may also be formed using a liquid crystalline bifunctional acrylate as the monomer ("LC monomer"). The LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCs in the PDLC material greatly lowers the switching voltages (e.g., to ~2 V/μm). Another advantage of using LC monomers is that it is possible to apply low AC or DC fields while recording holograms to pre-align the host LC monomers and low molecular weight LC so that a desired orientation and configuration of the nematic directors can be obtained in the LC droplets. The chemical formulae of several suitable LC monomers are as follows:

I.   $CH_2$=CH—COO—$(CH_2)_6$O—$C_6H_5$—$C_6H_5$—COO—CH=$CH_2$
II.  CH—$(CH_2)_8$—COO—$C_6H_5$—COO—$(CH_2)_8$—CH=$CH_2$
III. $H(CF_2)_{10}CH_2$O—$CH_2$—C(=$CH_2$)—COO—$(CH_2CH_2O)_3CH_2CH_2$O—COO—$CH_2$—C(=$CH_2$)—$CH_2$$(CF_2)_{10}$H

Semifluorinated polymers are known to show weaker anchoring properties and also significantly reduced switching fields. Thus, semifluorinated acrylate monomers which are bifunctional and liquid crystalline should find suitable application in the present invention.

In a preferred embodiment, the prepolymer material utilized to make a reflection grating comprises a monomer, a liquid crystal, a cross-linking monomer, a coinitiator, and a photoinitiator dye. In a preferred embodiment, the reflection grating is formed from prepolymer material comprising by total weight of the monomer dipentaerythritol hydroxypentaacrylate ("DPHA"), 34% by total weight of a liquid crystal comprising a mixture of cyano biphenyls (known commercially as "E7"), 10% by total weight of a cross-linking monomer comprising N-vinyl pyrrolidone ("NVP"), 2.5% by weight of the coinitiator N-phenylglycine ("NPG"), and $10^{-5}$ to $10^{-6}$ gram moles of a photoinitiator dye comprising rose bengal ester. Further, as with transmission gratings, the addition of surfactants should facilitate the same advantageous properties discussed above in connection with transmission gratings. Similar ranges and variation of prepolymer starting materials should find ready application in the formation of suitable reflection gratings.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 2a, grating 130 includes periodic planes of polymer channels 130a and PDLC channels 130b which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Furthermore, the droplets that were present in the material were significantly smaller, having diameters between 50 and 100 nm. Furthermore, unlike transmission gratings where the liquid crystal-rich regions typically comprise less than 40%, of the grating, the liquid crystal-rich component of a reflection grating is significantly larger. Due to the much smaller periodicity associated with reflection gratings, i.e., a narrower grating spacing (~0.2 microns), the time difference between completion of curing in high intensity versus low intensity regions should be much smaller. Thus, gelation occurs more quickly and droplet growth is minimized. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in a preferred embodiment described above, suitable PDLC materials could be prepared utilizing monomers such as triethyleneglycol diacrylate, trimethylolpropanetriacrylate, pentaerythritol triacrylate, pentaerythritol tetraacrylate, pentaerythritol pentaacrylate, and the like. Similarly, other coinitiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an Argon ion laser, that the photoinitiator dyes rose bengal, rose bengal sodium salt, eosin, eosin sodium salt, fluorescein sodium salt and the like will give favorable results. Where the 633 nm line is utilized, methylene blue will find ready application. Finally, it is believed that other liquid crystals, such as 4'-pentyl-4-cyanobiphenyl or 4'-heptyl-4-cyanobiphenyl, can be utilized in accordance with the invention.

Referring again to FIG. 2a, there is shown an elevational view of a reflection grating 130 in accordance with the invention having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 2b, the symmetry axis 136 is already in a low energy state in alignment with the field E and will not reorient. Thus, reflection gratings formed in accordance with the procedure described above will not normally be switchable.

In general, a reflection grating tends to reflect a narrow wavelength band, such that the grating can be used as a reflection filter. In a preferred embodiment, however, the reflection grating is formed so that it will be switchable. In accordance with the present invention, switchable reflection gratings can be made utilizing negative dielectric anisotropy LCs (or LCs with a low cross-over frequency), an applied magnetic field, an applied shear stress field, or slanted gratings.

It is known that liquid crystals having a negative dielectric anisotropy ($\Delta\epsilon$) will rotate in a direction perpendicular to an applied field. As shown in FIG. 3a, the symmetry axis 136 of the liquid crystal domains formed with a liquid crystal having a negative $\Delta\epsilon$ will also be disposed in a direction perpendicular to the periodic channels 130a and 130b of the grating 130 and to the front surface 134 of the grating. However, when an electric field E is applied across such gratings, as shown in FIG. 3b, the symmetry axis of the negative $\Delta\epsilon$ liquid crystal will distort and reorient in a direction perpendicular to the field E, which is perpendicular to the film and the periodic planes of the grating. As a result, the reflection grating can be switched between a state where it is reflective and a state where it is transmissive. The following negative $\Delta\epsilon$ liquid crystals and others are expected to find ready application in the methods and devices of the present invention:

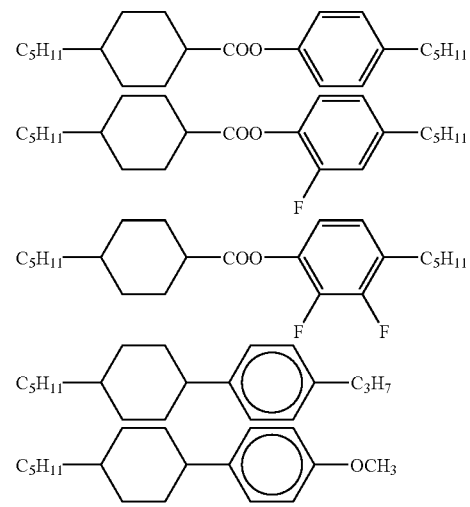

Liquid crystals can be found in nature (or synthesized) with either positive or negative $\Delta\epsilon$. Thus, in some specific embodiments of the present invention, it is possible to use a LC which has a positive $\Delta\epsilon$ at low frequencies, but becomes negative at high frequencies. The frequency (of the applied voltage) at which $\Delta\epsilon$ changes sign is called the cross-over frequency. The cross-over frequency will vary with LC composition, and typical values range from 1-10 kHz. Thus, by operating at the proper frequency, the reflection grating may be switched. In accordance with embodiments of the present invention, it is expected that low crossover frequency materials can be prepared from a combination of positive and negative dielectric anisotropy liquid crystals. By way of example, a preferred positive dielectric liquid crystal for use in such a combination contains four ring esters as shown below:

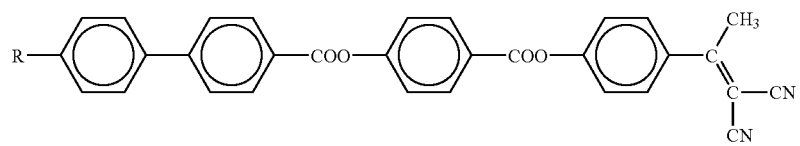

A strongly negative dielectric liquid crystal suitable for use in such a combination is made up of pyridazines as shown below:

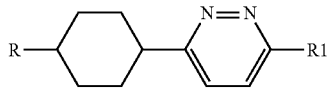

Both liquid crystal materials are available from, for example, LaRoche & Co., Switzerland. By varying the proportion of the positive and negative liquid crystals in the combination, crossover frequencies from 1.4-2.3 kHz are obtained at room temperature. Another combination suitable for use in the present embodiment is a combination of the following: p-pentylphenyl-2-chloro-4-(p-pentylbenzoyloxy) benzoate and-4-(p-pentylbenzoyloxy) benzoate and p-heptylphenyl-2-chloro-4-(p-octylbenzoyloxy) benzoate. These materials are available from Kodak® Company. A preferred embodiment of the present invention comprises a basic optical grating component formed with the previously described PDLC material as a hologram. The formation of this type of holographic grating using the PDLC material described above results in at least the following advantages which are critical to switching success in the telecommunications as well as other optically based industries. H-PDLC gratings offer reduced loss, reduced scattering, reduced crosstalk, polarization independence, operation at 1.3 and 1.5 microns, operation at lower voltages, reduction in temperature dependence, and increased reliability and stability, particularly as compared to mechanical devices.

By way of example, the building block for an optical switch is illustrated in FIG. 1. This is a switchable Bragg transmission grating 10. An incident beam of light 12 is deflected by a diffraction grating 14 over a considerable angle that is equal to twice the Bragg angle for the wavelength of incident light, producing a diffracted exit beam 16. In this configuration, the grating is usually said to be "on." With the application of a voltage across transparent electrodes (indium-tin-oxide, ITO) (not shown), the index modulation of the hologram vanishes, and the hologram is thus referred to as being switched "off." The exit beam 18 thus propagates through the hologram undeflected. These relatively simple devices could be used to form optical add/drop boxes or "tunable" laser sources that could be used to replace a defective laser of any wavelength. The switchable Bragg transmission grating shown in FIG. 1 as well as the optical switches described throughout this specification may be constructed to operate in an inverse mode wherein the grating is "on" (e.g., the switch is in a diffractive state) with the application of, for example, a voltage and the grating is "off" (e.g., the switch is not in a diffractive state) when, for example, no voltage is being applied. One skilled in the optical switching art appreciates the steps necessary to attain this inverse mode of switching operation.

In FIG. 1, we show incident and diffracted beams with two different polarization states: (a) perpendicular to the plane containing the incident, diffracted, and grating wavevectors (commonly known as s-polarization); and (b) in this plane (commonly known as p-polarization). It is well known that for an ordinary grating, s-polarized light will have a stronger coupling (and hence larger diffraction efficiency) than p-polarized light. The reason for this is that there is a complete overlap of the electric field vectors for the incident and diffracted waves for s-polarization independent of angle of incidence. The overlap of p-polarized beams depends on the angle between the two beams, going from complete overlap for 0° angle to zero overlap for a 90° angle. Hence, for an ordinary grating, the diffraction efficiency of p-polarized light should never exceed that of s-polarized light.

In particular, a preferred embodiment of the present invention contemplates the formation of a Bragg-type grating using a PDLC material. FIG. 4 is a cross-sectional view of a PDLC Bragg grating 36 formed of a layer 50 of the PDLC material, with grating 56 formed therein, sandwiched between a pair of indium-tin-oxide (ITO) coated glass slides 52a and 52b and between spacers 54.

Figure 5:
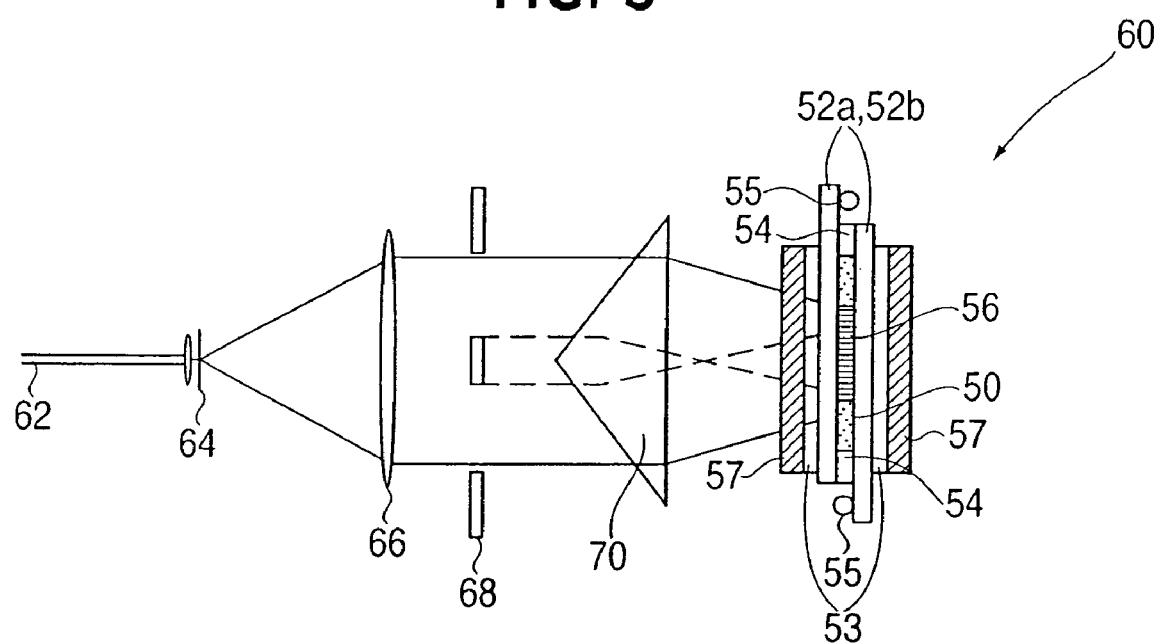
FIG. 5 is a schematic view of a recording system for forming a transmission hologram according to the present invention.

In the exemplary embodiment wherein the grating hologram 36 is formed from PDLC material, the interior of grating hologram 36 reveals a Bragg transmission grating 56 formed when layer 50 was exposed to an interference pattern from two intersecting beams of coherent laser light. In FIG. 5, a recording system 60 there is shown as an exemplary set-up for recording a transmission hologram using PDLC materials of the present invention. A coherent light source 62 (e.g., Ar ion laser) is incident upon a spatial filter 64 and a collimating lens 66 prior to being divided via a dual slit aperture 68 and impinging upon a prism 70 causing the dual beams to interfere within the layer of PDLC material 50. Further within this set-up, similar to FIG. 4, the PDLC material is sandwiched between layers of ITO glass slides 52a and 52b, separated by spacers 54. Also, in order to insure optical homogeneity, neutral density filters 57 were placed before slide 52a and after slide 52b, separated by index matching fluid 53. Finally, in order to allow control of the liquid crystal orientation within the PDLC material, electrodes 55 are provided in electrical contact with the ITO glass slides 52a and 52b. Similarly, one skilled in the art will appreciate the variations and additions of reflective material necessary to form a Bragg reflection grating as opposed to a transmission grating.

The polymer-dispersed liquid crystal material is a mixture of liquid crystal and prepolymer material homogenized to a viscous solution by suitable means (e.g., ultrasonification) and spread between indium-tin-oxide ("ITO") coated glass slides with spacers of nominally about 10-100 μm thickness and, preferably, about 10-20 μm thickness. The ITO is electrically conductive and serves as an optically transparent electrode. Preparation, mixing and transfer of the prepolymer material onto the glass slides are preferably done in the dark as the mixture is extremely sensitive to light. Gratings are typically recorded using the 488 nm line of an Argon ion laser with intensities of between about 0.1-100 mW/cm$^2$ and typical exposure times of 30-120 seconds. The angle between the two beams is varied to vary the spacing of the intensity peaks, and hence the resulting grating spacing of the hologram. Photopolymerization is induced by the optical intensity pattern. A more detailed discussion of exemplary recording apparatus can be found in R. L. Sutherland, et al., "Switchable holograms in new photopolymer-liquid crystal composite materials," Society of Photo-Optical Instrumentation Engineers (SPIE), Proceedings Reprint, Volume 2404, reprinted from Diffractive and Holographic Optics Technology II (1995), incorporated herein by reference.

In an embodiment of the present invention, a Bragg grating of FIG. 4 constructed with the PDLC material described herein, exhibits the opposite diffraction efficiency characteristics from those recited with reference to FIG. 1, namely, the diffraction efficiency of p-polarized light always exceeds that of s-polarized light. Therefore, in the type of PDLC grating considered in FIG. 1, there is a built-in anisotropy that favors diffraction of light polarized in the plane containing the wavevectors and the grating vector, even though the overlap of field vectors is smaller for this case than for the perpendicular polarization.

Figure 6:
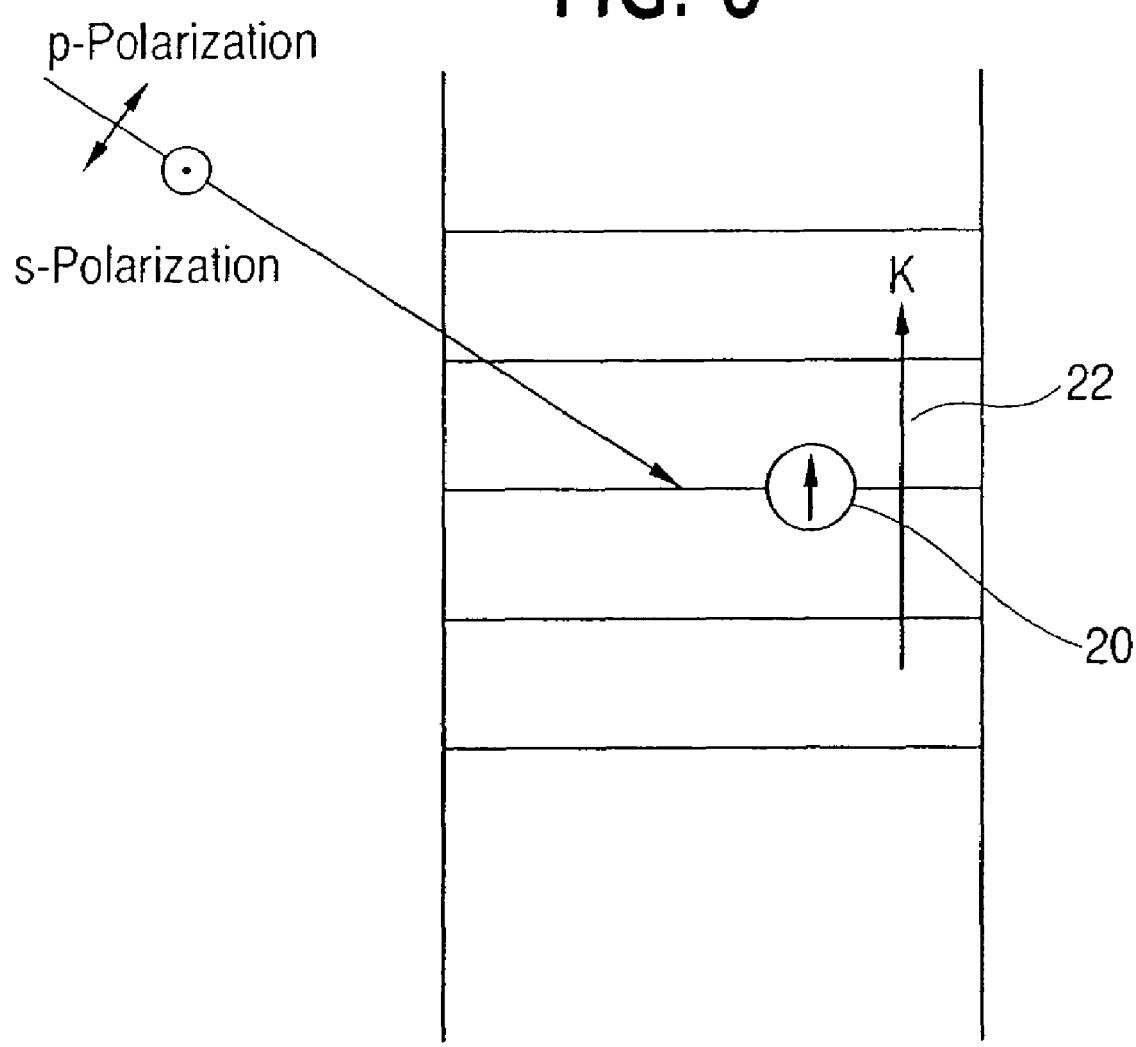
FIG. 6 models diffraction of p-polarized light in a PDLC transmission hologram according to an embodiment of the present invention.

In this embodiment of the present invention, the liquid crystal phase separates as uniaxial domains 20 with symmetry axis pointed preferentially along the grating vector 22 as shown in FIG. 6. The resulting domain 20 has an extraordinary index of refraction $n_e$ along this symmetry axis, and a smaller ordinary refractive index $n_o$ perpendicular to the axis. Since p-polarized light has a component of its electric field along the symmetry axis, it sees a refractive index heavily weighted by $n_e$, and thus sees a relatively large index modulation. On the other hand, s-polarized light sees a refractive index weighted more by $n_o$, and hence experiences a relatively small index modulation ($n_e > n_o$). The diffraction efficiency of s-polarized light is considerably weaker than that of p-polarized light.

Figure 7:
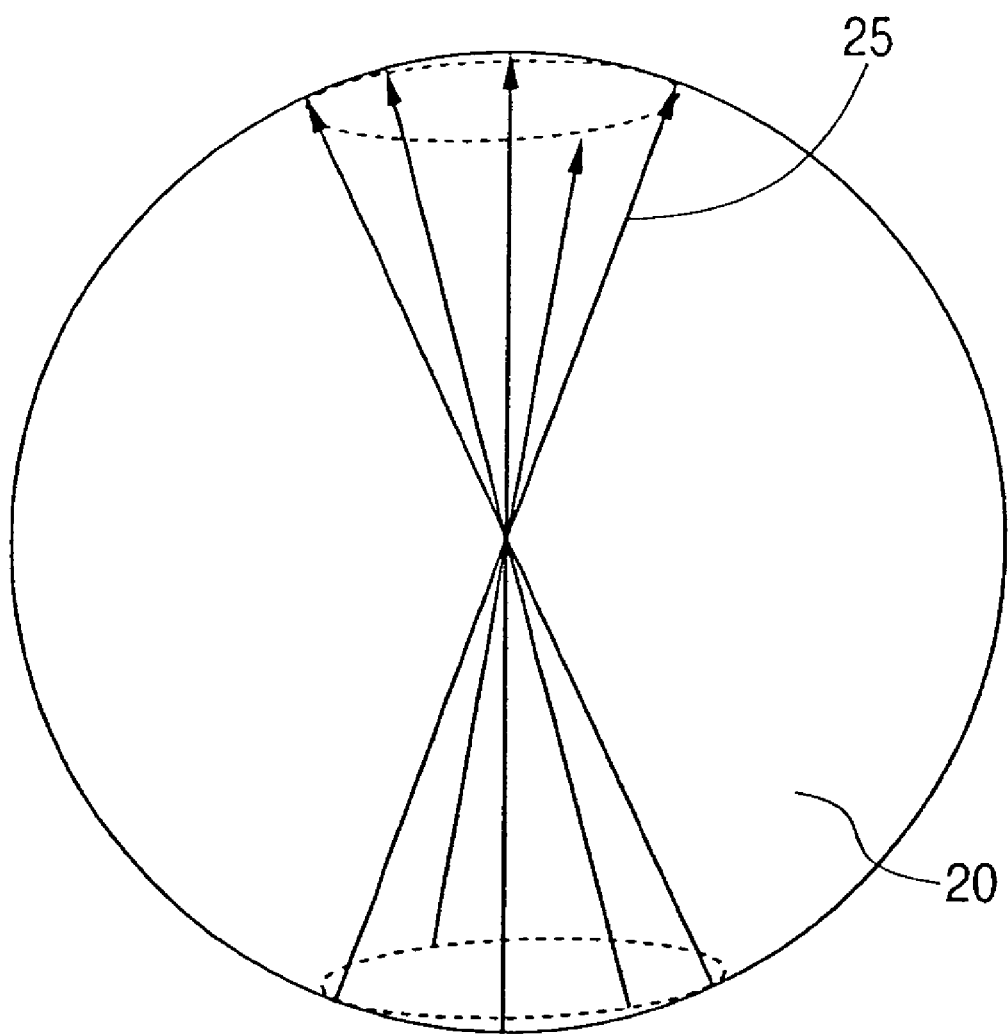
FIG. 7 is a schematic view of a random azimuthal distribution of symmetry axes in liquid crystal domains in a PDLC transmission hologram according to an embodiment of the present invention.

The symmetry axes of liquid crystal domains 20 are not perfectly aligned with the grating vector 22. There is some small statistical distribution 25 of the axes about this direction. The average of the statistical distribution 25 points along the grating vector 22 as shown in FIG. 7. Thus, s-polarized light will see a small amount of $n_e$ mixed in with $n_o$, which is what gives it its weak but measurable diffraction efficiency. When a strong electric field 24 is applied perpendicular to the plane of the grating, as shown in FIG. 8, nearly all liquid crystals reorient in a direction along the beam propagation for some field value, and both s- and p-polarized light see the same index in the liquid crystal domains 20, approximately equal to $n_o$. Since this index nearly matches the index of the surrounding polymer, the index modulation for both polarization states disappears and the grating is said to be switched off. When the field strength is further increased, the liquid crystals will eventually orient parallel to the field and thus not be in an orientation to yield zero index modulation. Hence, the diffraction efficiency goes through a minimum near zero and then increases slightly with increasing field.

Figure 9A:
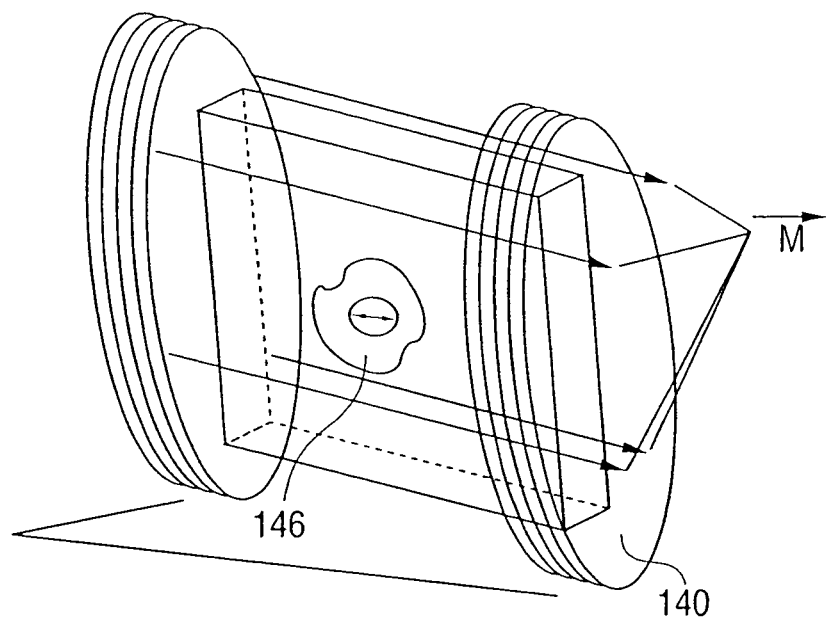
FIG. 9a is an elevational view of a reflection grating in accordance with the invention disposed within a magnetic field generated by Helmholtz coils.
Figure 9B:
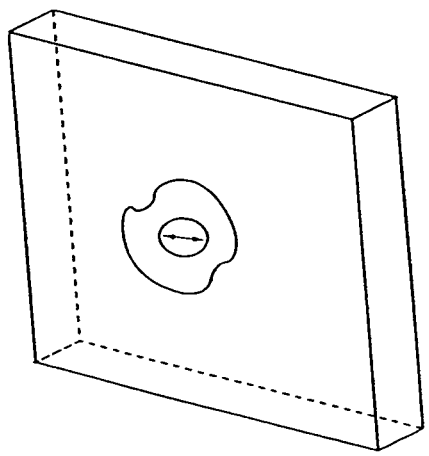
FIGS. 9b and 9c are elevational views of the reflection grating of FIG. 9a in the absence of an electric field (FIG. 9b) and with an electric field applied (FIG. 9c)
Figure 9C:
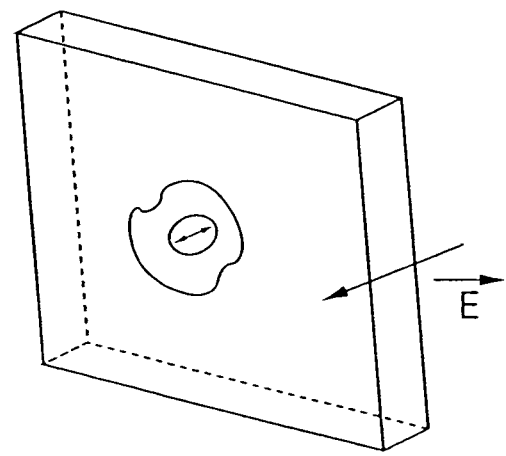

In still more detailed embodiments of the present invention, switchable reflection gratings can be formed using positive $\Delta\epsilon$ liquid crystals. As shown in FIG. 9a, such gratings are formed by exposing the PDLC starting material to a magnetic field during the curing process. The magnetic field can be generated by the use of Helmholtz coils (as shown in FIG. 9a), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 9b.) When an electric field is applied, as shown in FIG. 9c, the positive $\Delta\epsilon$ liquid crystal will reorient in the direction of the field, which is perpendicular to the front surface of the grating and to the periodic channels of the grating.

Figure 10A:
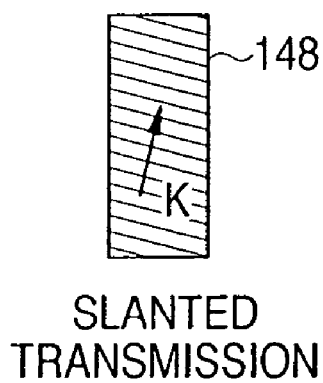
FIGS. 10a and 10b are representative side views of a slanted transmission grating (FIG. 10a) and a slanted reflection grating (FIG. 10b) showing the orientation of the grating vector K of the planes of polymer channels and PDLC channels.
Figure 10B:
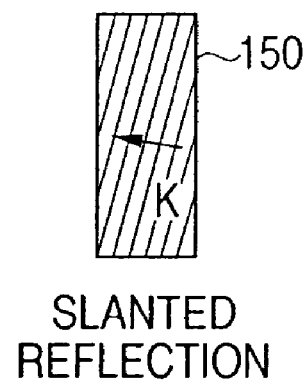

In a second exemplary embodiment, FIG. 10a depicts a slanted transmission grating 148 and FIG. 10b depicts a slanted reflection grating 150. A holographic transmission grating is considered slanted if the direction of the grating vector K is not parallel to the grating surface. In a holographic reflection grating, the grating is said to be slanted if the grating vector K is not perpendicular to the grating surface. Slanted gratings have many of the same uses as nonslanted gratings such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangent and perpendicular to the grating vector. In particular, for the reflection grating, the LC domain symmetry axis will be oriented along the grating vector K and can be switched to a direction perpendicular to the film plane by a longitudinally applied field E. This is the typical geometry for switching of the diffraction efficiency of a slanted reflection grating.

When recording slanted reflection gratings, it is desirable to place the sample between the hypotenuses of two right-angle glass prisms. Neutral density filters can then be placed in optical contact with the back faces of the prisms using index matching fluids so as to frustrate back reflections which would cause spurious gratings to also be recorded. The incident laser beam is split by a conventional beam splitter into two beams which are then directed to the front faces of the prisms, and then overlapped in the sample at the desired angle. The beams thus enter the sample from opposite sides. This prism coupling technique permits the light to enter the sample at greater angles. The slant of the resulting grating is determined by the angle at which the prism assembly is rotated (i.e., the angle between the direction of one incident beam and the normal to the prism front face at which that beam enters the prism).

The exposure times and intensities can be varied depending on the diffraction efficiency and liquid crystal domain size desired. Liquid crystal domain size can be controlled by varying the concentrations of photoinitiator, coinitiator and chain-extending (or cross-linking) agent. The orientation of the nematic directors can be controlled while the gratings are being recorded by application of an external electric field across the ITO electrodes.

The scanning electron micrograph shown in FIG. 2A of the referenced Applied Physics Letters article and incorporated herein by reference is of the surface of a grating which was recorded in a sample with a 36 wt % loading of liquid crystal using the 488 nm line of an Argon ion laser at an intensity of 95 mW/cm$^2$. The size of the liquid crystal domains is about 0.2 µm and the grating spacing is about 0.54 µm. This sample, which is approximately 20 µm thick, diffracts light in the Bragg regime.

Figure 11:
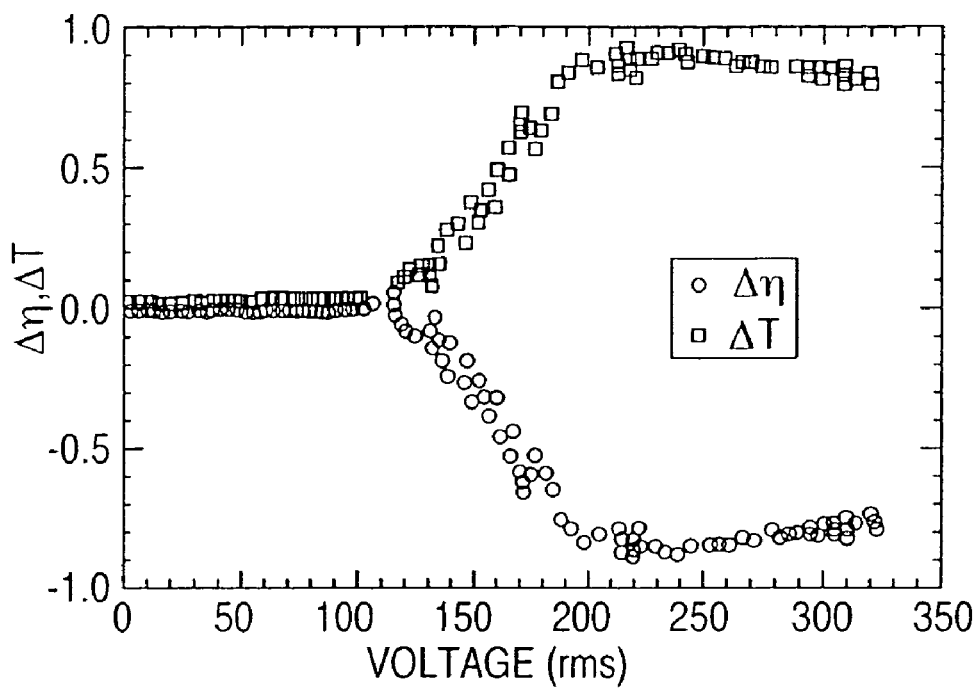
FIG. 11 is a graph of the normalized net transmittance and normalized net diffraction efficiency of a hologram made according to the teachings of the present invention (without the addition of a surfactant) versus the rms voltage applied across the hologram.

FIG. 11 is a graph of the normalized net transmittance and normalized net diffraction efficiency of a hologram made according to the teachings of the present invention versus the root mean square voltage ("Vrms") applied across the hologram. $\Delta\eta$ is the change in first-order Bragg diffraction efficiency. $\Delta T$ is the change in zero-order transmittance. FIG. 11 shows that energy is transferred from the first-order beam to the zero-order beam as the voltage is increased. There is a true minimum of the diffraction efficiency at approximately 225 Vrms. The peak diffraction efficiency can approach 100%, depending on the wavelength and polarization of the probe beam, by appropriate adjustment of the sample thickness. The minimum diffraction efficiency can be made to approach 0% by slight adjustment of the parameters of the PDLC material to force the refractive index of the cured polymer to equal the ordinary refractive index of the liquid crystal.

Figure 12:
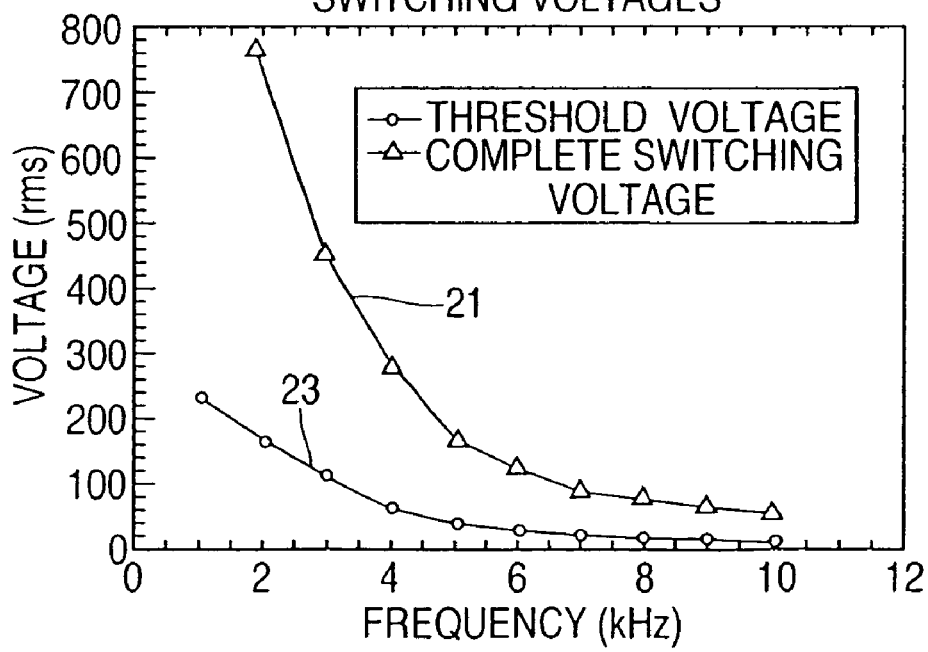
FIG. 12 is a graph of both the threshold and complete switching rms voltages needed for switching a hologram made according to the teachings of the present invention to minimum diffraction efficiency versus the frequency of the rms (root mean square) voltage.

By increasing the frequency of the applied voltage, the switching voltage for minimum diffraction efficiency can be decreased significantly. This is illustrated in FIG. 12, which is a graph of both the threshold rms voltage 21 and the complete switching rms voltage 23 needed for switching a hologram made according to the teachings of the present invention to minimum diffraction efficiency versus the frequency of the rms voltage. The threshold and complete switching rms voltages are reduced to 20 Vrms and 60 Vrms, respectively, at 10 kHz. Lower values are expected at even higher frequencies.

Figure 13:
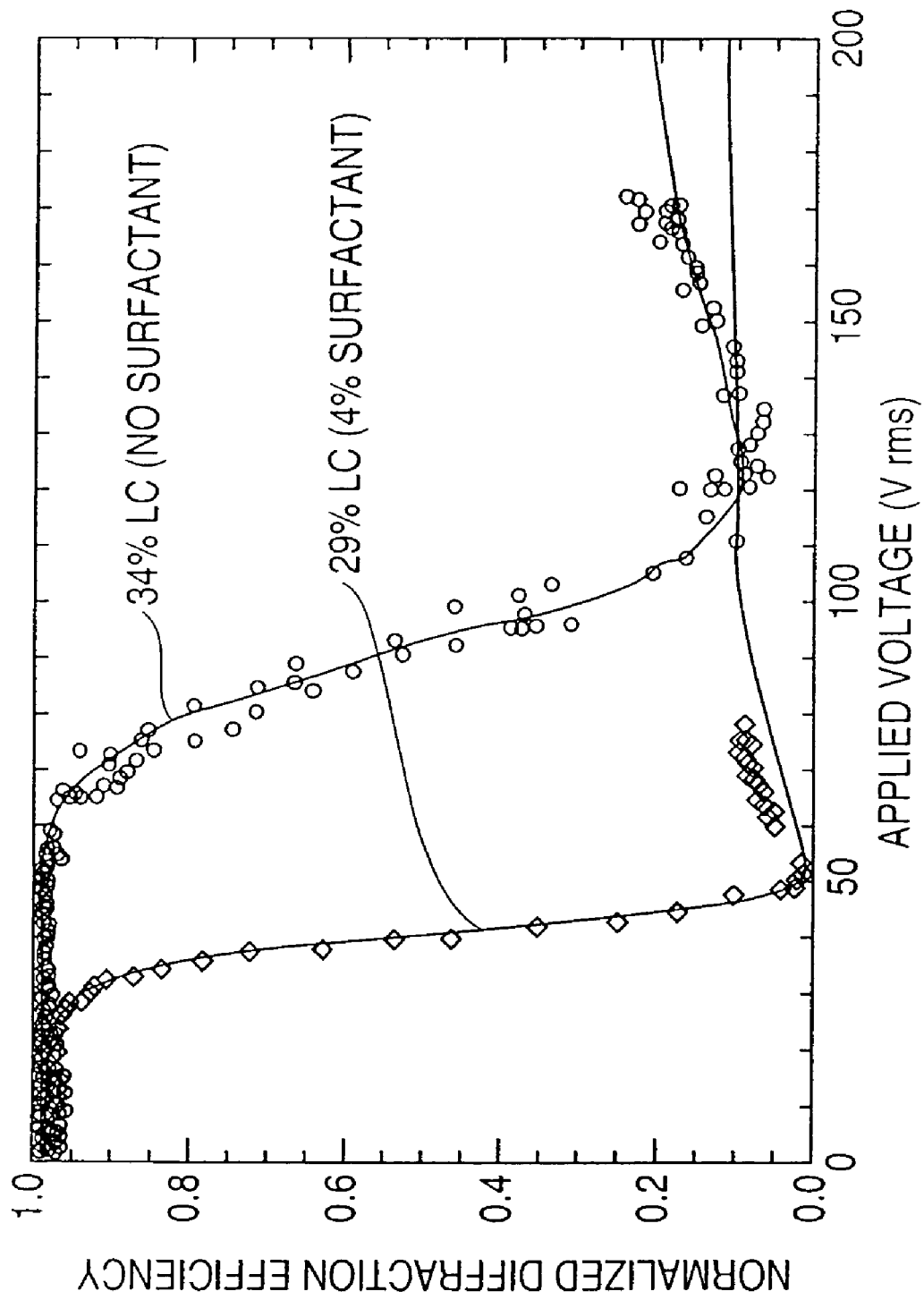
FIG. 13 is a graph of the normalized diffraction efficiency as a function of the applied electric field for a PDLC material formed in accordance with an embodiment of the present invention.
Figure 14:
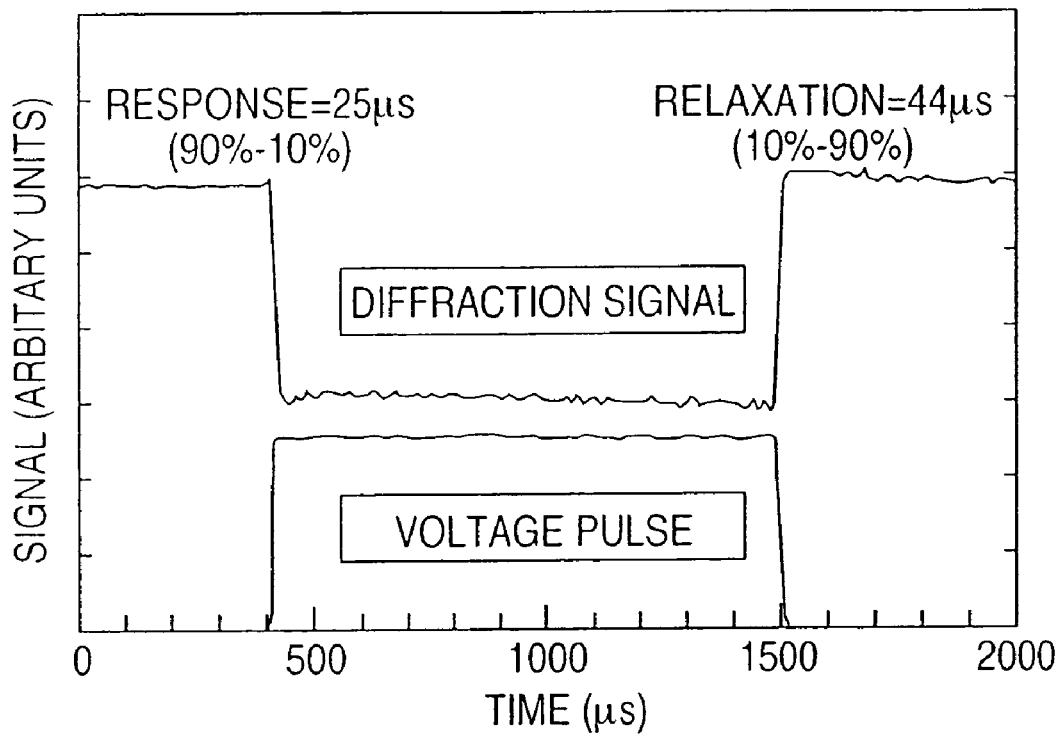
FIG. 14 is a graph showing the switching response time data for the diffracted beam in the surfactant-containing PDLC material.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 13, another unique discovery of the present invention is that adding a surfactant (e.g., octanoic acid) to the prepolymer material in amounts of about 4%-6% by weight of the total mixture resulted in sample holograms with switching voltages near 50 Vrms at lower frequencies of 1-2 kHz. As shown in FIG. 14, it has also been found that the use of the surfactant with the associated reduction in droplet size, reduces the switching time of the PDLC materials. Thus, samples made with surfactant can be switched on the order of 25-44 microseconds.

Figure 15:
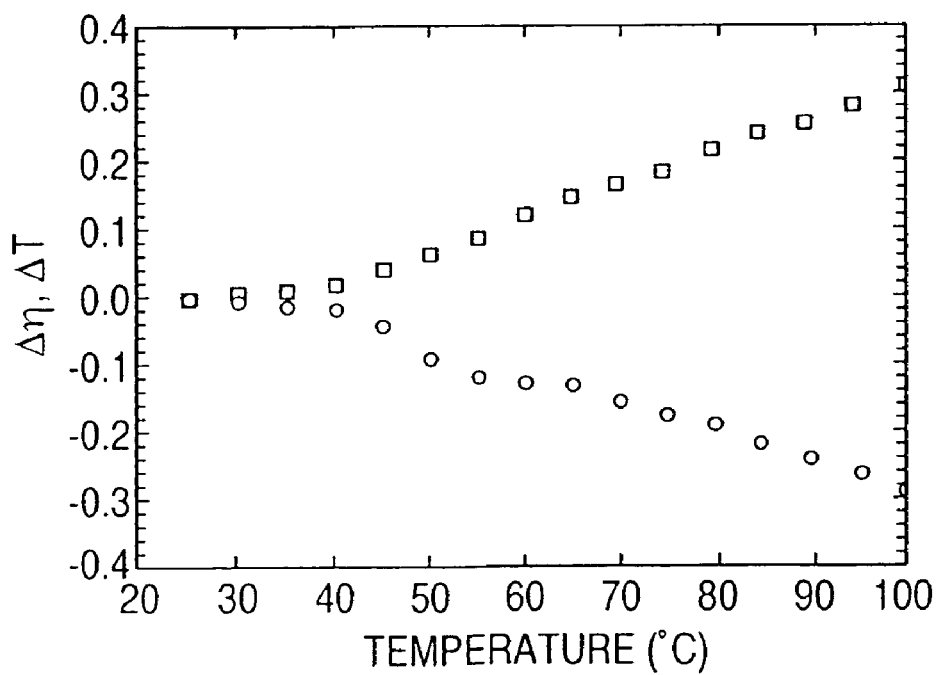
FIG. 15 is a graph of the normalized net transmittance and the normalized net diffraction efficiency of a hologram made according to the teachings of the present invention versus temperature.

Thermal control of diffraction efficiency is illustrated in FIG. 15, a graph of the normalized net transmittance and normalized net diffraction efficiency of a hologram made according to the teachings of the present invention versus temperature.

The polymer-dispersed liquid crystal materials described herein successfully demonstrate the utility for recording volume holograms of a particular composition for such polymer-dispersed liquid crystal systems. Although the disclosed polymer-dispersed liquid crystal systems are specialized, embodiments of the present invention will find application in other areas where a fast curing polymer and a material that can be phase-separated from the polymer will find use.

Figure 16:
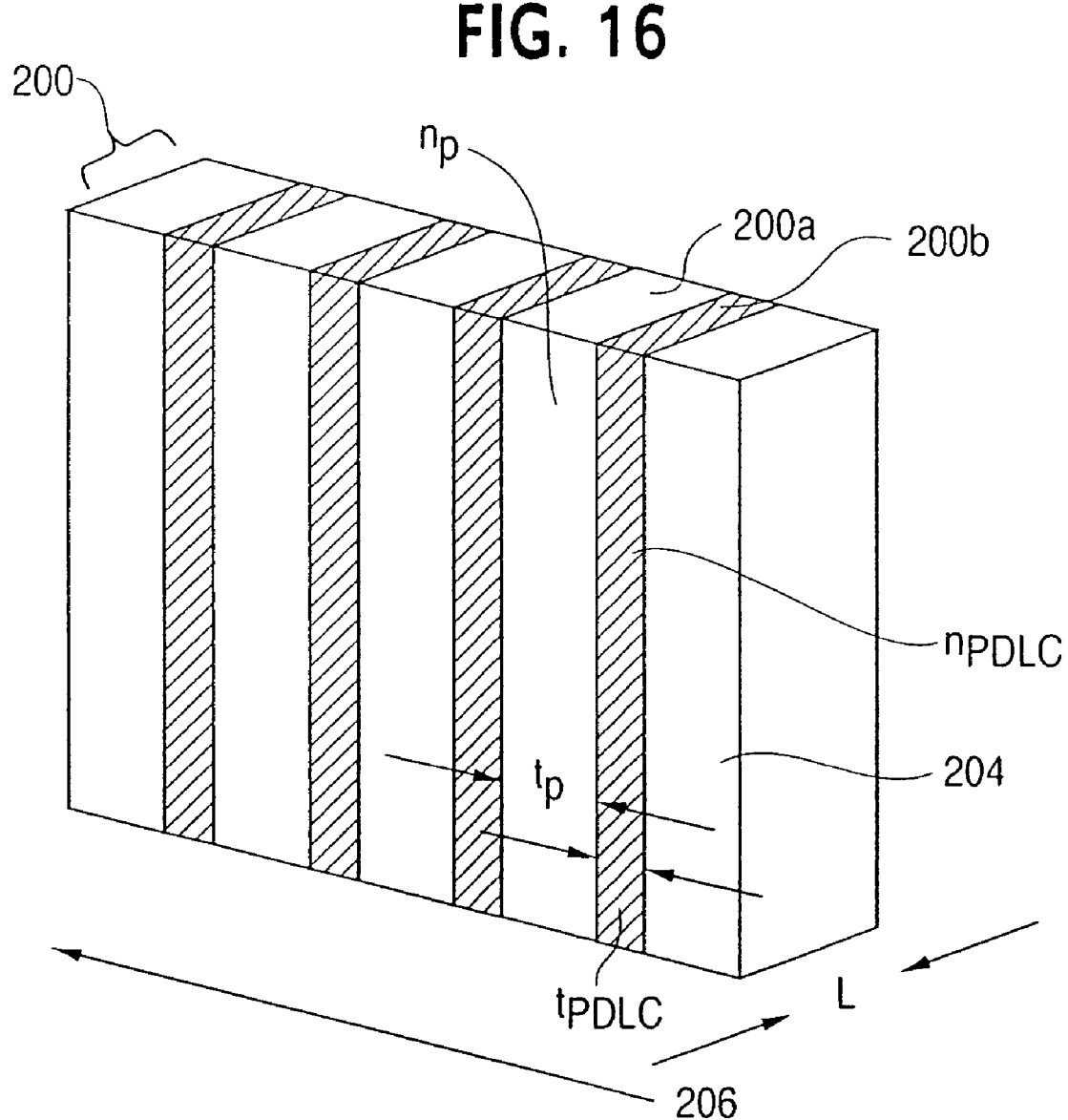
FIG. 16 is an elevational view of a subwavelength grating in accordance with the present invention having planes of polymer channels and PDLC channels disposed perpendicular to the front surface of the grating.

A switchable hologram is one for which the diffraction efficiency of the hologram may be modulated by application of an electric field, and can be switched from a fully on state (high diffraction efficiency) to a fully off state (low or zero diffraction efficiency). A static hologram is one whose properties remain fixed independent of an applied field. In another embodiment of the present invention, PDLC materials can be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 16, there is shown an elevational view of a transmission grating 200 in accordance with the present invention having periodic planes of polymer channels 200a and PDLC channels 200b disposed perpendicular to the front surface 204 of the grating 200. The optic axis 206 is disposed perpendicular to polymer planes 200a and the PDLC planes 200b. Each polymer plane 200a has a thickness $t_p$ and refractive index $n_p$, and each PDLC plane 200b has a thickness $t_{PDLC}$ and refractive index $n_{PDLC}$.

Where the combined thickness of the PDLC plane and the polymer plane is substantially less than an optical wavelength (i.e., $(t_{PDLC}+t_p)<<\lambda$), the grating will exhibit form birefringence. As discussed below, the magnitude of the shift in polarization is proportional to the length of the grating. Thus, by carefully selecting the length, L, of the subwavelength grating for a given wavelength of light, one can rotate the plane of polarization or create circularly polarized light. Consequently, such subwavelength gratings can be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e., retardance=$\lambda/2$, and to form a quarter-wave plate, the retardance must be equal to one-quarter of a wavelength, i.e. retardance=$\lambda/4$. It is known that the retardance is related to net birefringence, $|\Delta n|$, which is the difference between the ordinary index of refraction, $n_o$, and the extraordinary index of refraction $n_e$, of the sub-wavelength grating by the following relation:

$$\text{Retardance}=|\Delta n|L=|n_e-n_0|L$$

Thus, for a half-wave plate, i.e., a retardance equal to one-half of a wavelength, the length of the subwavelength grating should be selected so that:

$$L=\lambda/(2|\Delta n|)$$

Similarly, for a quarter-wave plate, i.e., a retardance equal to one-quarter of a wavelength, the length of the subwavelength grating should be selected so that:

$$L=\lambda/(4|\Delta n|)$$

Figure 17A:
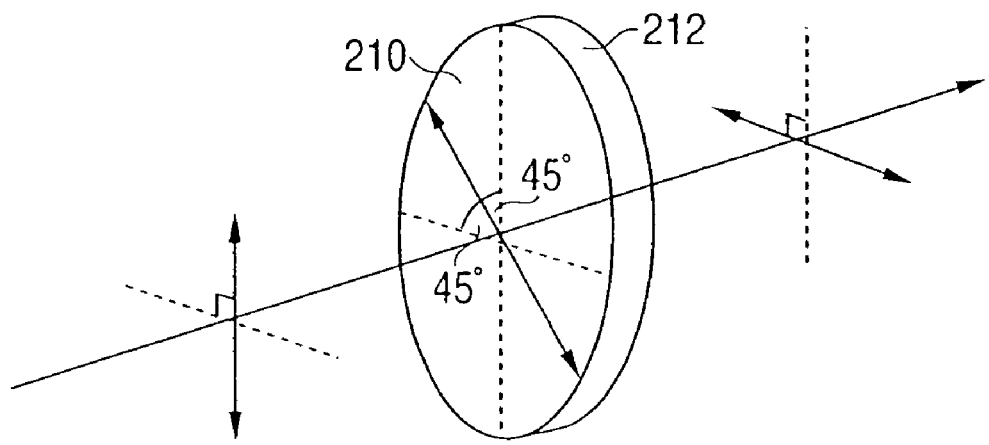
FIG. 17a is an elevational view of a switchable subwavelength grating in accordance with the present invention wherein the subwavelength grating functions as a half wave plate whereby the polarization of the incident radiation is rotated by 90 degrees.
Figure 17B:
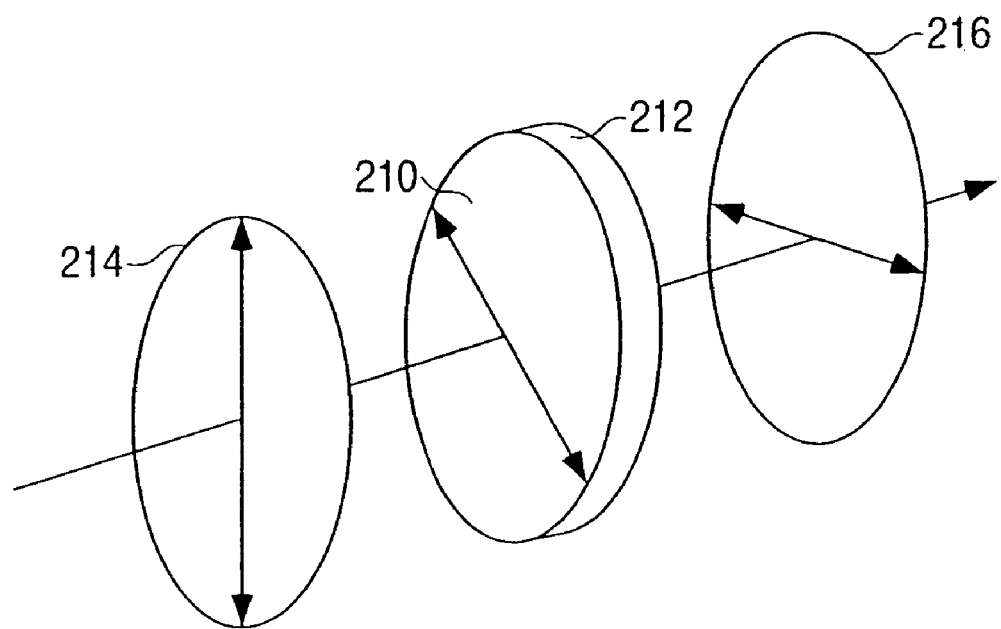
FIG. 17b is an elevational view of the switchable half wave plate shown in FIG. 17a disposed between crossed polarizers through which the incident light is transmitted.
Figure 17C:
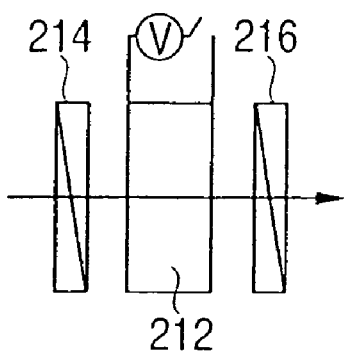
FIGS. 17c and 17d are side views of the switchable half wave plate and crossed polarizers shown in FIG. 17b showing the effect of the application of a voltage to the plate through which the polarization of the light is no longer rotated and is thus blocked by the second polarizer.
Figure 17D:
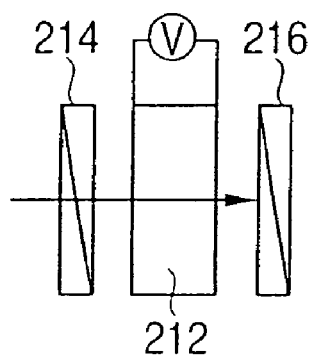

If, for example, the polarization of the incident light is at an angle of 45° with respect to the optical axis 210 of a half-wave plate 212, as shown in FIG. 17a, the plane polarization will be preserved, but the polarization of the wave exiting the plate will be shifted by 90°. Thus, referring now to FIGS. 17b and 17c, where the half-wave plate 212 is placed between cross polarizers 214 and 216, the incident light will be transmitted. If an appropriate switching voltage is applied, as shown in FIG. 17d, the polarization of the light is not rotated and the light will be blocked by the second polarizer.

Figure 18A:
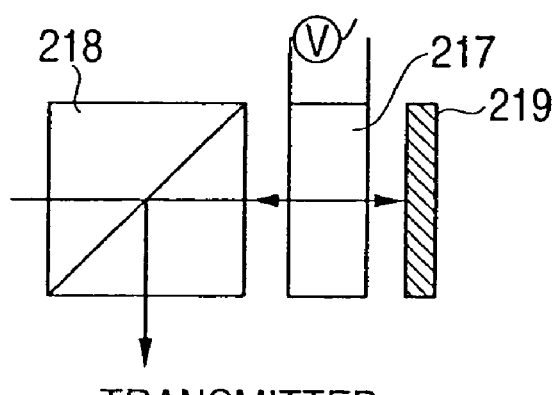
FIG. 18a is a side view of a switchable subwavelength grating in accordance with the invention wherein the subwavelength grating functions as a quarter wave plate so that plane polarized light is transmitted through the subwavelength grating, retroreflected by a mirror and reflected by the beam splitter.
Figure 18B:
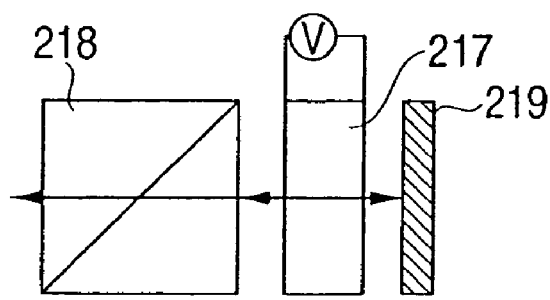
FIG. 18b is a side view of the switchable subwavelength grating of FIG. 18a showing the effect of the application of a voltage to the plate so that the polarization of the light is no longer modified, thereby permitting the reflected light to pass through the beam splitter.

For a quarter wave plate plane polarized light is converted to circularly polarized light. Thus, referring now to FIG. 18a, where quarter wave plate 217 is placed between a polarizing beam splitter 218 and a mirror 219, the reflected light will be reflected by the beam splitter 218. If an appropriate switching voltage is applied, as shown in FIG. 18b, the reflected light will pass through the beam splitter and be retroreflected on the incident beam.

Figure 19A:
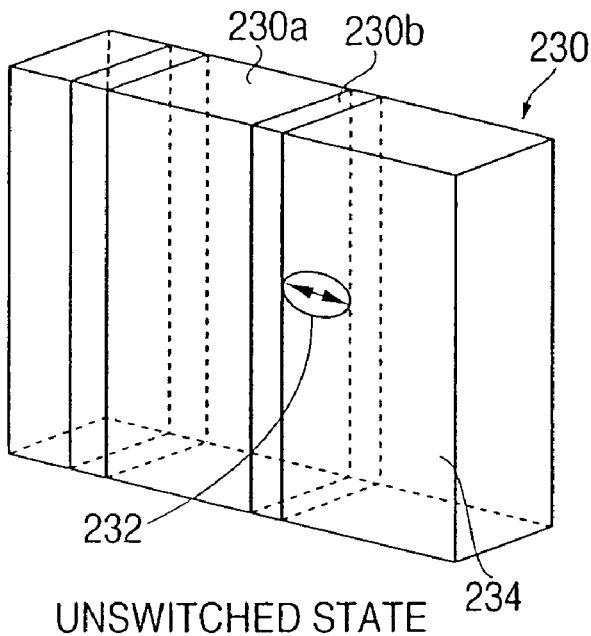
FIGS. 19a and 19b are elevational views of a subwavelength grating in accordance with the present invention having planes of polymer channels and PDLC channels disposed perpendicular to the front face of the grating, respectively, in the absence of an electric field and with an electric field applied, wherein the liquid crystal utilized in formation of the grating has a positive dielectric anisotropy.
Figure 19B:
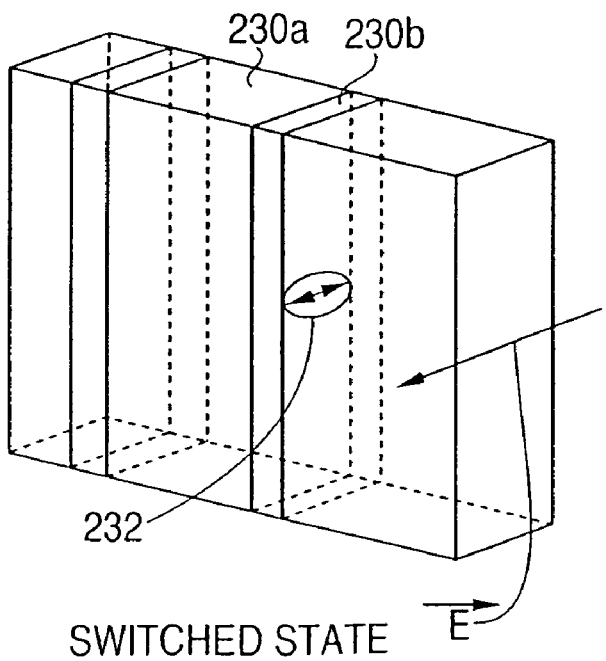

Referring now to FIG. 19a, there is shown an elevational view of a subwavelength grating 230 recorded in accordance with the above-described methods and having periodic planes of polymer channels 230a and PDLC channels 230b disposed perpendicular to the front surface 234 of grating 230. As shown in FIG. 19a, the symmetry axis 232 of the liquid crystal domains is disposed in a direction parallel to the front surface 234 of the grating and perpendicular to the periodic channels 230a and 230b of the grating 230. Thus, when an electric field E is applied across the grating, as shown in FIG. 18b, the symmetry axis 232 distorts and reorients in a direction along the field E, which is perpendicular to the front surface 234 of the grating and parallel to the periodic channels 230a and 230b of the grating 230. As a result, subwavelength grating 230 can be switched between a state where it changes the polarization of the incident radiation and a state in which it does not. The direction of the liquid crystal domain symmetry 232 is due to a surface tension gradient which occurs as a result of the anisotropic diffusion of monomer and liquid crystal during recording of the grating and that this gradient causes the liquid crystal domain symmetry to orient in a direction perpendicular to the periodic planes.

As discussed in Born and Wolf, Principles of Optics, 5th Ed., New York (1975) and incorporated herein by reference, the birefringence of a subwavelength grating is given by the following relation:

where $$n_e^2 - n_o^2 = \frac{-[(f_{PDLC})(f_p)(n_{PDLC}^2 - n_p^2)]}{[f_{PDLC}n_{PDLC}^2 + f_p n_p^2]}$$

$n_o$=the ordinary index of refraction of the subwavelength grating;
$n_e$=the extraordinary index of refraction;
$n_{PDLC}$=the refractive index of the PDLC plane;
$n_p$=the refractive index of the polymer plane;
$n_{LC}$=the effective refractive index of the liquid crystal seen by an incident optical wave;
$f_{PDLC}$=$t_{PDLC}/(t_{PDLC}+t_p)$ and
$f_p$=$t_p/(t_{PDLC}+t_p)$ Thus, the net birefringence of the subwavelength grating will be zero if $n_{PDLC}$=$n_p$.

It is known that the effective refractive index of the liquid crystal, $n_{LC}$, is a function of the applied electric field, having a maximum when the field is zero and a value equal to that of the polymer, $n_p$, at some value of the electric field, $E_{MAX}$. Thus, by application of an electric field, the refractive index of the liquid crystal, $n_{LC}$, and, hence, the refractive index of the PDLC plane can be altered. Using the relationship set forth above, the net birefringence of a subwavelength grating will be a minimum when $n_{PDLC}$ is equal to $n_p$, i.e., when $n_{LC}$=$n_p$. Therefore, if the refractive index of the PDLC plane can be matched to the refractive index of the polymer plane, i.e., $n_{PDLC}$=$n_p$, by the application of an electric field, the birefringence of the subwavelength grating can be switched off.

The following equation for net birefringence, i.e. $|\Delta n|$=$|n_e - n_o|$, follows from the equation given in Born and Wolf (reproduced above):

$$\Delta n = \frac{-[(f_{PDLC})(f_p)(n_{PDLC}^2 - n_p^2)]}{[2n_{AVG}(f_{PDLC}n_{PDLC}^2 + f_p n_p^2)]}$$

where $n_{AVG}$=$(n_e+n_o)/2$

Furthermore, it is known that the refractive index of the PDLC plane $n_{PDLC}$ is related to the effective refractive index of the liquid crystal seen by an incident optical wave, $n_{LC}$, and the refractive index of the surrounding polymer plane, $n_p$, by the following relation:

$$n_{PDLC} = n_p + f_{LC}[n_{LC} - n_p]$$

where $f_{LC}$ is the volume fraction of liquid crystal dispersed in the polymer within the PDLC plane, $f_{LC}$=$[V_{LC}/(V_{LC}+V_P)]$
$V_{LC}$=the volume of the liquid crystal and
$V_P$=the volume of the polymer.

By way of example, a typical value for the effective refractive index for the liquid crystal in the absence of an electric field is $n_{LC}$=1.7, and for the polymer layer $n_p$=1.5. For a grating where the thickness of the PDLC planes and the polymer planes are equal (i.e., $t_{PDLC}$=$t_p$, $f_{PDLC}$=0.5=$f_p$) and $f_{LC}$=0.35, the net birefringence, $\Delta n$, of the subwavelength grating is approximately 0.008. Thus, where the incident light has a wavelength of 0.8 µm, the length of the subwavelength grating should be 50 µm for a half-wave plate and 25 µm for a quarter-wave plate. Furthermore, by application of an electric field of approximately 5 V/µm, the refractive index of the liquid crystal can be matched to the refractive index of the polymer and the birefringence of the subwavelength grating turned off. Thus, the switching voltage, $V_\pi$, for a half-wave plate is on the order of 250 volts, and for a quarter-wave plate approximately 125 volts.

By applying such voltages, the plates can be switched between the on and off (zero retardance) states on the order of microseconds. As a means of comparison, current Pockels cell technology can be switched in nanoseconds with voltages of approximately 1000-2000 volts, and bulk nematic liquid crystals can be switched on the order of milliseconds with voltages of approximately 5 volts.

Figure 20:
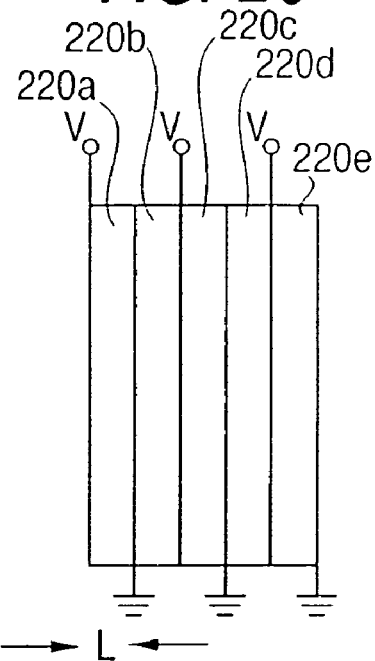
FIG. 20 is a side view of five subwavelength gratings wherein the gratings are stacked and connected electrically in parallel thereby reducing the switching voltage of the subwavelength grating.

In an alternative embodiment of the invention shown in FIG. 20, the switching voltage of the subwavelength grating can be reduced by stacking several subwavelength gratings 220a-e together, and connecting them electrically in parallel. By way of example, it has been found that a stack of five gratings each with a length of 10 µm yields the thickness required for a half-wave plate. It should be noted that the length of the sample is somewhat greater than 50 µm, because each grating includes an indium-tin-oxide coating which acts as a transparent electrode. The switching voltage for such a stack of plates, however, is only 50 volts.

Subwavelength gratings in accordance with embodiments of the present invention find suitable application in the areas of polarization optics and optical switches for displays and laser optics, as well as tunable filters for telecommunications, colorimetry, spectroscopy, laser protection, and the like.

Similarly, in accordance with embodiments of the present invention, a high birefringence static sub-wavelength waveplate can also be formed. Due to the fact that the refractive index for air is significantly lower than for most liquid crystals, the corresponding thickness of the half-wave plate would be reduced accordingly. Synthesized wave-plates in accordance with embodiments of the present invention can be used in many applications employing polarization optics, particularly where a material of the appropriate birefringence at the appropriate wavelength is unavailable, too costly, or too bulky.

In a first preferred embodiment of the present invention, the PDLC holographic grating elements are components in an optical add/drop multiplexer (OADM). When inserted into an optical path (e.g., fiber) carrying multiple wavelength division multiplexed (WDM) wavelengths, an OADM performs the function of "dropping" one or more of the wavelength streams from the fiber and/or "adding" one or more wavelength streams to the fiber. It is relatively simple to construct an OADM that drops and adds fixed wavelengths all the time. However, optical networks need the flexibility to respond dynamically to a changing demand profile. Therefore, a remotely reconfigurable OADM is desirable. A schematic for a reconfigurable OADM using the PDLC material is shown in FIG. 21.

Figure 21:
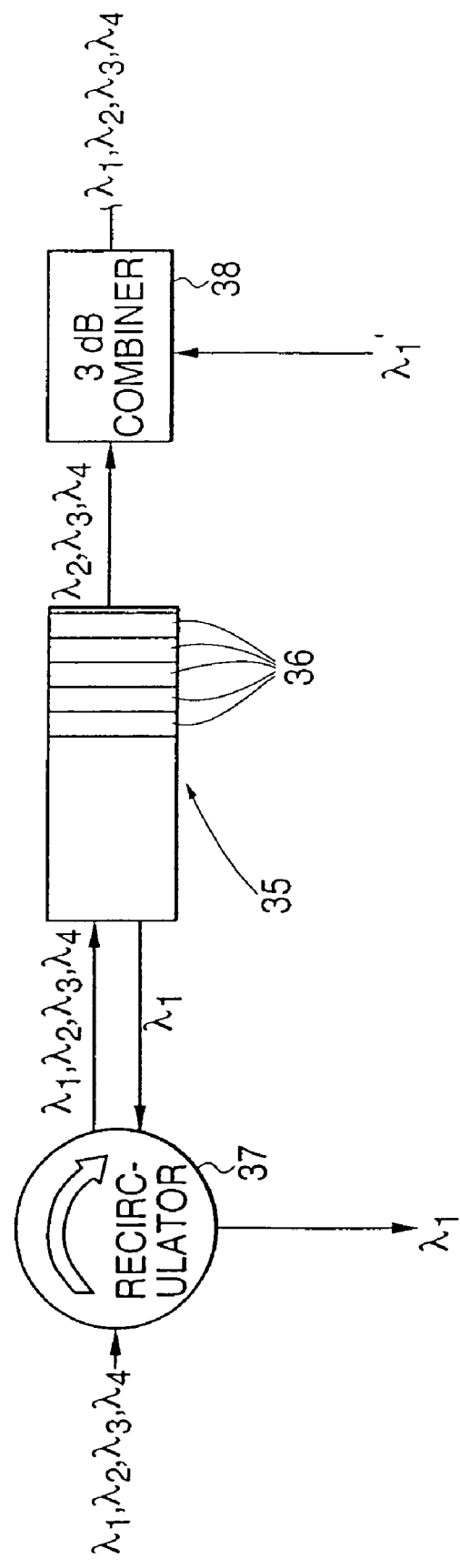
FIG. 21 is a schematic illustration of a remotely configurable optical add/drop multiplexer (OADM) according to an embodiment of the present invention.

Referring to FIG. 21, a preferred embodiment of an OADM system 30 is shown which includes a PDLC switchable fiber Bragg filter 35 formed from a stack of switchable Bragg gratings 36, each of which is set to diffract one of the unique WDM wavelengths inputted thereto via a conventional input device such as a fiber or waveguide. In FIG. 21 a recirculator 37 and a combiner 38 are located on either side of the switchable Bragg grating filter 35 to complete the OADM system 30. The drop function for a particular wavelength is achieved by setting all the filters to the transparent mode except for the one with the corresponding wavelength, which is set to opaque. The chosen wavelength is diffracted while the remaining wavelengths are transmitted through the filter without optical interaction. Any wavelength can be added, of course, depending on the wavelength of the laser source for the added signal stream.

In an alternative preferred embodiment of the present invention, switchable PDLC gratings are combined to create a variable frequency laser source for Dense Wavelength Division Multiplexing (DWDM). As the number of wavelengths in DWDM systems increases, the provisioning of laser sources becomes more and more of a problem for carriers. Ideally, one would like to have a tunable laser source so that one laser could serve as a replacement for a large number of different wavelength sources. The tunable laser would be tuned to the correct frequency when it was put into service. The PDLC variable frequency laser source is discretely tunable and is very cheap relative to the tunable sources currently under development.

In an embodiment of a DWDM scheme, optical signals at different wavelengths centered about 1550 nm and separated by 100-200 GHz (~0.8-1.6 nm) are multiplexed down a single fiber or waveguide. A filter is desired that can select one wavelength out of this set. A Bragg filter is ideal for this, because it will selectively reflect light at a specific wavelength. However, another requirement is that it have a narrow bandwidth so that it does not partially reflect another nearby wavelength, producing loss and crosstalk between channels. The bandwidth of a Bragg filter can be estimated by $\Delta\beta \sim \kappa$, where $\Delta\beta = \beta - |K|/2$, $\beta = 2\pi n_{eff}/\lambda$, $n_{eff}$ is the effective mode refractive index, K is the grating vector, and $\kappa$ is the grating coupling constant. The latter can be given by $\kappa = \pi n_1/\lambda$, where $n_1$ is the grating index modulation. The bandwidth relation can be recast in terms of frequency bandwidth $\Delta\nu$ ($\Delta\nu/\nu = \Delta\beta/\beta$), which sets the size of $n_1$ by the wavelength separation requirement of the DWDM scheme. Thus, $n_1 \sim 2n_{eff}\lambda\Delta\nu/c$, where c is the speed of light. For $n_{eff} \approx 1.5$, $\lambda \approx 1550$ nm, and $\Delta\nu = 100$-$200$ GHz, we have the requirement that $n_1 \sim 0.0015$-$0.0030$. This is about one order of magnitude smaller than the index typically achieved in switchable PDLC holograms ($n_1 \sim 0.02$-$0.05$). The reflection efficiency can be estimated from $R \approx \tanh^2(\kappa L)$, where L is the physical length of the filter. Given the above requirement on index modulation, for R=0.9999, we must have L~0.9-1.8 mm. For R=0.99999, L~1.1-2.2 mm. This is very thick compared to typical PDLC holograms that are typically ~10 µm thick. Therefore, two requirements of the switchable Bragg filter in these DWDM applications are that it (1) be physically thick, and (2) have small index modulation.

A concept for a switchable Bragg filter in a channel waveguide that meets the aforementioned requirements is described as shown in FIGS. 22a-d. In a process for forming a channel waveguide Bragg filter an empty channel of waveguide dimensions known to those skilled in the art, is etched in a glass or polymer substrate of the appropriate refractive index (FIG. 22a). Next, the channel is filled with a pre-polymer/liquid crystal ("PPLC") material (FIG. 22b). As described above, this PPLC material, once exposed, becomes the PDLC material. The PPLC material is exposed to two coherent laser beams from the same side of the substrate as shown in FIG. 22c. Finally, upon curing, a holographic PDLC grating is formed with grating vector K parallel to the channel axis as illustrated in FIG. 22d. In a preferred embodiment of the present invention, the grating period is $\Lambda \sim 0.5$ µm, and the total length of the filter is L~1-2 mm. For light propagated down this waveguide, this grating looks like a reflection grating, and light of wavelength $\lambda = 2n_{eff}\Lambda \sim 1500$ nm will match the Bragg condition and be selectively reflected, for $n_{eff} \sim 1.5$.

Light propagating down the channel waveguide will see liquid crystal domains 20 with symmetry axes pointing primarily along the grating vector 22, but with a small statistical distribution 25 about this direction as shown in FIG. 23. With the azimuthally symmetric distribution of symmetry axes shown in FIG. 23, both TE and TM polarized light will see the same admixture of indices $n_o$ and $n_e$ in the liquid crystal domains 20, on average. Hence, the index modulation seen by light is polarization insensitive, and no polarization diversity scheme is needed for this device. Moreover, since the liquid crystal domain index seen by light is weighted most heavily by $n_o$ and only partially by $n_e$, the resulting index modulation will be small. Thus, the two requirements of the Bragg filter are met: a small index modulation and a physically thick filter. In addition, the reflection efficiency of this filter will be polarization insensitive.

Figure 24:
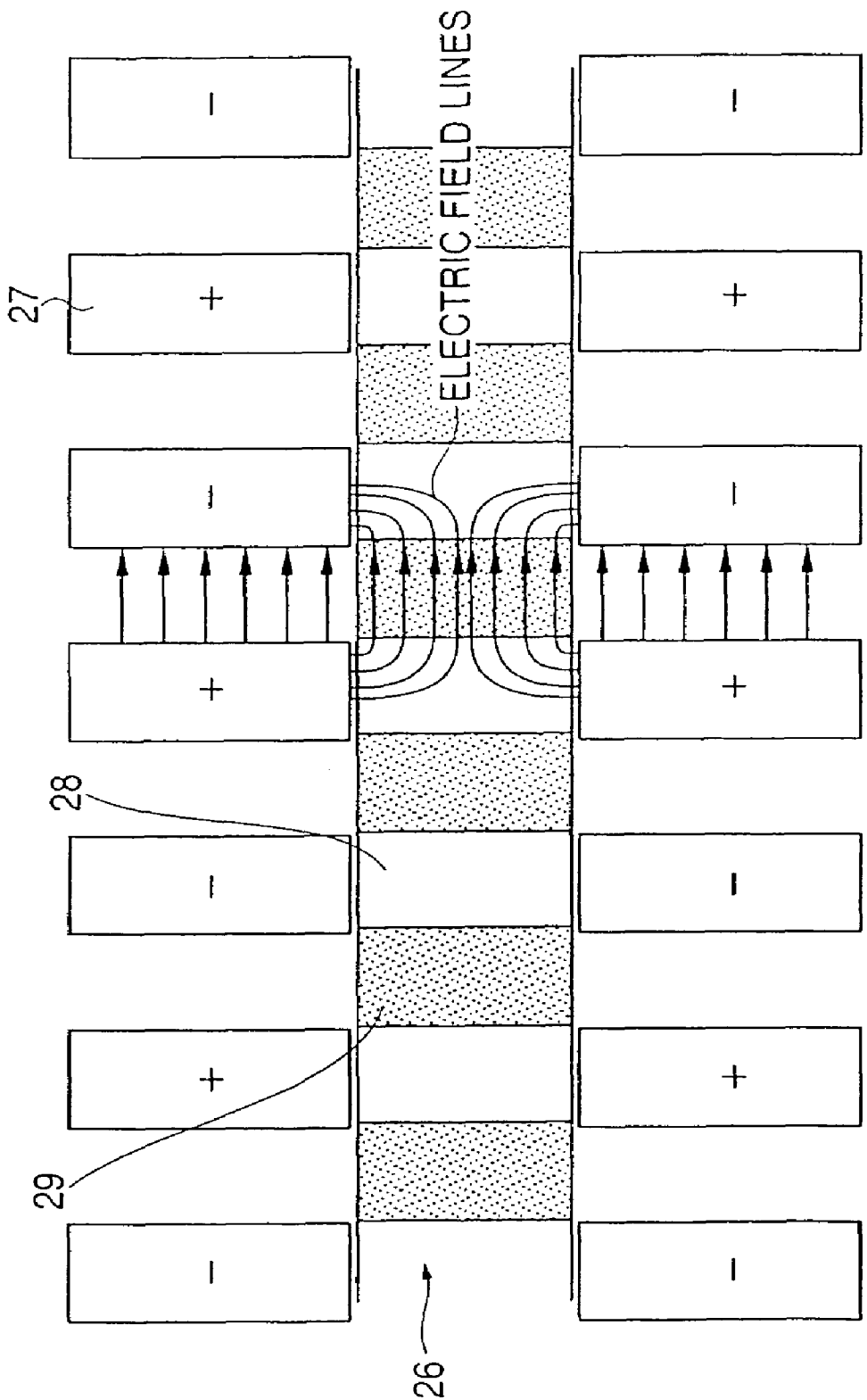
FIG. 24 is an electrode configuration for switching a PDLC holographic reflection grating according to an embodiment of the present invention.
Figures 25A, 25B:
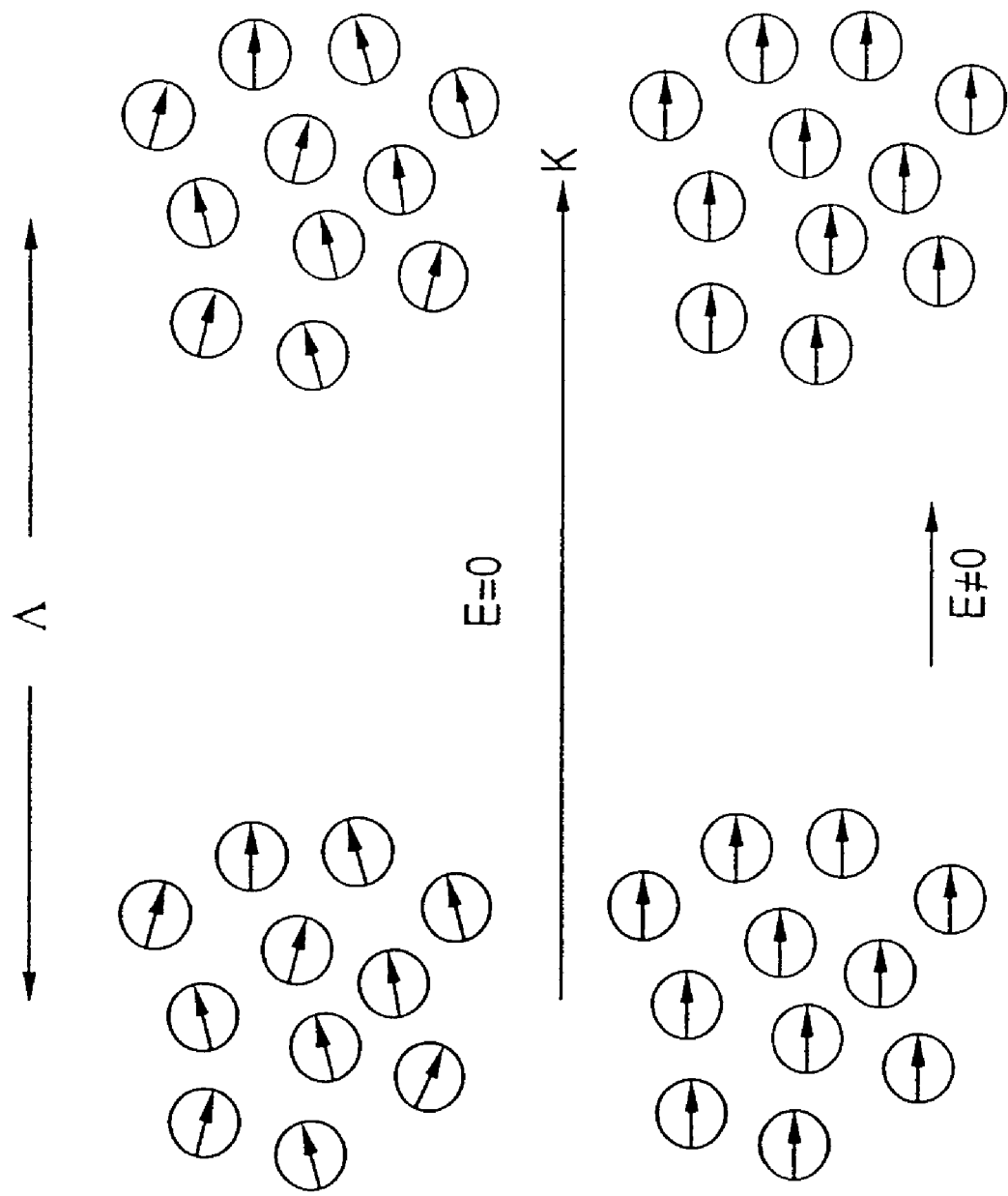
FIGS. 25(a)-(b) are schematic illustrations of alignment scenarios of liquid crystal domain axes in a PDLC holographic reflection grating according to an embodiment of the present invention.

In a preferred embodiment of the present invention, the switching of the PDLC Bragg filters is accomplished by supplying and removing a voltage to the filter via a voltage source. Finger electrodes 27 attached to the filter are deposited in the formation illustrated in FIG. 24. These can be made using standard gold, aluminum, ITO, or other electrode materials known to those skilled in the art. Similarly, any known deposition method may be used to deposit the electrode material, e.g., sputtering or lithography. In this embodiment, the fingers are deposited adjacent to the waveguide 26 and adjacent to the pure polymer regions 28 of the PDLC grating as opposed to the PDLC regions 29 of the waveguide 26. Opposite polarity voltages are applied to every other electrode 27 on the same side of the waveguide 26, and same polarity voltages are applied to electrodes 27 directly opposite one another on opposite sides of the waveguide 26. If alternating current ("ac") voltage waveforms are used, then every other electrode is grounded, and all other electrodes are "hot" (same or opposite polarity). Electrodes 27 on the opposite side of the waveguide 26 are addressed electrically in an identical manner. This produces the electric field lines as shown. The fringe field pattern of electrodes 27 on opposite sides of the waveguide 26 super-pose to form a longitudinal field in the PDLC regions 29 of the filter. This causes the droplet axes to line up in the direction of the grating vector, and the index modulation seen by light switches to zero as shown in FIG. 25a-b. Thus, the filter is switched off.

In a further embodiment of the present invention, multiple individual Bragg filters are concatenated as shown in FIG. 26. Each filter has a slightly different period $\Lambda$, set to cause reflection of light centered at one of the DWDM wavelengths. With all of the filters powered except the one with period $\Lambda j$, all wavelengths pass except $\lambda j$, which is retroreflected back along the waveguide. Alternatively, with all filters unpowered except the one with period $\Lambda j$, all wavelengths are retroreflected except $\lambda j$, which is passed along the waveguide.

The finger electrode pattern can be fabricated simultaneously with the holographic filter recording in a manner outlined in FIGS. 27a-b. In this process, the selected electrode material is coated uniformly onto the non-etched regions of the glass or polymer substrate. Next, the electrode materials are coated uniformly with a negative photoresist. The negative photoresist is exposed to the interfering incident beams and the photoresist is consequently exposed to alternating light and dark regions. As a result of this exposure, alternating regions will be susceptible to etching processes so as to form the finger electrodes. Prior to laser exposure, the etched channel is filled with a prepolymer/liquid crystal material as shown in FIG. 22b. The entire structure is then exposed holographically using two coherent laser beams from the same side of the substrate, as illustrated in FIG. 27a. With subsequent lithographic processing, the areas of the electrodes exposed to bright fringes remain while the material in the dark fringes is removed, forming the desired finger electrode structure shown in FIG. 27b, with electrodes adjacent to pure polymer regions in the filter. Alternatively, a positive photoresist may be used, such as Shipley Megaposit® SPR®3000 series. These may be exposed in the blue and can produce line features <0.4 µm. In this case, a phase mask is placed in front of one of the recording beams. For example, this could be two pieces of suitably thick glass placed over the part of a beam incident on the electrode materials. The purpose of the phase mask is to shift the phase of light in the electrode regions so that the fringes shift spatially by 180° with respect to the channel region. After processing, this would yield the same pattern as shown in FIG. 27b. Precaution may need to be taken during this process to ensure the PDLC filter/waveguide region is not damaged. This is one switching technique. However, any scheme that will yield a longitudinal field along the grating vector will work for this device.

Long-period fiber gratings, with $\Lambda >> \lambda$, have been employed as wavelength selective attenuators in DWDM applications. These can be used, for example, to flatten the gain spectrum of an Er-doped fiber laser [see, e.g., A. M. Vengsarkar et al., Opt. Lett. 21, 336 (1996)]. These are a series of different static gratings that must be pre-recorded to precisely match the inverted gain profile of the Er laser when concatenated. Long-period fiber gratings produce wavelength selective loss by coupling radiation at a specific wavelength from a guided mode to a cladding mode. The cladding modes are very lossy. Thus, the optical signal at the selected wavelength is attenuated.

Figure 28A:
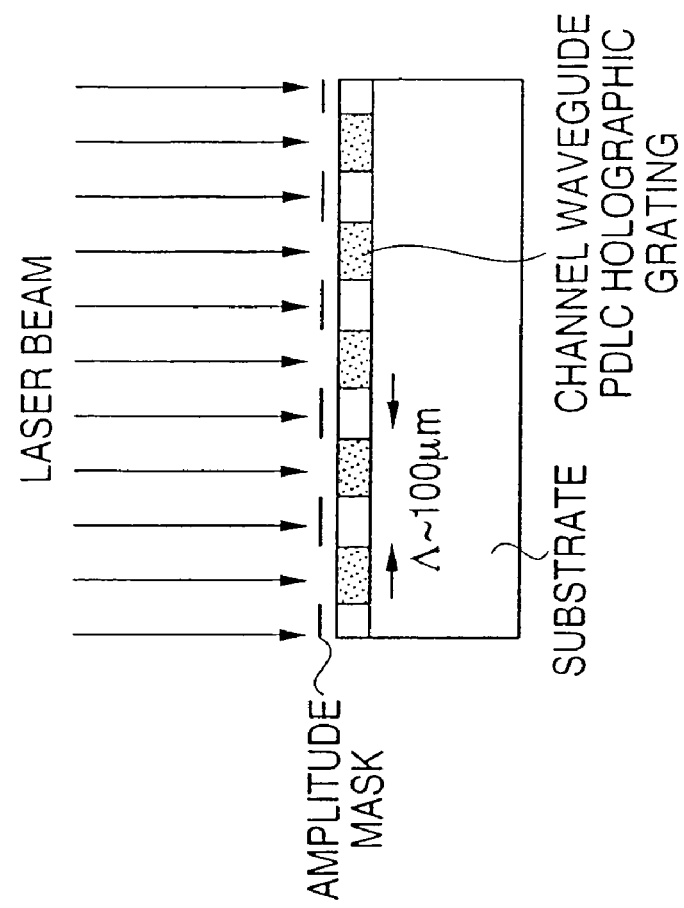
FIGS. 28(a)-(b) are schematic representations of recording scenarios for recording long-period gratings according to an embodiment of the present invention.
Figure 28B:
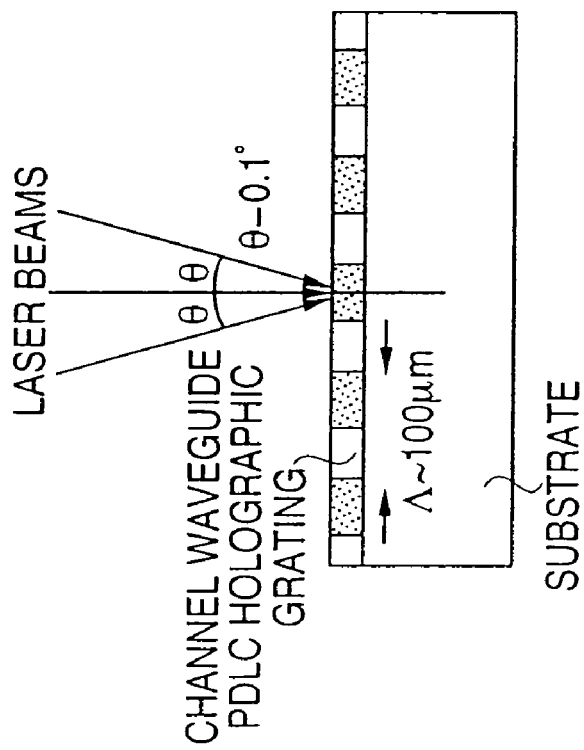

In an alternative embodiment of the present invention, a wavelength selective attenuator whose properties can be finely adjusted by an external stimulus (e.g., an electric field) to control the attenuation is shown. The variable attenuator is formed using a PDLC switchable hologram. A channel waveguide PDLC grating is fabricated as described above with reference to FIGS. 22(a)-(d) and FIGS. 27(a)-(b). However, the two laser beams are directed in a symmetrical way at relatively small angles with respect to the normal of the glass or polymer substrate as illustrated in FIG. 28(a). In an embodiment utilizing this laser exposure configuration, the resulting grating period is $\Lambda = \lambda/2n\sin\theta$, where $\lambda$ is the recording wavelength. For $\lambda$=532 nm, n~1.5, an angle of $\theta$~0.1° will make a grating with period $\Lambda$~100 µm. Alternatively, an amplitude mask may be used, as shown in FIG. 28(b), with the mask flood-loaded with a single beam of the recording light. In the embodiment using an amplitude mask, it may be desirable to cover the PDLC channel waveguide with another substrate prior to recording to form a symmetrical structure. Depositing finger electrodes as described with reference to FIGS. 27(a)-(b) above completes the device.

The phase-matching condition for coupling light from the core (channel) to the cladding (substrate) mode is given by $n_{co} - n_{cl} = \lambda/\Lambda$, where "co" stands for core, "cl" stands for cladding, $n_{co}$, and $n_{cl}$ are the effective core and cladding refractive indices, respectively, at, for example, wavelength ~1550 nm, and $\Lambda$~100 µm. The strength of the coupling, or equivalently, the transmission loss through the grating, is determined by the index modulation of the grating. Through the application of electric fields as described above, the index modulation can be varied in a continuous manner from maximum at zero field to zero modulation at a field where droplet symmetry axes are all aligned along the grating vector.

Figure 29:
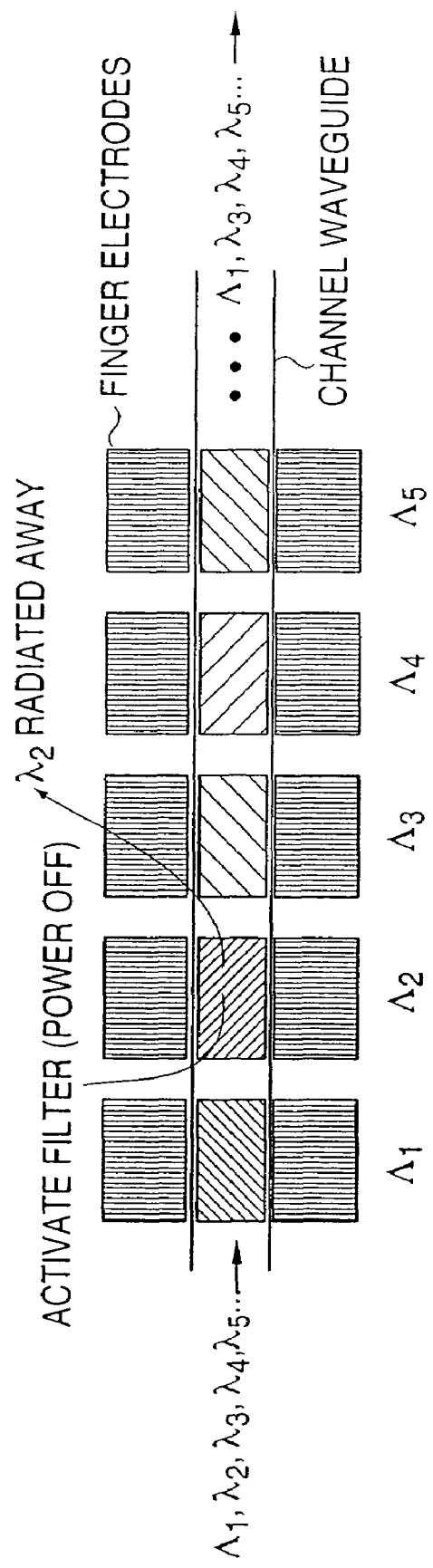
FIG. 29 is a schematic representation of a concatenation of long-period gratings according to an embodiment of the present invention.

In an embodiment of the present invention, several long-period PDLC gratings centered at wavelengths $\lambda_i$ are concatenated as shown in FIG. 29. For example, these could be wavelengths in the gain spectrum of an Er laser. However, the use of the device is not limited to this application. By applying different voltages to each grating, the desired spectral shape of the transmission loss filter can be achieved.

An alternative method of fabricating a voltage-controlled long-period PDLC grating is illustrated in FIGS. 30(a)-(b). A PDLC grating is fabricated using the process described with reference to FIG. 27(a)-(b), but with a short period that is well outside the Bragg regime for, by way of example, $\lambda$~1550 nm (e.g., $\Lambda \leqq 0.4$ µm or $\Lambda \geqq 0.6$ µm, with $n_{eff}$~0.5). The grating is made several millimeters in length and finger electrodes may be applied as described with reference to FIG. 27(a)-(b). Light will not be diffracted by this index modulation, but will see an effective index that will change as a voltage is applied to the electrodes. A different voltage is applied to each finger electrode in such a manner that the voltage profile is periodic along the channel waveguide with period ~100 µm. This will electro-optically induce a long-period grating in the waveguide as shown. In an alternative embodiment, a complex transmission spectrum is produced where the desired spectral shape is Fourier analyzed, and the resulting combination of periodic voltages superposed on the electrodes, yielding the desired transmission spectrum.

Figure 31A:
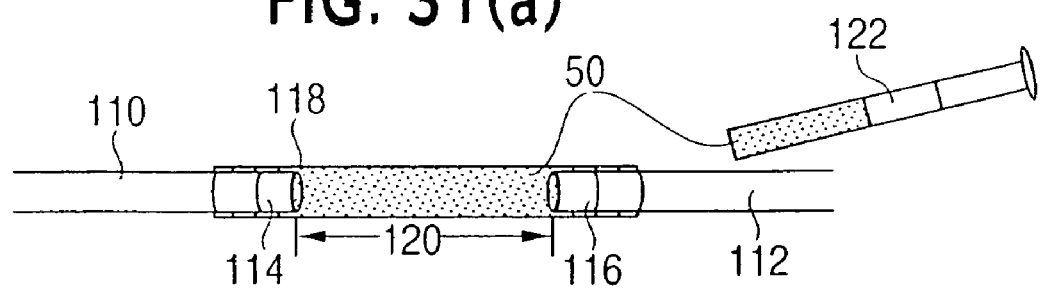
FIGS. 31(a)-(b) are schematic representations of a filter integrated with a fiber during formation thereof according to an embodiment of the present invention.
Figure 31B:
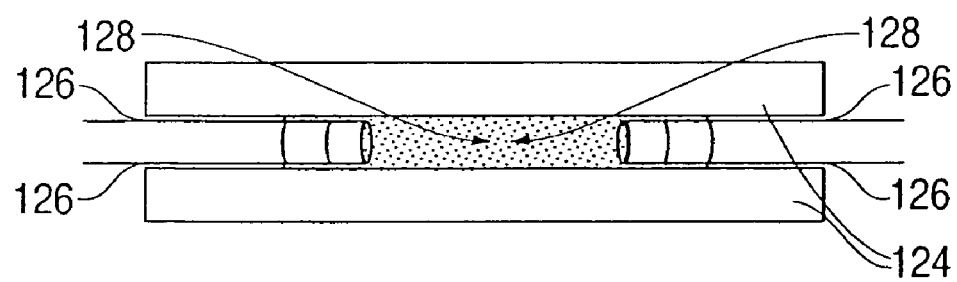
Figure 31C:
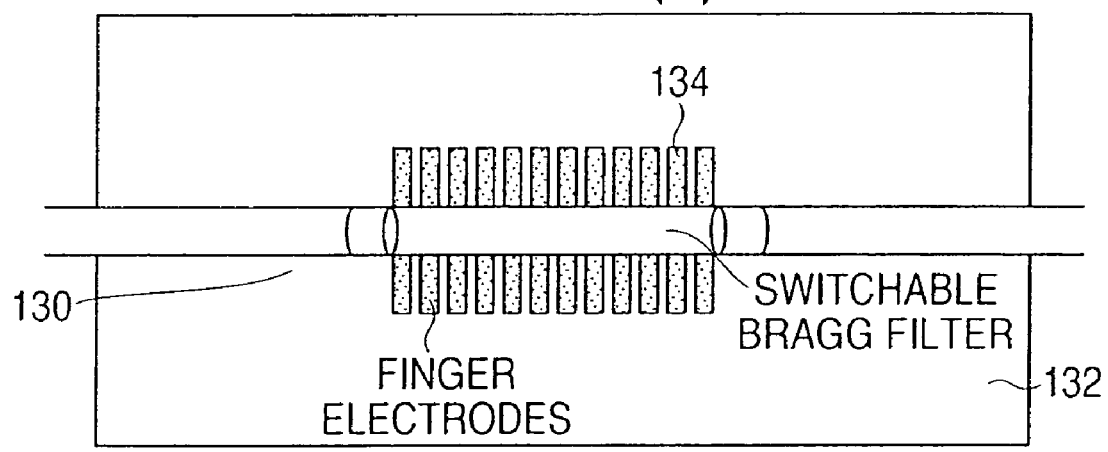
FIGS. 31(c)-(d) are schematic representations of the electrode configuration for switching a filter according to an embodiment of the present invention.
Figure 31D:
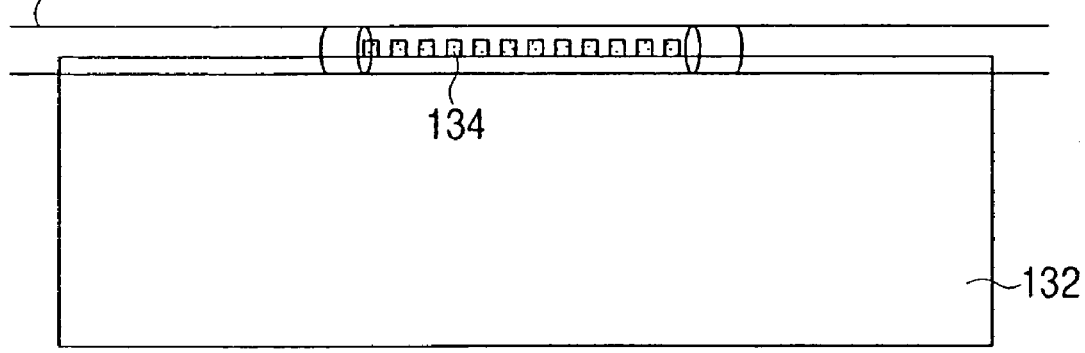

In an alternate embodiment shown in FIG. 31(a)-(b), a method and system for fabricating a switchable Bragg grating (either short-period or long-period) coupled to two optical fibers is illustrated. Referring to FIG. 31(a), a pre-polymer/liquid crystal holographic material 50 is formed in a cylindrical geometry, such that when the material 50 is polymerized, a switchable Bragg grating is formed that is in line with two optical fibers 110 and 112, respectively. In this embodiment, the two fibers are fitted with graded refractive index (GRIN) lenses 114 and 116. A first GRIN lens 114 out-couples and collimates light from a first fiber 110 into the switchable Bragg grating formed from material 50. A second GRIN lens 116 collects and couples light into a second fiber 112. These GRIN lenses are optically contacted to the ends of the fibers using an optical adhesive. The two optical fiber/GRIN lenses 114 and 116 are inserted into a hollow capillary tube 118, leaving a gap 120 for the Bragg grating, on the order of a few millimeters in length. The pre-polymer/liquid crystal holographic material 50 is injected, e., by a syringe 122, into the gap 120 so that it fills the gap and makes optical contact with the GRIN lenses 114 and 116. The geometry of the capillary tube 118 is not limited, and may be, for example, cylindrical or rectangular. In a specific embodiment, the capillary could be fitted with a fill port over the region of the gap between the two fibers to facilitate the injection of the pre-polymer/liquid crystal material 50.

The previously prepared pre-polymer/liquid crystal material 50 is then sandwiched between two optical flats 124 (e.g., glass plates), as shown in FIG. 31(b). The flats 124 are clamped together, and an index matching solution 126 is injected between the flats which fills all gaps in the structure. One purpose of this is to present an optically flat medium to incident light, with no index-mismatched surfaces that would produce spuriously scattered light. This structure is then irradiated with two coherent beams of light 128 incident on the same side of the structure. The pre-polymer/liquid crystal material 50 absorbs the light, and the ensuing polymerization produces a holographic PDLC Bragg grating with grating vector along the fiber axes. The average index of refraction of the Bragg grating thus formed will be substantially equal to the index of refraction of the fiber core and GRIN lens materials. In a further specific embodiment, the inner surface of the capillary in FIG. 31(a)-(b) is treated with a release agent so that the capillary can be removed (e.g., split and detached) after the Bragg grating fabrication is completed.

Referring to FIG(s). 31(c)-(d), a system and method for switching the holographic PDLC Bragg grating of FIG. 31(a)-(b) is nearly identical to the system described with reference to FIG. 24. As with the channel geometry, it is desirable to orient the liquid crystal symmetry axes in a direction along the grating vector (which is also the direction of light propagation) to switch the grating off. The fiber/grating assembly 130 is positioned in a groove etched in a glass or polymer block 132 and clamped in place (clamps not shown). Finger electrodes 134 are deposited on the surface of the block 132 as shown. Finger electrodes 134 are addressed in the manner described with reference to FIG. 24, such that a longitudinal electric field is established in the Bragg grating, parallel to the propagation axis/grating vector and the Bragg grating is switched off.

In an alternate embodiment, the polymerized PDLC grating is etched and/or polished to a dimension that is commensurate with the core of the fiber (~10 μm for single-mode fibers) and the finger electrodes are placed in close proximity to the reduced structure. This configuration may lower the applicable voltage requirement for establishing the critical field for switching the liquid crystal droplets. Techniques are well known in the art for polishing glass fibers in this way to expose the core. Another advantage to reducing the dimension of the PDLC grating is the resulting total internal reflection (TIR) which occurs at the grating-air interface. The occurrence of TIR increases the propagation and coupling efficiency of the incoming beam into the receiving fiber.

An alternative switching method and system, compatible with the cylindrical geometry of fibers, is illustrated in FIG. 32. An electric current-carrying coil of wire 150 is wrapped tightly (more tightly than illustrated) around the cylindrical switchable Bragg grating 152, forming a magnetic solenoid. Current is applied to the solenoid through power supplies, establishing a magnetic field along the axis of the coil 150 that is collinear with the axes of the fibers and the Bragg grating 152. Due to the magnetic anisotropy of the liquid crystal ($\Delta\chi=\chi_{\|}-\chi_{\perp}$, where $\chi_{\|}$ and $\chi_{\perp}$ are the magnetic susceptibilities parallel and perpendicular to the liquid crystal droplet symmetry axis, respectively), the droplet axes align preferentially with the applied magnetic field H. This produces the same effect that a longitudinal electric field would produce, and switches the filter off in a manner analogous to that illustrated in FIG. 25(b), where the E field is replaced by the H field. In this switching method, field strength is independent of the coil diameter, and is consequently independent of the grating diameter. The field strength depends on the current in the coil and the number of turns of the coil per unit length.

Figure 33:
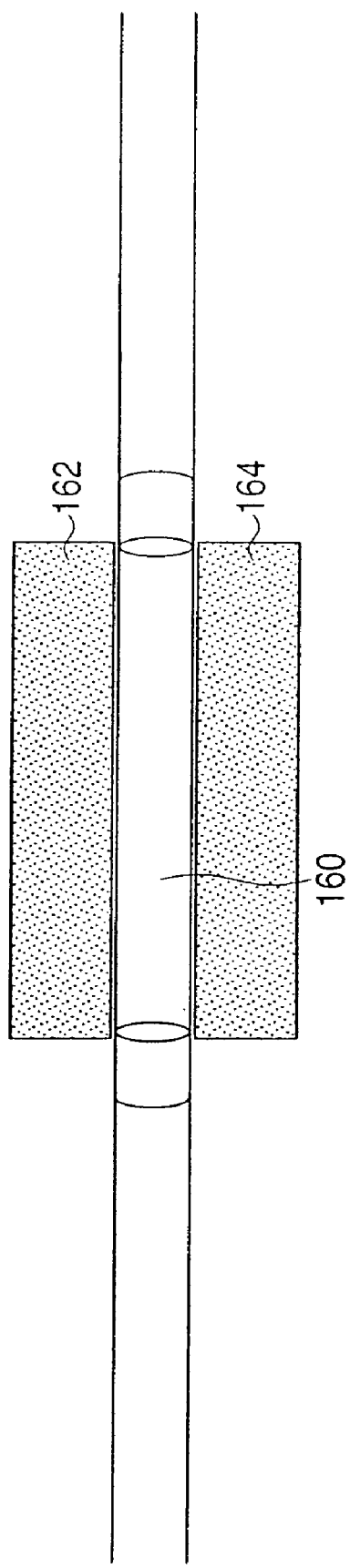
FIG. 33 is a schematic representation of a system for switching a filter according to an embodiment of the present invention.

A further alternative switching method and system for a cylindrical grating is illustrated in FIG. 33. The switchable grating 160 is positioned between at least two heater blocks (e.g., top 162 and bottom 164), and as many as four heater blocks (e.g., top and bottom and both sides) (not shown). The electrically driven heater blocks 162 and 164 (e.g., ceramic resistors) heat the grating 160 when power is applied to them. This raises the temperature of the liquid crystal droplets in the grating 160, lowering their effective refractive index as temperature increases. Near or at the critical temperature for transition from the nematic phase to the isotropic phase, the index of refraction of the liquid crystal substantially matches that of surrounding polymer, thus causing the index of refraction modulation to vanish and the grating to switch off. When power is removed from the heaters, the liquid crystals cool back to their nematic state, and the original index of refraction modulation is restored; the grating is switched back on. Due to the small thermal mass of the grating, this switching is quite rapid.

Figure 34A:
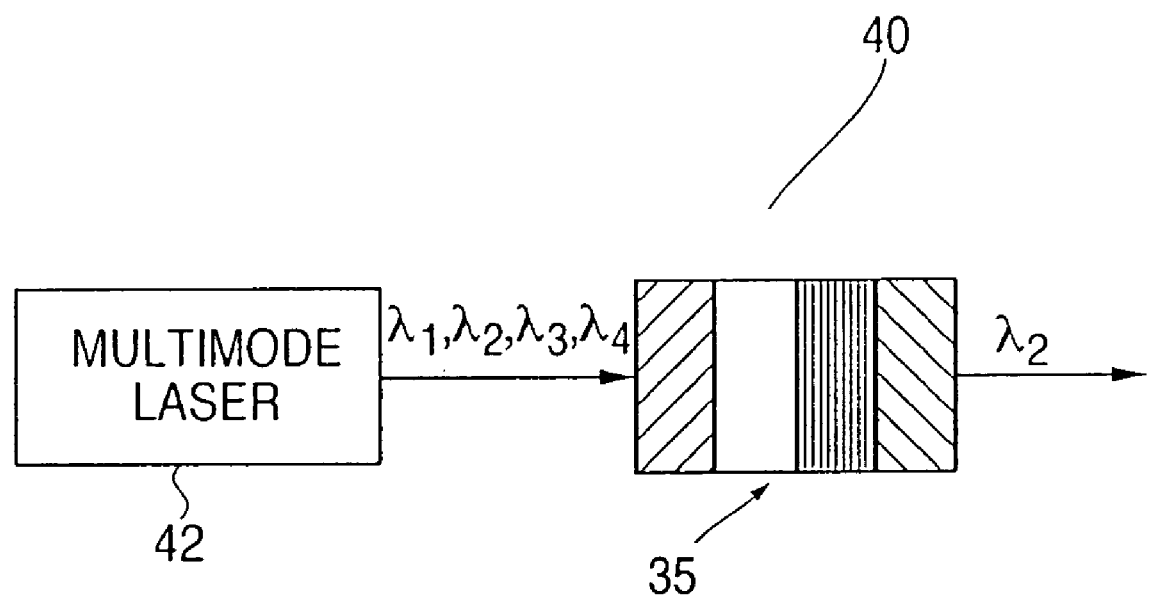
FIGS. 34(a)-(b) are schematic illustrations of variable frequency laser source configurations in accordance with embodiments of the present invention.

Referring to FIG. 34(a), a discretely tunable laser 40 is shown which comprises a multiple wavelength, multi-mode laser source 42 and a switchable Bragg grating filter 35 formed from a stack of switchable Bragg gratings 36. In this preferred embodiment, the multiple wavelength, multi-mode laser source 42 could be, for example, a Fabry-Perot semiconductor laser. Fabry-Perot semiconductor lasers are less expensive relative to single mode lasers and they emit light at several discrete wavelengths that can be adjusted so that these discrete wavelengths correspond to the International Telecommunications Union (ITU) grid of wavelengths for DWDM. On the order of 10 different wavelengths can be generated from such a source, so it would require several sources to cover the entire DWDM spectrum.

Figure 34B:
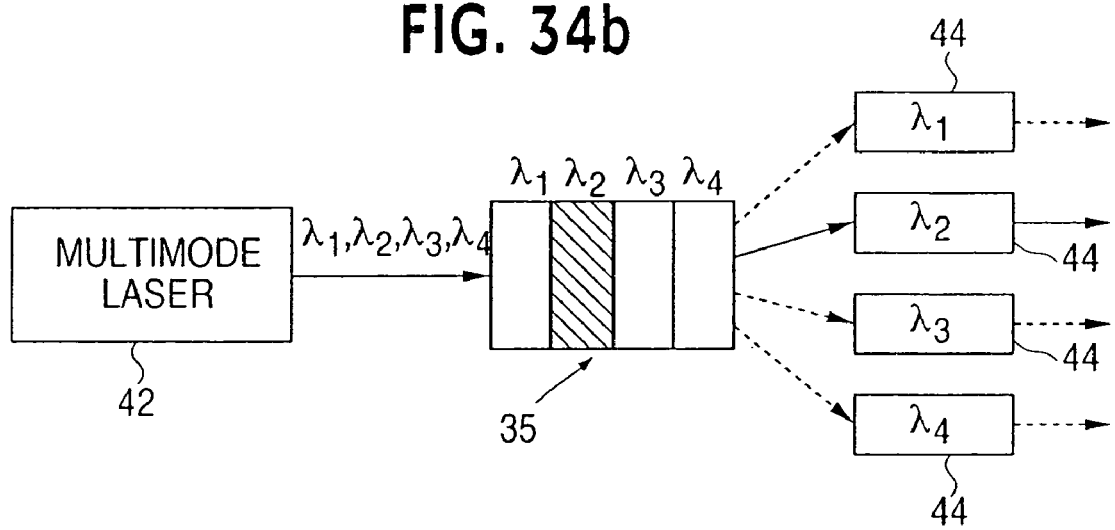

The light emitted from the multiple wavelength, multi-mode laser 42 is directed into a switchable fiber Bragg filter 35 similar to the one described earlier with reference to the OADM system 30. In this case, the desired wavelength can be passed through while all the others are diffracted elsewhere. Alternatively, as shown in FIG. 34(b) each wavelength could be diffracted into a specific direction and picked up by a respective output device 44 (e.g., detector, fiber or waveguide). The output device 44 is alternatively configured to receive only a single wavelength in a single mode, a single wavelength in multiple modes, multiple wavelengths all in the same mode, or multiple wavelengths in multiple modes.

In further preferred embodiments of the present invention, a $N^2 \times N^2$ optical cross-connect switch consisting of 2N principal layers of H-PDLC matrix holographic switches is presented. One purpose of a cross-connect switch is to direct an optical signal from any element of a rectangular input matrix to any element of an identical output matrix. This can be accomplished by a series of up-down and right-left moves. All inputs and outputs are assumed to be parallel.

The beam deflector system shown in FIG. 35 can achieve a simple one-step move. This device is referred to as an "up" deflector because the incident beam 32 is deflected up, forming an intermediate beam 33, by a first PDLC holographic grating 36. A second identical "up" holographic grating 36 positioned some distance away accepts this beam and produces an exit beam 34, parallel to the incident beam 32. Thus, these two layers, a deflector and acceptor, form a one-step move, i.e., taking a parallel input, moving it up one space, and producing a parallel output.

The same holographic grating can be used for the "down," "right," and "left" deflections. If the holographic grating 36 in FIG. 35 is rotated by 180° about its normal axis, it becomes a "down" deflector. Likewise, if it is rotated by ±90°, it becomes a "right" or "left" deflector. Hence, a single type of hologram achieves all of the necessary deflections.

Figure 36:
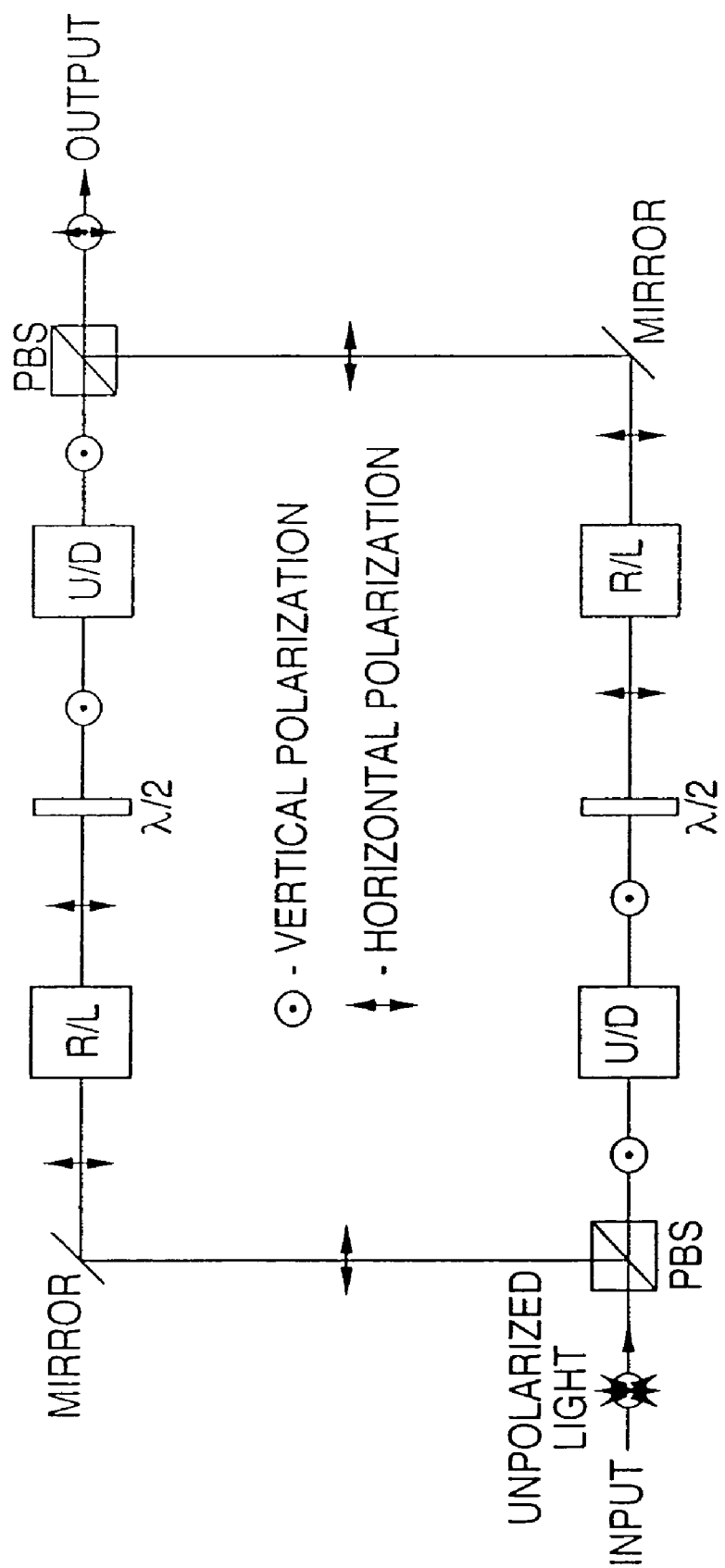
FIG. 36 is a schematic illustration of a polarization diversity scheme for a matrix cross-connect switch employing PDLC holographic transmission gratings according to an embodiment of the present invention.

The switches in this concept are transmission holographic switches that either deflect up/down or right/left. Thus, based on the discussion above, the incident light should be polarized in the vertical plane or the horizontal plane, respectively, for optimum efficiency (and hence minimum loss and crosstalk). The scheme shown in FIG. 36 achieves this as well as providing for polarization diversity when the input light is unpolarized (as is often the case for light emitted from diode lasers or outcoupled from an optical fiber). This configuration has two identical optical paths including a polarization beam Splitter (PBS), up/down (U/D) and right/left (R/L) deflector/acceptor layers, mirror, and a half-wave (λ/2) plate, with the exception that the order of the up/down and right/left layers is reversed in each path. At the first PBS, the light is split into two beams of orthogonal polarization, which are directed at 90° to one another. The beam in the lower path is vertically polarized and hence achieves optimum diffractive coupling in the U/D layers. The intermediate switched outputs from the U/D layers are directed through the λ/2 plate, which rotates the polarization to horizontal. This is the polarization for optimum diffractive coupling in the R/L layers. The outputs of the R/L layers, still having horizontal polarization, are directed by the mirror to the final PBS where they are reflected out of the system. Light incident on the upper path is horizontally polarized and as such it is optimally polarized for the R/L layers. The λ/2 plate rotates the polarization of the intermediate output in the upper path to vertical, which is optimally polarized for the subsequent upper path U/D layers. The net switching is identical to the lower path since the R/L and U/D operations are done independently. The final outputs from the upper path pass directly through the final PBS and recombine with the signals from the lower path in a precisely synchronized fashion since the two legs are completely symmetric. Thus, this polarization diversity scheme utilizes the polarization properties of PDLC transmission gratings to achieve a matrix cross-connect switch with optimum efficiency and hence minimum crosstalk and polarization dependent loss.

The $N^2 \times N^2$ matrix cross-connect switch is unique. Most cross-connect switches discussed in the literature (see, e.g., Ramaswami and Sivarajan, 1998) are linear N×N switches. Actually, any set of columns in the U/D layers or any set of rows in the R/L layers constitute an N×N switch and can be discussed as such. These N×N cross-connect switches are wide-sense nonblocking in that, for the given paths defined, any unused input can be connected to any unused output without requiring any existing connections to be broken. This can be seen in that (a) the directions of signals to their respective outputs are determined by defections set in the very first layer (none of these conflict with one another), and (b) the output of a signal in any channel is selected by activating a hologram that is Bragg-matched only to the desired direction selected in the first layer. Any other signal passing through that hologram is not Bragg-matched and hence not deflected. This type of N×N cross-connect switch, which we will designate by SU, requires $2[(N-1)^2+1]$ elementary switches.

Figure 37:
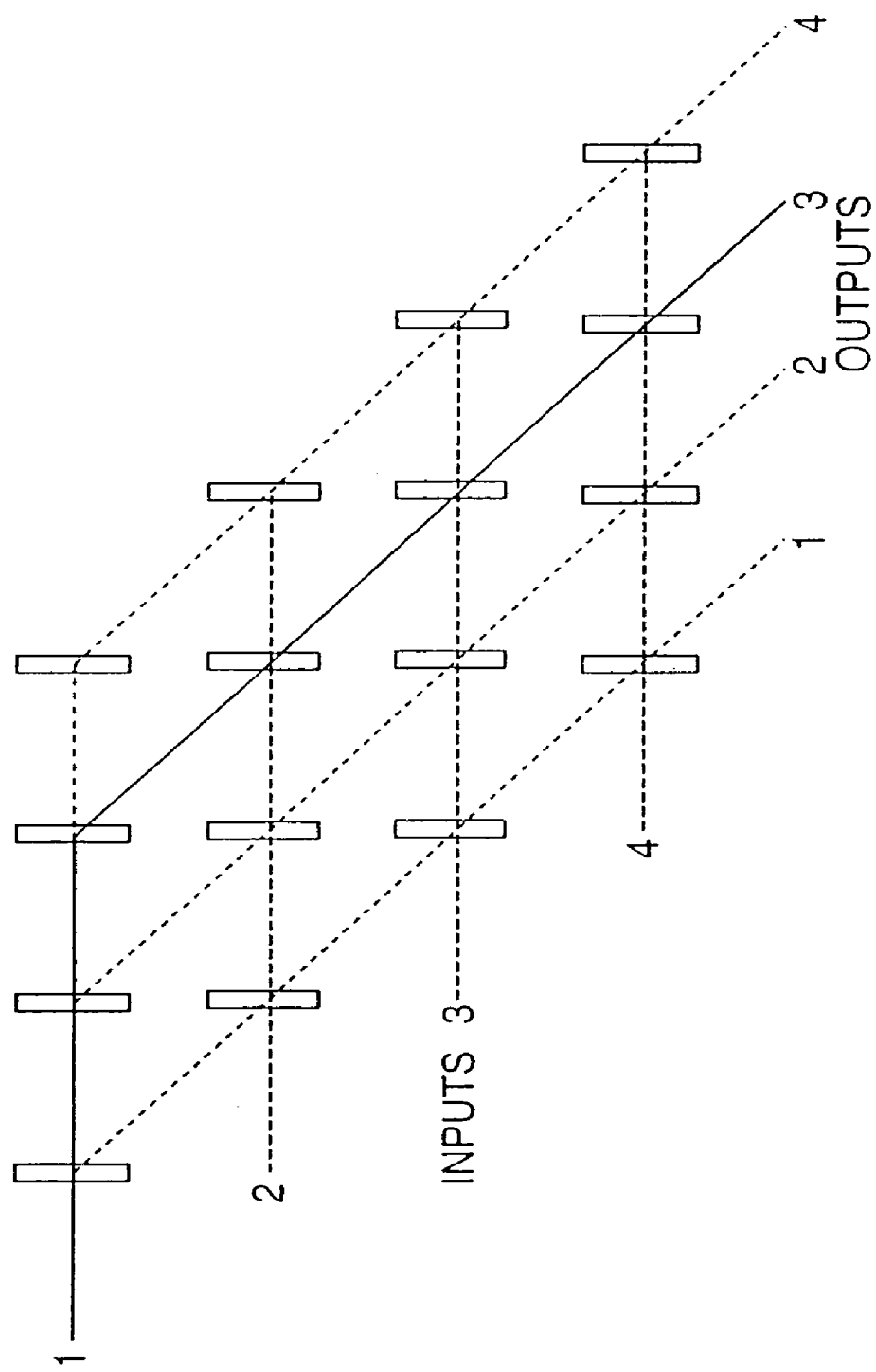
FIG. 37 is a schematic representation of a 4×4 crossbar switch according to an embodiment of the present invention.

Another type of wide-sense nonblocking N×N switch that has been discussed in the literature is a crossbar (CB) switch. This type of switch requires only $N^2$ elementary switches. A 4×4 crossbar switch made with down deflector, switchable PDLC transmission holograms is shown in FIG. 37. This can easily be generalized to an N×N switch for any N. In the powered state, the elementary switches directly transmit light, while in the unpowered state they deflect or accept a beam of light. The dashed paths in FIG. 37 show the potential connections of inputs to outputs. The heavy line shows an actual connection from input 1 to output 3. We note that this type of linear cross-connect can be generalized to form parallel columns of down or up deflectors which are then coupled to a set of parallel rows of right or left deflectors in a plane perpendicular to the plane of FIG. 37 to form an $N^2 \times N^2$ matrix cross-connect switch. The same polarization diversity scheme illustrated in FIG. 36 could then be employed.

For these wide-sense nonblocking switches, a path or paths may be found that make them nonblocking. However, alternate paths exist to make connections, and not all of them will be nonblocking.

An architecture discussed in the literature that is strict sense nonblocking (no alternative paths that lead to blocking) is the Spanke (SP) architecture. This can be achieved using a combination of existing 1×2 and 2×1 switches (e.g., optical fiber directional couplers) in optical communications networks. The key to the Spanke architecture is that each input can be independently coupled to N outputs. A Spanke architecture can be achieved using switchable PDLC transmission gratings as follows.

Figure 38A:
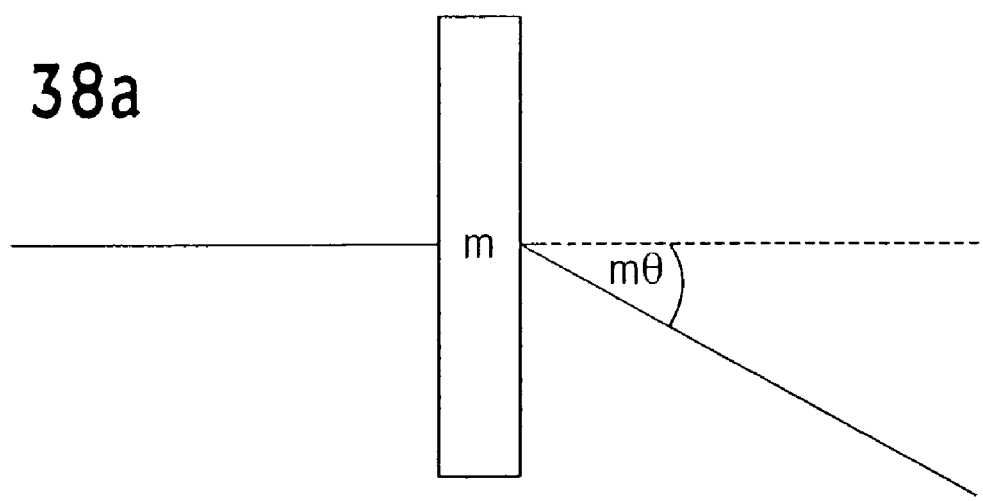
FIGS. 38(a)-(b) are schematic representations of individual PDLC switches for use in a switch architecture according to an embodiment of the present invention.
Figure 38B:
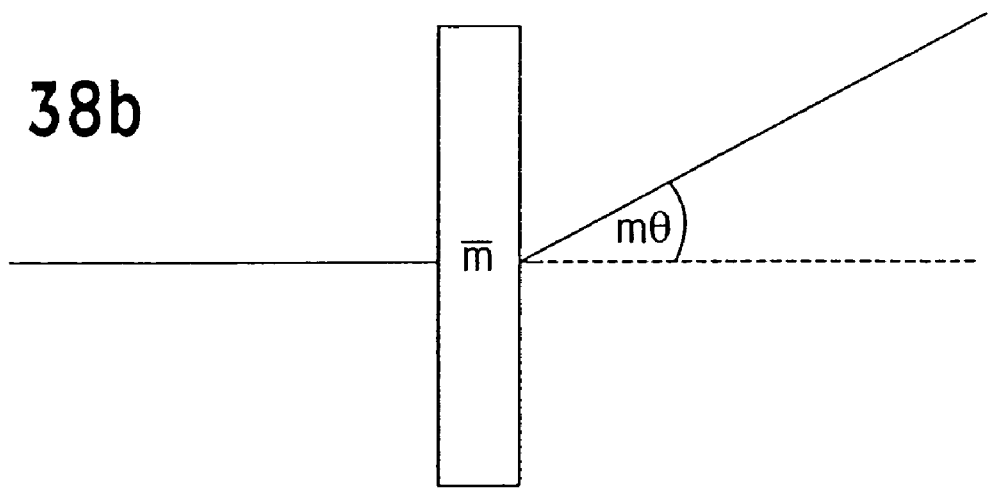

Three different types of switchable up/down deflector/acceptor holograms, as illustrated in FIGS. 38(a)-(b) may be utilized in connector components. Note that in the powered state, all holograms pass light straight through. We designate each hologram by an integer m, where this is the multiple of an angle θ through which the beam is deflected down as shown in FIG. 38(a). Hence, a hologram designated 2 deflects the beam down by 2θ, for example. Holograms designated with a bar over the number m deflect light up by mθ as shown in FIG. 38(b).

In an embodiment of the present invention, these types of holograms may be stacked up in two layers in the configuration shown in FIG. 39 to construct a 4×4 Spanke switch. The dashed lines show potential paths for making connections of any input to any output. At any active input, at most only one hologram is activated (unpowered). Powering all three holograms makes a straight line connection. Utilizing this configuration, any of the N possible outputs can be connected to any input. In the output, the corresponding acceptor hologram is activated to make the connection. For example, to make the actual connection from input 1 to output 3, shown by the heavy line in FIG. 39 hologram 2 is activated in channel 1 of the input layer, and hologram 2 in channel 3 of the output layer is activated. This type of configuration can be generalized to any N×N switch. This manifestation of the Spanke architecture requires N−1 different types of holograms (i.e., N−1 different deflection angles).

Figure 40:
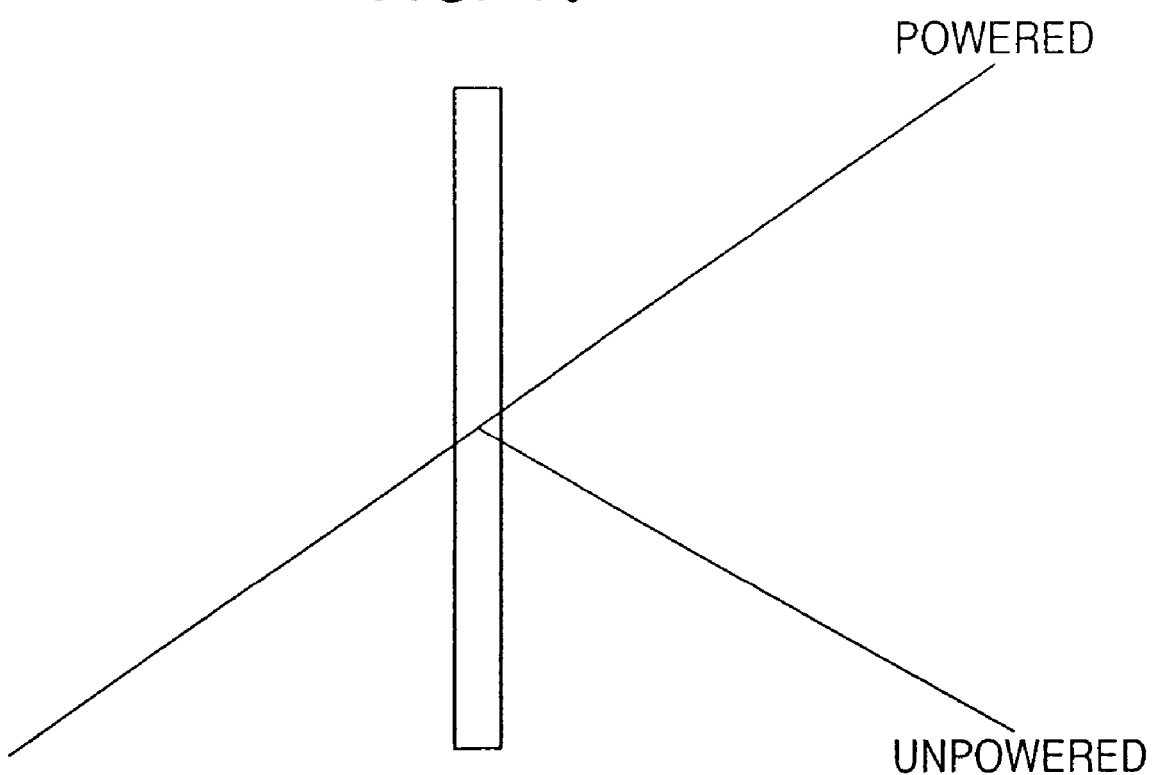
FIG. 40 is a schematic representation of an individual PDLC switch for use in a switch architecture according to an embodiment of the present invention.
Figure 41:
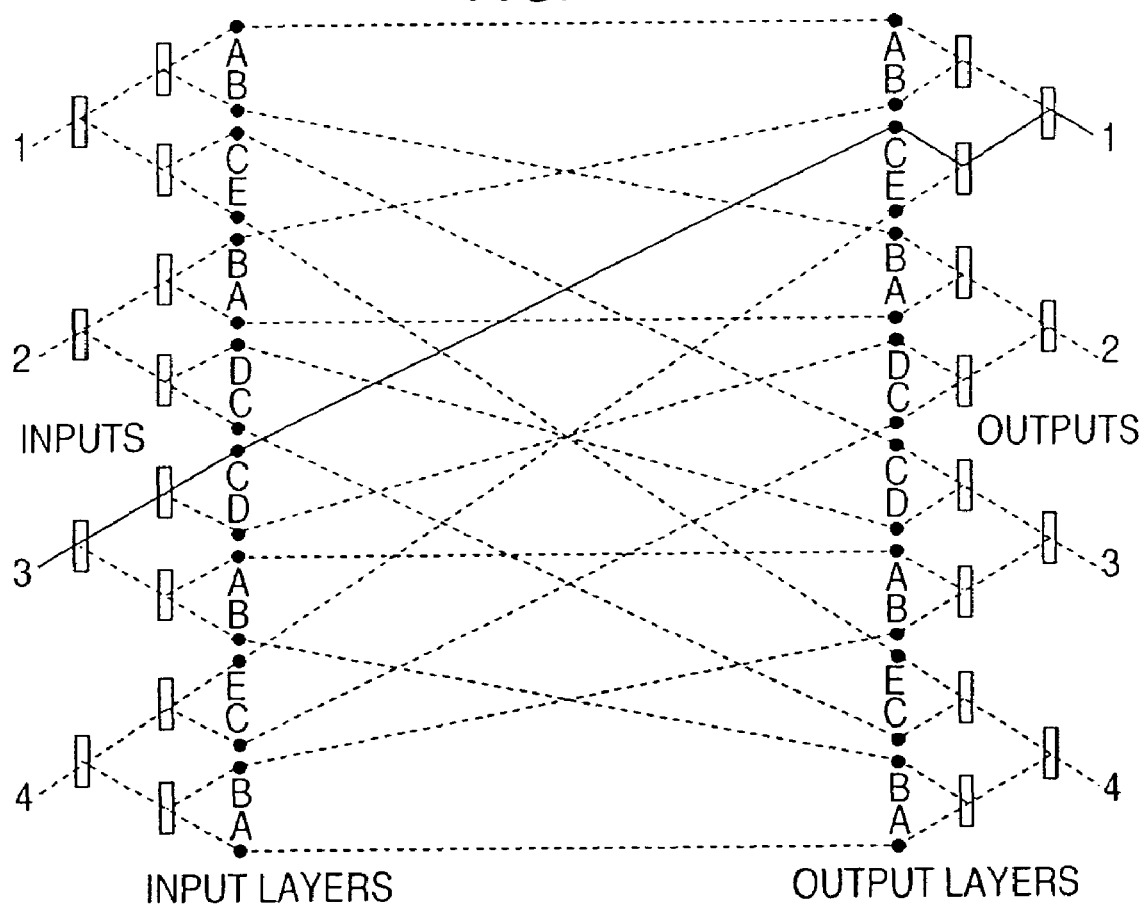
FIG. 41 is a schematic representation of a 4×4 switch utilizing the switches of FIG. 37 according to an embodiment of the present invention.

In a further embodiment of the present invention, a Spanke architecture can also be realized using just one type of switchable transmission hologram. Consider the symmetric elementary holographic switch illustrated in FIG. 40 which is used to form a 4×4 Spanke switch as shown in FIG. 41. The dashed lines again show potential paths for connections, while the heavy line shows an actual connection from input 3 to output 1. In this configuration, the nodes A, B, C, D, E are static optical elements (e.g., conventional mirrors, or holograms, or possibly optical fibers) or combinations of such elements that connect the input and output layers. In other words, they are always activated, but will not direct optical signals unless a signal is placed in that path by the elementary holographic switches. This can also be generalized to an N×N switch for any N. Any Spanke switch will require 2N(N−1) elementary switches, which is larger than the number for a corresponding SU switch.

These manifestations of the Spanke architecture can also be generalized to N parallel columns of up or down deflectors coupled to N parallel rows of right or left deflectors to form an $N^2 \times N^2$ matrix cross-connect switch. A polarization diversity scheme similar to that shown in FIG. 36 could then be employed. Finally, it should be noted that all of these matrix switch concepts can be generalized to NM×NM matrix cross-connects, where N≠M.

Figure 42:
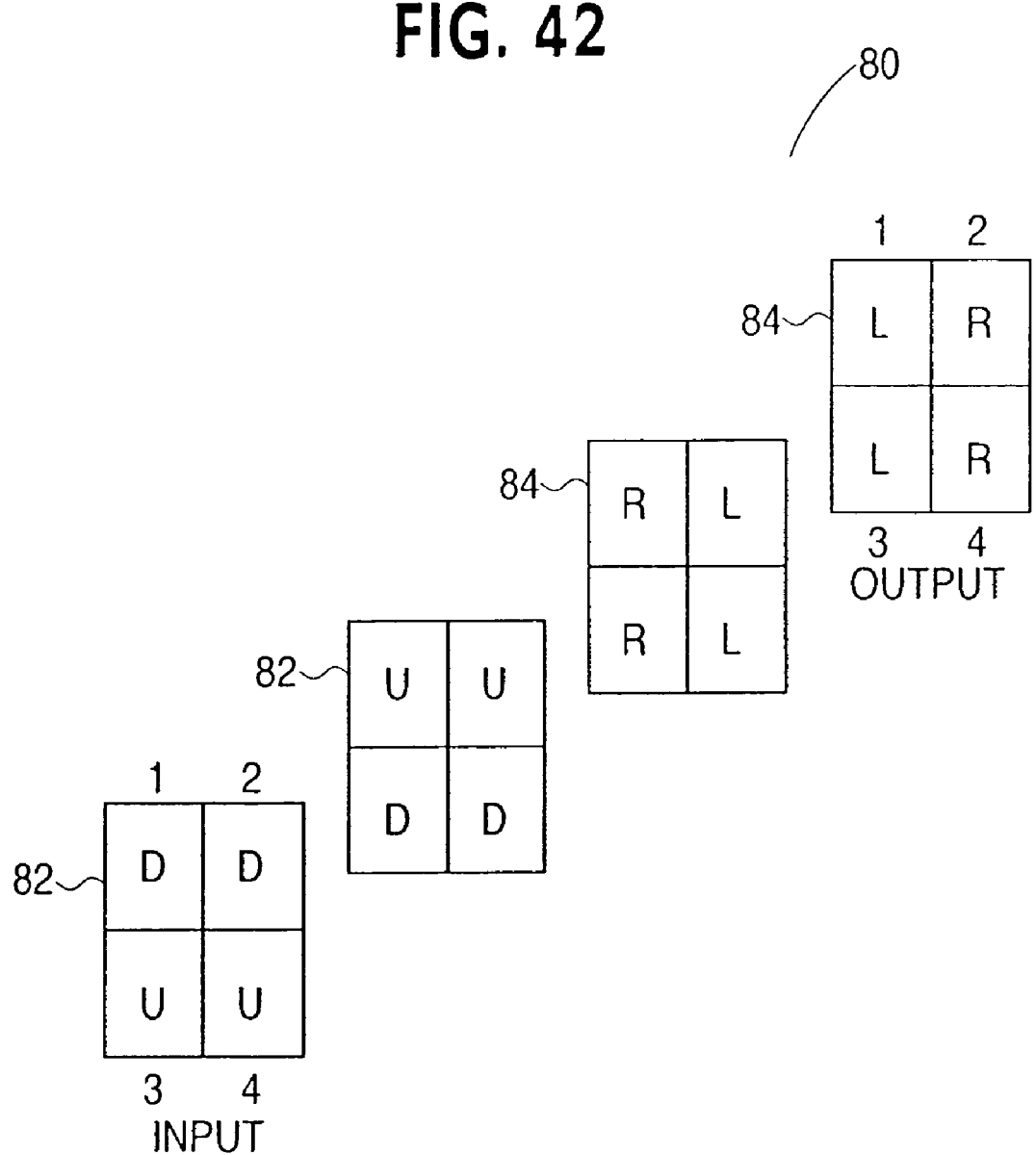
FIG. 42 is a schematic representation of a 4×4 optical cross-connect switch in accordance with an embodiment of the present invention.

In another embodiment of the present invention, a 4×4 (or $2^2 \times 2^2$) cross-connect component 80, is shown in FIG. 42. The first deflector/acceptor layers 82 perform the up-down switching, while the second set of layers accomplishes right-left switching 84. For example, switching an input from the first quadrant to an output in the fourth quadrant is accomplished with all four PDLC switchable holograms "on." On the other hand, making a "4-to-3" switch requires turning the holograms in the first and second layers "off," and leaving the holograms "on" in the third and fourth layers. Any of the four inputs can be mapped to any of the four outputs with this configuration.

Figure 43:
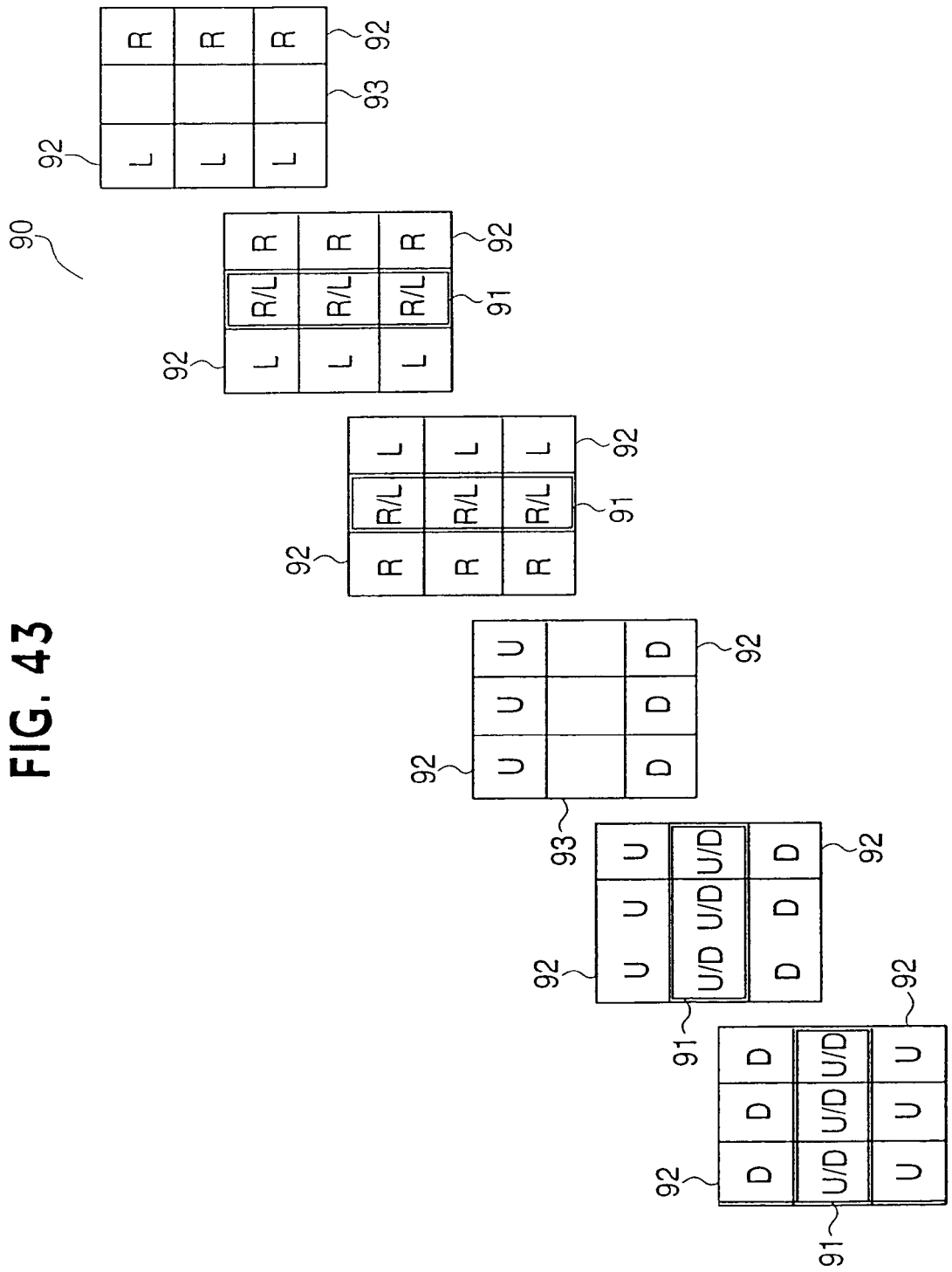
FIG. 43 is a schematic representation of a 9×9 optical cross-connect switch in accordance with an embodiment of the present invention.

In another embodiment of the present invention, a 9×9 ($3^2 \times 3^2$) cross-connect switch 90, is shown in FIG. 43. In order to achieve the same range of deflection movement as the 4×4 matrix, a sub-layer of PDLC switches 91 is introduced for some middle rows/columns of the principal PDLC layers 92. Additionally, the principal PDLC layers 92 also contain "holes" 93 in some of the middle columns. The sub-layers of PDLC switches 91 and the holes 93 are necessary to allow for the beams to go up or down and right or left. This cross-connect switch allows the voltage-select PDLC switches to direct any input to any output. Notice in this case, for example, to direct the top row to the bottom row, the holograms in the second layer will be "off."

Figure 44:
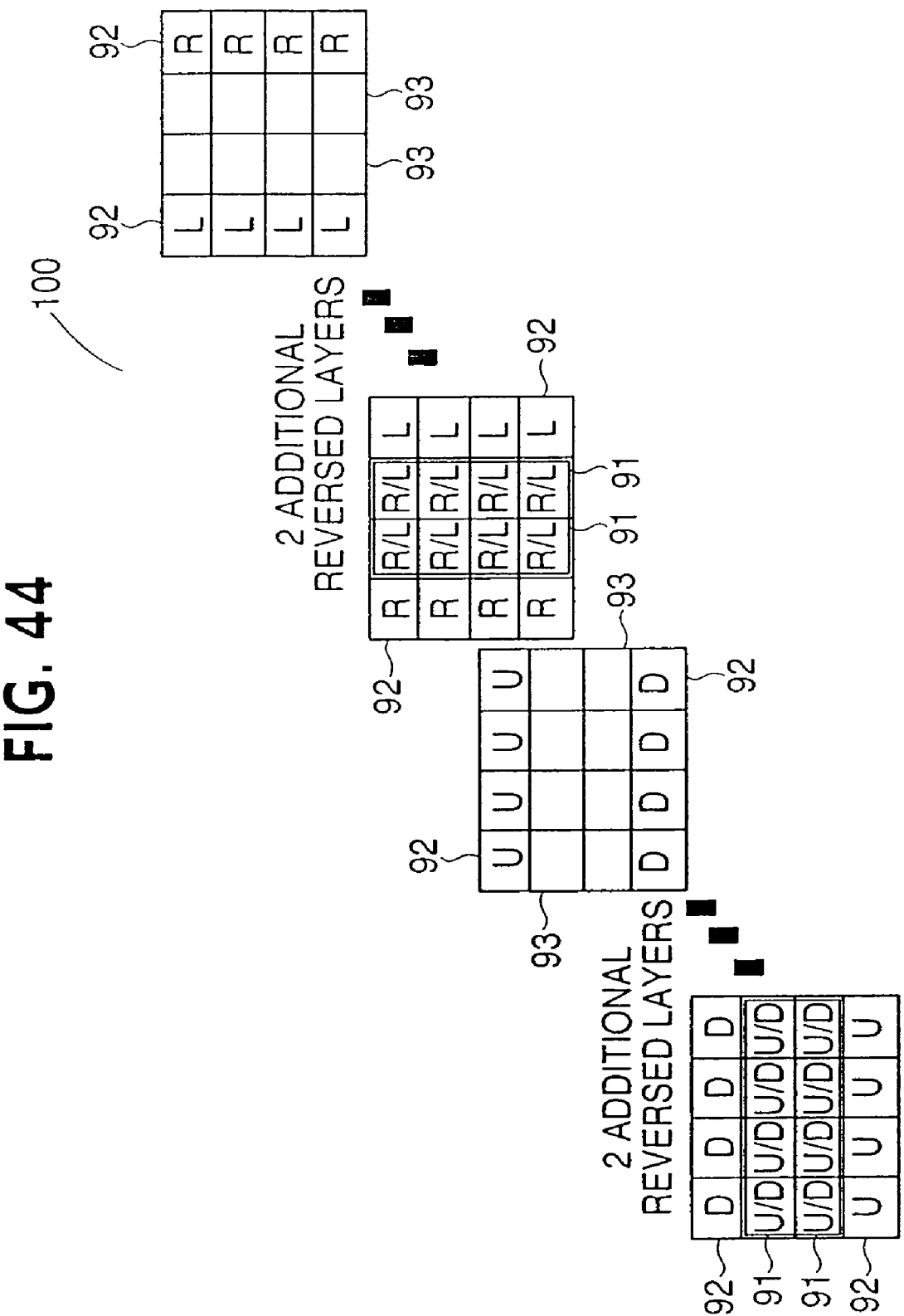
FIG. 44 is a schematic representation of a 16×16 optical cross-connect switch in accordance with an embodiment of the present invention.

In another embodiment of the present invention, a 16×16 ($4^2 \times 4^2$) cross-connect switch 100, is shown in FIG. 44. There are once more sub-layers 91 and holes 93 for the middle rows/columns, interspersed between the principal layers of PDLC holographic switches 92. This device consists of 8 principal layers, 4 for up-down switching, and 4 for right-left switching. Any one of 16 inputs can be mapped to any one of 16 outputs by appropriate voltage-selection of holograms. In general, the progression of devices illustrated in FIG. 42 through 44 shows that a $N^2 \times N^2$ cross-connect will require 2N principal layers with 2(N−1) sub-layers. If the vertical/horizontal distance between beams is d, and the deflection angle is θ, then the total thickness of the device is given by $$t = \frac{(2N-1)d}{\tan\theta}.$$

For example, assuming d=3 mm and θ=20°, the 16×16 cross-connect would have a total thickness t≈58 mm (<3 inches).

The cross-connect switches described herein are fully operational in a free space configuration (though not limited thereto). The principal optical concerns and limitations of cross-connect switches are insertion loss and cross talk. Ultimately, both of these limitations depend on the diffraction efficiency η of the PDLC holograms. In any of the $N^2 \times N^2$ cross-connects, we can readily see that the maximum number of deflections will be four (one up/down deflector/acceptor pair and one right/left deflector/acceptor pair). Hence the minimum throughput of the desired signal is $\eta^4$. (When only two deflections are required, this will increase to $\eta^2$.)

By way of example, transmission holograms with η=80% results in a minimum throughput of 41%, or an insertion loss of 3.9 dB. This is the minimum diffraction efficiency resulting from the PDLC holographic switches. This surpasses currently available commercial devices. Continuing with the present example, PDLC holograms have an index modulation of ~0.024. At a wavelength of 670 nm, this corresponds to a coupling coefficient of κ~0.11 μm$^{-1}$. Consequently, for a 10 μm thick hologram η=80% and this diffraction efficiency increases to 95% and 99% for a thickness of 12 μm and 15 μm, respectively. With η=99%, the throughput is 96%, and the insertion loss is 0.17 dB. This analysis ignores losses in the ITO layers, which is minimal.

The analysis of cross talk is more complicated. A first-order analysis can be accomplished by examining the 4×4 switch of FIG. 42. Note that the undiffracted part of the beam passing through the first "down" deflector passes directly to an "up" acceptor. However, in this case the acceptor acts as an "up" deflector since the input is at normal incidence. Thus, this remainder beam is diffracted out of the system (and may be baffled), with a smaller remainder transmitted to the third layer which contains a "right" deflector. Here, it is diffracted again. The possible outputs for a single given input are illustrated in FIG. 45. This system acts as a passive filter, attenuating the cross talk. In the worst case, with η1=80%, the isolation for the desired channel is 9.0 dB, and the maximum cross talk in an adjacent channel is down by −12 dB. However, if η=99%, the worst case isolation is 37 dB, and the maximum cross talk in an adjacent channel is down by −40 dB. This analysis does not include residual diffraction in a switched hologram since the worst case considered all of the holograms "on." However, the diffraction efficiency of a hologram in the "off" state can be <1%, so this should not make the present results any worse. A more detailed analysis should include minimal ITO losses.

Electrical requirements are also a consideration and possible limitation to the overall efficiency and usefulness of optical cross-connect switches. For example, given η=80% it is possible to make transmission gratings that switch at about 5 V/μm. Similarly, 15 μm thick film would thus require 75 V for switching.

Power requirements are computed with the following reasoning. The AC power is given by $$P = \frac{1}{2} fCV^2,$$

where f is the frequency of the square-wave voltage, C is the film capacitance, and V is the applied voltage. The physical size of a $N^2$ matrix is Nd×Nd; e.g., for a $4^2$ matrix with d=3 mm, this size is 12×12 mm$^2$. A typical capacitance for a hologram of this area is ~2 nF. An optimum frequency for high switching contrast is 2 kHz. Thus, with a switching voltage of 75 V, the power required for one hologram matrix is ~11 mW. For a $4^2 \times 4^2$ cross connect with 8 layers and 6 sub-layers (with each sub-layer requiring half the power of a layer), the net requirement is 11×11 mW=121 mW. If visual desires drive up the size of the device for ease of demonstration, note that the net power requirement will scale with total area. Should the power become prohibitive, it is possible that current-limiting resistors could be used to minimize the power, since most of the current is associated with the capacitor-charging spike. Given that the RC time constant is on the order of a few microseconds, the demonstration would not be hampered if this were stretched out considerably, thereby reducing the AC power required.

While preferred embodiments of the present invention have been described herein, the disclosure is not intended to be limiting. The present invention encompasses any and all modifications, adaptations, and embodiments that would be understood by those in the art based on this disclosure.

The invention claimed is:

1. An optical system for wavelength selection comprising:
   at least one coherent light source for inputting multiple wavelengths;
   a first polymer-dispersed liquid crystal switchable holographic component for diffracting a first single wavelength of an incident beam;
   a second polymer-dispersed liquid crystal switchable holographic component for diffracting a second single wavelength of an incident beam, wherein the first and second polymer-dispersed liquid crystal switchable holographic components are located in stacked relationship with one another and placed in the path of the incident beam; and
   an output component alternately configured for receiving from the first and second polymer-dispersed liquid crystal holographic:

(a) all undiffracted multiple wavelengths; and
(b) both the first and second diffracted single wavelengths and the undiffracted multiple wavelengths;
wherein the output component is not a polymer-dispersed liquid crystal switchable holographic component.

2. The optical system for wavelength selection according to claim 1, wherein each of the first and second polymer-dispersed liquid crystal switchable holographic components are capable of diffracting a wavelength in the presence of an applied voltage and transmitting the remaining multiple inputted wavelengths in the absence of the applied voltage.

3. The optical system for wavelength selection according to claim 1, wherein each of the first and second polymer-dispersed liquid crystal switchable holographic components are capable of transmitting all of the multiple inputted wavelengths in the presence of an applied voltage.

4. The optical system for wavelength selection according to claim 1, wherein each of the first and second polymer-dispersed liquid crystal switchable holographic components are capable of diffracting a wavelength in the absence of an applied voltage and transmitting the remaining multiple inputted wavelengths in the presence of the applied voltage.

5. The optical system for wavelength selection according to claim 1, wherein each of the first and second polymer-dispersed liquid crystal switchable holographic components are capable of transmitting all of the multiple inputted wavelengths in the absence of an applied voltage.

6. The optical system for wavelength selection according to claim 1, wherein the multiple wavelength input component is a laser.

7. The optical system for wavelength selection according to claim 1, wherein the multiple wavelength input component is a fiber.

8. The optical system for wavelength selection according to claim 1, wherein the multiple wavelength input component is a waveguide.

9. The optical system for wavelength selection according to claim 1, wherein the output component is a single-mode fiber.

10. The optical system for wavelength selection according to claim 1, wherein the output component is an array of single-mode fibers.

11. The optical system for wavelength selection according to claim 1, wherein the output component is a single-mode waveguide.

12. The optical system for wavelength selection according to claim 1, wherein the output component is an array of single-mode waveguides.

13. The optical system for wavelength selection according to claim 1, wherein the output component is a detector.

14. The optical system for wavelength selection according to claim 1, wherein the output component is a combiner.

15. The optical system for wavelength selection according to claim 1, wherein each of the multiple polymer-dispersed liquid crystal switchable holographic components comprises:
    a pair of transparent conductive slides;
    a voltage source electrically contacted to the pair of transparent conductive slides;
    at least one spacer for separating the pair of transparent conductive slides;
    a layer of polymer-dispersed liquid crystal material located within the confines of the pair of transparent conductive slides and the at least one spacer; and
    a switchable holographic grating formed within the layer of polymer-dispersed liquid crystal material.

16. The optical system for wavelength selection according to claim 15, wherein the polymer-dispersed liquid crystal material is made from:
    (a) a polymerizable monomer comprising at least one acrylate;
    (b) at least one type of liquid crystal material;
    (c) a chain-extending monomer;
    (d) a coinitiator; and
    (e) a photoinitiator.

17. The optical system for wavelength selection according to claim 16, wherein the polymerizable monomer comprises at least one of a di-, tri-, tetra-, and pentaacrylate.

18. The optical system for wavelength selection according to claim 17, wherein the polymerizable monomer is at least one acrylate selected from the group consisting of triethyleneglycol diacrylate, trimethylolpropane triacrylate, pentaerythritol triacrylate, pentaerythritol tetracrylate, and dipentaerythritol pentaacrylate.

19. The optical system for wavelength selection according to claim 18, wherein the polymerizable monomer comprises a mixture of tri- and pentaacrylates.

20. The optical system for wavelength selection according to claim 19, wherein the polymerizable monomer comprises dipentaerythritol pentaacrylate.

21. The optical system for wavelength selection according to claim 16, wherein the polymer-dispersed liquid crystal material further comprises a surfactant.

22. The optical system for wavelength selection according to claim 21, wherein the surfactant is octanoic acid.

23. The optical system for wavelength selection according to claim 16, wherein the polymerizable monomer comprises dipentaerythritol pentaacrylate, the at least one liquid crystal comprises at least one cyanobiphenyl, the chain-extending monomer is N-vinyl pyrrolidone, the coinitiator is N-phenylglycine, and the photoinitiator is rose bengal.

* * * * *